US011767473B2

(12) United States Patent
Yao et al.

(10) Patent No.: US 11,767,473 B2
(45) Date of Patent: Sep. 26, 2023

(54) ACTIVE NEMATIC COLLOIDS IN MICROROBOTICS

(71) Applicant: The Trustees of the University of Pennsylvania, Philadelphia, PA (US)

(72) Inventors: Tianyi Yao, Exton, PA (US); Kathleen J Stebe, Penn Valley, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 17/664,911

(22) Filed: May 25, 2022

(65) Prior Publication Data

US 2022/0389316 A1 Dec. 8, 2022

Related U.S. Application Data

(60) Provisional application No. 63/193,032, filed on May 25, 2021.

(51) Int. Cl.
   *C09K 19/20* (2006.01)
   *C09K 19/02* (2006.01)
   *C09K 19/00* (2006.01)

(52) U.S. Cl.
   CPC .......... *C09K 19/0208* (2013.01); *C09K 19/00* (2013.01); *C09K 2323/031* (2020.08)

(58) Field of Classification Search
   None
   See application file for complete search history.

(56) References Cited

U.S. PATENT DOCUMENTS

2022/0389316 A1* 12/2022 Yao .................... C09K 19/0208

OTHER PUBLICATIONS

Y. Yuan, G. N. Abuhaimed, Q. Liu, I. I. Smalyukh, Self-assembled nematic colloidal motors powered by light. Nat Commun. 9, 5040 (2018).
Y. Yuan, Q. Liu, B. Senyuk, I.I. Smalyukh, Elastic colloidal monopoles and reconfigurable self-assembly in liquid crystals. Nature 570, 214-218 (2019).
Y. Zhao, M. A. Belkin, A. Alu, Twisted optical metamaterials for planarized ultrathin broadband circular polarizers. Nat Commun. 3, 870 (2012).
Z. Zheng, Y. Li, H. K. Bisoyi, L. Wang, T. J. Bunning, Q. Li, Threedimensional control ofthe helical axis of a chiral nematic liquid crystal by light. Nature. 531, 352-356 (2016).
J. Espinosa-Garcia, E. Lauga, R. Zenit, Fluid elasticity increases the locomotion offlexible swimmers. Phys. Fluids. 25, 031701 (2013).
J. Palacci, S. Sacanna, A. P. Steinberg, D. J. Pine, P. M. Chaikin, Living Crystals of Light-Activated Colloidal Surfers. Science. 339, 936-940 (2013).
J. Stefan, Versuche uber die scheinbare Adhasion. Ann. Phys. 230, 316-318 (1875).
J. Zhang, E. Luijten, B. A. Grzybowski, S. Granick, Active colloids with collective mobility status and research opportunities. Chem. Soc. Rev. 46, 5551-5569 (2017).
J.-B. Fournier, P. Galatola, Modeling planar degenerate wetting and anchoring in nematic liquid crystals. Europhys. Lett. EPL. 72, 403-409 (2005).
K. Han, C. W. Shields IV, O. D. Velev, Engineering of Self-Propelling Microbots and Microdevices Powered by Magnetic and Electric Fields. AdvancedFunctional Materials. 28, 1705953 (2018).
K. Son, D. R. Brumley, R. Stocker, Live from under the lens: exploring microbial motility with dynamic imaging and microfluidics. Nat. Rev. Microbiol. 13, 761-775 (2015).
L. Giomi, Z. Kos, M. Ravnik, A. Sengupta, Cross-talk between topological defects in different fields revealed by nematic microfluidics. PNAS. 114, E5771-E5777 (2017).
M. C. Marchetti, J. F. Joanny, S. Ramaswamy, T. B. Liverpool, J. Prost, M. Rao, R. A. Simha, Hydrodynamics ofsoft active matter. Rev. Mod. Phys. 85, 1143-1189 (2013).
M. Conradi, M. Ravnik, M. Bele, M. Zorko, S. Zumer, I. Musevic, Janus nematic colloids. SoftMatter. 5, 3905-3912 (2009).
M. Driscoll, B. Delmotte, M. Youssef, S. Sacanna, A. Donev, P. Chaikin, Unstable fronts and motile structures formed by microrollers. Nat. Phys. 13, 375-379 (2017).
M. Kiernan, O. D. Lavemtovich, SoftMatter Physics: An Introduction (Springer Science & Business Media, 2007).
M. Molaei, M. Barry, R. Stocker, J. Sheng, Failed Escape: Solid Surfaces Prevent Tumbling of *Escherichia coli*. Phys. Rev. Lett. 113, 068103 (2014).
M. Rajabi, H. Baza, T. Turiv, O. D. Lavrentovich, Directional selflocomotion of active droplets enabled by nematic environment. Nat. Phys. 17, 260-266 (2021).
M. Ravnik, S. Zumer, Landau-de Gennes modelling of nematic liquid crystal colloids. Liq. Cryst. 36, 1201-1214 (2009).
M. Sitti, Physical intelligence as anew paradigm. Extreme Mechanics Letters. 46, 101340 (2021).
M. Skarabot, M. Ravnik, S. Zumer, U. Tkalec, I. Poberaj, D. Babic, N. Osterman, I. Musevic, Two-dimensional dipolar nematic colloidal crystals. Phys. Rev. E. 76, 051406 (2007).
N. Fang, H. Lee, C. Sun, X. Zhang, Sub-Diffraction-Limited Optical Imaging with a Silver Superlens. Science. 308, 534-537 (2005).
N. M. Silvestre, P. Patricio, M. M. Telo da Gama, Key-lock mechanism in nematic colloidal dispersions. Phys. Rev. E. 69, 061402 (2004).

(Continued)

*Primary Examiner* — Geraldina Visconti
(74) *Attorney, Agent, or Firm* — BakerHostetler

(57) ABSTRACT

Provided are compositions that include a nematic colloid, the nematic colloid comprising a nematic liquid crystal and a key colloid; and a lock colloid, the lock colloid optionally having at least two arms extending therefrom, the lock colloid being configured for assembly with the key colloid of the nematic colloid, the assembly optionally being mediated by a dipole interaction between the colloid and the lock colloid, by a disclination line of the nematic colloid, or any combination thereof. Also provided are related methods. The disclosed compositions and methods can be used to, e.g., assemble chain and lattice structures from the key colloids by exploiting disclination lines and dipole defects of the components of the compositions.

30 Claims, 42 Drawing Sheets

(56) References Cited

OTHER PUBLICATIONS

O. D. Lavrentovich, Design of nematic liquid crystals to control microscale dynamics. Liq. Cryst. Rev. 8, 59-129 (2020).

O. D. Lavrentovich, I. Lazo, O. P. Pishnyak, Nonlinear electrophoresis of dielectric and metal spheres in a nematic liquid crystal. Nature. 467, 947-950 (2010).

P. P. Pishnyak, S. Tang, J. R. Kelly, S. V. Shiyanovskii, O. D. Lavrentovich, Levitation, Lift, and Bidirectional Motion of Colloidal Particles in an Electrically Driven Nematic Liquid Crystal. Phys. Rev. Lett. 99, 127802 (2007).

O. Reynolds, IV. On the theory of lubrication and its application to Mr. Beauchamp tower's experiments, including an experimental determination of the viscosity of olive oil. Philos. Trans. R. Soc. Lond. 177, 157-234 (1886).

P. C. Mushenheim, R. R. Trivedi, H. H. Tuson, D. B. Weibel, N. L. Abbott, Dynamic self-assembly of motile bacteria in liquid crystals. SoftMatter. 10, 88-95 (2014).

P. G. de Gennes, J. Prost, The Physics of Liquid Crystals (Clarendon Press, 1993).

P. Tierno, R. Golestanian, I. Pagonabarraga, F. Sagues, Controlled Swimming in Confined Fluids of Magnetically Actuated Colloidal Rotors. Phys. Rev. Lett. 101,218304 (2008).

P. Yu, L. V. Besteiro, Y. Huang, J. Wu, L. Fu, H. H. Tan, C. Jagadish, G. P. Wiederrecht, A. O. Govorov, Z. Wang, Broadband Metamaterial Absorbers. Advanced OpticalMaterials. 7, 1800995 (2019).

R. Dreyfus, J. Baudry, M. L. Roper, M. Fermigier, H. A. Stone, J. Bibette, Microscopic artificial swimmers. Nature. 437, 862-865 (2005).

R. Piazza, A. Parola, Thermophoresis in colloidal suspensions. J. Phys. Condens. Matter. 20, 153102 (2008).

R. W. O'Brien, L. R. White, Electrophoretic mobility of a spherical colloidal particle. J. Chem. Soc. Faraday Trans. 2. 74, 1607 (1978).

R. Zhang, T. Roberts, I. S. Aranson, J. J. de Pablo, Lattice Boltzmann simulation of asymmetric flow in nematic liquid crystals with finite anchoring. J. Chem. Phys. 144, 084905 (2016).

S. Copar, M. Ravnik, S. Zumer, Introduction to Colloidal and Microfluidic Nematic Microstructures. Crystals. 11, 956 (2021).

S. Floyd, C. Pawashe, M. Sitti, Two-Dimensional Contact and Noncontact Micromanipulation in Liquid Using an Untethered Mobile Magnetic Microrobot. IEEE Transactions on Robotics 25, 1332-1342 (2009).

S. Gangwal, O. J. Cayre, M. Z. Bazant, O. D. Velev, Induced-Charge Electrophoresis of Metallodielectric Particles. Phys. Rev. Lett. 100, 058302 (2008).

S. H. Lee, S. L. Lee, H. Y. Kim, Electro-optic characteristics and switching principle of a nematic liquid crystal cell controlled by fringe-field switching. Appl. Phys. Lett. 13, 2881-2883 (1998).

S. Khullar, C. Zhou, J. J. Feng, Dynamic Evolution of Topological Defects around Drops and Bubbles Rising in a Nematic Liquid Crystal. Phys. Rev. Lett. 99, 237802 (2007).

S. Rafai, L. Jibuti, P. Peyla, Effective Viscosity of Microswimmer Suspensions. Phys. Rev. Lett. 104, 098102 (2010).

S. Ramaswamy, The Mechanics and Statistics of Active Matter. Annu. Rev. Condens. Matter Phys. 1, 323-345 (2010).

T. Qiu, T.-C. Lee, A. G. Mark, K. I. Morozov, R. Munster, O. Mierka, S. Turek, A. M. Leshansky, P. Fischer, Swimming by reciprocal motion at low Reynolds number. Nat. Commun. 5, 5119 (2014).

T. Yao, N. G. Chisholm, E. B. Steager, K. J. Stebe, Directed assembly and micro-manipulation of passive particles at fluid interfaces via capillarity using a magnetic micro-robot. Appl. Phys. Lett. 116, 043702 (2020).

T. Yao, Z. Kos, Y. Luo, E. B. Steager, M. Ravnik, K. J. Stebe, Topological defect-propelled swimming of nematic colloids. arXiv: 2109.14584 [cond-mat] (2021) (available at http://arxiv.org/abs/2109.14584).

T. Yao, Z. Kos, Y. Luo, F. Serra, E. B. Steager, M. Ravnik, K. J. Stebe, Nematic colloidal micro-robots as physically intelligent systems. ArXiv220314150 Cond-Mat (2022) (available at http://arxiv.org/abs/2203.14150).

W. F. Paxton, K. C. Kistler, C. C. Olmeda, A. Sen, S. K. St. Angelo, Y. Cao, T. E. Mallouk, P. E. Lammert, V. H. Crespi, Catalytic Nanomotors: Autonomous Movement of Striped Nanorods. J. Am. Chem. Soc. 126, 13424-13431 (2004).

W. Wang, J. Giltinan, S. Zakharchenko, M. Sitti, Dynamic and programmable self-assembly of micro-rafts at the air-water interface. Science Advances. 3, e1602522.

Y. Alapan, B. Yigit, O. Beker, A. F. Demirors, M. Sitti, Shapeencoded dynamic assembly of mobile micromachines. Nat. Mater. 18, 1244-1251 (2019).

Y. Gu, N. L. Abbott, Observation of Saturn-Ring Defects around Solid Microspheres in Nematic Liquid Crystals. Phys. Rev. Lett. 85, 4719-4722 (2000).

Y. Luo, D. A. Beller, G. Boniello, F. Serra, K. J. Stebe, Tunable colloid trajectories in nematic liquid crystals near wavy walls. Nat Commun. 9, 3841 (2018).

Y. Luo, F. Serra, K. J. Stebe, Experimental realization of the "lockand-key" mechanism in liquid crystals. SoftMatter. 12, 6027-6032 (2016).

Y. Luo, T. Yao, D. A. Beller, F. Serra, K. J. Stebe, Deck the Walls with Anisotropic Colloids in Nematic Liquid Crystals. Langmuir. 35, 9274-9285 (2019).

Y. Sasaki, Y. Takikawa, V. S. R. Jampani, H. Hoshikawa, T. Seto, C. Bahr, S. Herminghaus, Y. Hidaka, H. Orihara, Colloidal caterpillars for cargo transportation. SoftMatter. 10, 8813-8820 (2014).

Lazo, O. D. Lavrentovich, Liquid-crystal-enabled electrophoresis of spheres in a nematic medium with negative dielectric anisotropy. Philos. Trans. R. Soc. Math. Phys. Eng. Sci. 371, 20120255 (2013).

H.-W. Tung, K. E. Peyer, D. F. Sargent, B. J. Nelson, Noncontact manipulation using a transversely magnetized rolling robot. Appl. Phys. Lett. 103, 114101 (2013).

K. Han, G. Kokot, S. Das, R. G. Winkler, G. Gompper, A. Snezhko, Reconfigurable structure and tunable transport in synchronized active spinner materials. Sci. Adv. 6, eaaz8535 (2020).

O. D. Lavrentovich, Active colloids in liquid crystals. Curr. Opin. Colloid Interface Sci. 21, 97-109 (2016).

1. B. Liu, N. Sharifi-Mood, K. J. Stebe, Capillary Assembly of Colloids: Interactions on Planar and Curved Interfaces. Annual Review of CondensedMatter Physics. 9, 283-305 (2018).

1.1. Smalyukh, Liquid Crystal Colloids. Annu. Rev. Condens. Matter Phys. 9, 207-226 (2018).

1.1. Smalyukh, S. V. Shiyanovskii, O. D. Lavrentovich, Threedimensional imaging of orientational order by fluorescence confocal polarizing microscopy. Chem. Phys. Lett., 9 (2001).

A. Bricard, J.-B. Caussin, N. Desreumaux, O. Dauchot, D. Bartolo, Emergence of macroscopic directed motion in populations of motile colloids. Nature. 503, 95-98 (2013).

A. C. H. Tsang, E. Demir, Y. Ding, O. S. Pak, Roads to Smart Artificial Microswimmers. Advanced Intelligent Systems. 2, 1900137 (2020).

A. Eremin, P. Hirankittiwong, N. Chattham, H. Nadasi, R. Stannarius, J. Limtrakul, O. Haba, K. Yonetake, H. Takezoe, Optically driven translational and rotational motions of microrod particles in a nematic liquid crystal. PNAS. 112, 1716-1720 (2015).

A. F. Demirors, F. Eichenseher, M. J. Loessner, A. R. Studart, Colloidal shuttles for programmable cargo transport. Nat Commun. 8, 1872 (2017).

A. F. Demirors, M. Tolga Akan, E. Poloni, A. R. Studart, Active cargo transport with Janus colloidal shuttles using electric and magnetic fields. SoftMatter. 14, 4741-4749 (2018).

A. Kaiser, A. Snezhko, I. S. Aranson, Flocking ferromagnetic colloids. Sci. Adv. 3, e1601469.

A. Komar, Z. Fang, J. Bohn, J. Sautter, M. Decker, A. Miroshnichenko, T. Pertsch, I. Brener, Y. S. Kivshar, I. Staude, D. N. Neshev, Electrically tunable all-dielectric optical metasurfaces based on liquid crystals. Appl. Phys. Lett. 110, 071109 (2017).

A. N. Beris, B. J. Edwards, C. E. D. B. J. Edwards, Thermodynamics of Flowing Systems: With InternalMicrostructure (Oxford University Press, 1994).

(56) References Cited

OTHER PUBLICATIONS

A. P. Petroff, X.-L. Wu, A. Libchaber, Fast-Moving Bacteria SelfOrganize into Active Two-Dimensional Crystals ofRotating Cells. Phys. Rev. Lett. 114, 158102 (2015).

A. Sengupta, U. Tkalec, M. Ravnik, J. M. Yeomans, C. Bahr, S. Herminghaus, Liquid Crystal Microfluidics for Tunable Flow Shaping. Phys. Rev. Lett. 110, 048303 (2013).

A. Snezhko, M. Belkin, I. S. Aranson, W.-K. Kwok, Self-Assembled Magnetic Surface Swimmers. Phys. Rev. Lett. 102, 118103 (2009).

A. Sokolov, I. S. Aranson, J. O. Kessler, R. E. Goldstein, Concentration Dependence ofthe Collective Dynamics of Swimming Bacteria. Phys. Rev. Lett. 98, 158102 (2007).

A. Zottl, H. Stark, Emergent behavior in active colloids. J. Phys.: Condens. Matter. 28, 253001 (2016).

B. Senyuk, R. E. Adufu, I. I. Smalyukh, Electrically Powered Locomotion ofDual-Nature Colloid-Hedgehog and Colloid-Umbilic Topological and Elastic Dipoles in Liquid Crystals. Langmuir. 38, 689-697 (2022).

B. Sprinkle, E. B. van der Wee, Y. Luo, M. M. Driscoll, A. Donev, Driven dynamics in dense suspensions of microrollers. SoftMatter. 16, 7982-8001 (2020).

B. Wang, K. Kostarelos, B. J. Nelson, L. Zhang, Trends in Micro-/Nanorobotics: Materials Development, Actuation, Localization, and System Integration for Biomedical Applications. AdvancedMaterials. 33, 2002047 (2021).

C. Bechinger, R. Di Leonardo, H. Lowen, C. Reichhardt, G. Volpe, G. Volpe, Active Particles in Complex and Crowded Environments. Rev. Mod. Phys. 88, 045006 (2016).

C. C. Maass, C. Kruger, S. Herminghaus, C. Bahr, Swimming Droplets. Annu. Rev. Condens. Matter Phys. 7, 171-193(2016).

C. Kruger, G. Kids, C. Bahr, C. C. Maass, Curling Liquid Crystal Microswimmers: A Cascade of Spontaneous Symmetry Breaking. Phys. Rev. Lett. 117, 048003 (2016).

C. Lapointe, A. Hultgren, D. M. Silevitch, E. J. Felton, D. H. Reich, R. L. Leheny, Elastic Torque and the Levitation of Metal Wires by a Nematic Liquid Crystal. Science. 303, 652-655 (2004).

C. Peng, T. Turiv, Y. Guo, Q.-H. Wei, O. D. Lavrentovich, Command of active matter by topological defects and patterns. Science. 354, 882-885 (2016).

D. A. Beller, M. A. Gharbi, I. B. Liu, Shape-controlled orientation and assembly of colloids with sharp edges in nematic liquid crystals. SoftMatter. 11, 1078-1086 (2015).

D. K. Sahu, S. Dhara, Electrophoresis of metal-dielectric Janus particles with dipolar director symmetry in nematic liquid crystals. SoftMatter. 18, 1819-1824 (2022).

D. K. Sahu, S. Kole, S. Ramaswamy, S. Dhara, Omnidirectional transport and navigation ofJanus particles through a nematic liquid crystal film. Phys. Rev. Res. 2, 032009 (2020).

D. Lopez, E. Lauga, Dynamics ofswimming bacteria at complex interfaces. Phys. Fluids. 26, 071902 (2014).

E. Arbabi, A. Arbabi, S. M. Kamali, Y. Horie, M. Faraji-Dana, A. Faraon, MEMS-tunable dielectric metasurface lens. Nat Commun. 9, 812 (2018).

E. Lauga, Bacterial Hydrodynamics. Annu. Rev. FluidMech. 48, 105-130 (2016).

E. Lauga, T. R. Powers, The hydrodynamics ofswimming microorganisms. Rep. Prog. Phys. 72, 096601 (2009).

F. C. Keber, E. Loiseau, T. Sanchez, S. J. DeCamp, L. Giomi, M. J. Bowick, M. C. Marchetti, Z. Dogic, A. R. Bausch, Topology and dynamics of active nematic vesicles. Science. 345, 1135-1139 (2014).

F. Martinez-Pedrero, P. Tiemo, Magnetic Propulsion of SelfAssembled Colloidal Carpets: Efficient Cargo Transport via a Conveyor-Belt Effect. Phys. Rev. Appl. 3, 051003 (2015).

G. Duclos, R. Adkins, D. Banerjee, M. S. E. Peterson, M. Varghese, I. Kolvin, A. Baskaran, R. A. Pelcovits, T. R. Powers, A. Baskaran, F. Toschi, M. F. Hagan, S. J. Streichan, V. Vitelli, D. A. Beller, Z. Dogic, Topological structure and dynamics ofthreedimensional active nematics. Science (2020), doi:10.1126/science.aaz4547.

G. Gompper, R. G. Winkler, T. Speck, A. Solon, C. Nardini, F. Peruani, H. Lowen, R. Golestanian, U. B. Kaupp, L. Alvarez, T. Kiorboe, E. Lauga, W. C. K. Poon, A. DeSimone, S. Muinos-Landin, A. Fischer, N. A. Soker, F. Cichos, R. Kapral, P. Gaspard, M. Ripoll, F. Sagues, A. Doostmohammadi, J. M. Yeomans, I. S. Aranson, C. Bechinger, H. Stark, C. K. Hemelrijk, F. J. Nedelec, T. Sarkar, T. Aryaksama, M. Lacroix, G. Duclos, V. Yashunsky, P. Silberzan, M. Arroyo, S. Kale, The 2020 motile active matter roadmap. J. Phys.: Condens. Matter. 32, 193001 (2020).

G. Grosjean, M. Hubert, N. Vandewalle, Magnetocapillary selfassemblies: Locomotion and micromanipulation along a liquid interface. Advances in Colloid andInterface Science. 255, 84-93 (2018).

G. Hwang, A. J. Paula, E. E. Hunter, Y. Liu, A. Babeer, B. Karabucak, K. Stebe, V. Kumar, E. Steager, H. Koo, Catalytic antimicrobial robots for biofilm eradication. Sci. Robot. 4, eaaw2388 (2019).

G. P. Alexander, B. G. Chen, E. A. Matsumoto, R. D. Kamien, Colloquium : Disclination loops, point defects, and all that in nematic liquid crystals. Rev. Mod. Phys. 84, 497-514 (2012).

Global TFT-LCD Display Panel Market Report and Forecast 2022-2027, (available at https://www.expertmarketresearch.com/reports/tft-lcd-market).

H. Stark, Physics of colloidal dispersions in nematic liquid crystals. Physics Reports. 351, 387-474 (2001).

H. Wang, V. Prasad Sivan, A. Mitchell, G. Rosengarten, P. Phelan, L. Wang, Highly efficient selective metamaterial absorber for high-temperature solar thermal energy harvesting. Solar EnergyMaterials and Solar Cells. 137,235-242 K2015).

L Musevic, Liquid Crystal Colloids (Springer International Publishing, Cham, 2017 http://link.springer.com/10.1007/978-3-319-54916-3), Soft andBiological Matter.

L Musevic, M. Skarabot, U. Tkalec, M. Ravnik, S. Zumer, TwoDimensional Nematic Colloidal Crystals Self-Assembled by Topological Defects. Science. 313, 954-958 (2006).

J. B. Rovner, D. S. Borgnia, D. H. Reich, R. L. Leheny, Elastic and hydrodynamic torques on a colloidal disk within a nematic liquid crystal Phys Rev. E 86, 041702 (2012).

J. C. Loudet, P. Poulin, Application of an Electric Field to Colloidal Particles Suspended in a Liquid-Crystal Solvent. Phys. Rev. Lett. 87, 165503 (2001).

J. Elgeti, R. G. Winkler, G. Gompper, Physics ofmicroswimmers—single particle motion and collective behavior: a Yeview. Rep. Prog. Phys. 78, 056601 (2015).

\* cited by examiner

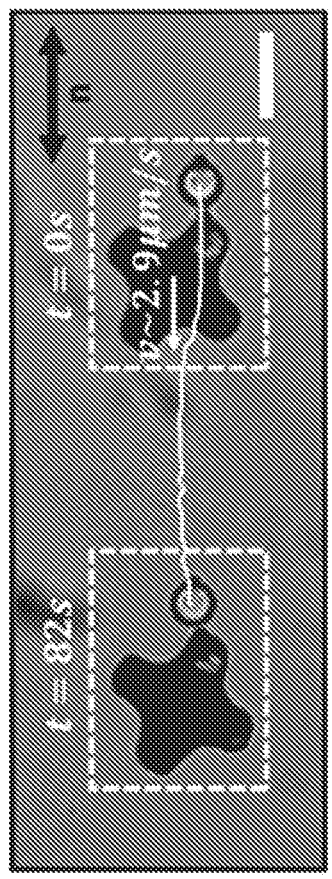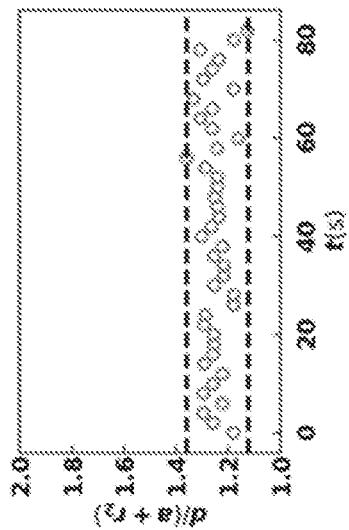
FIG. 3A
FIG. 3B

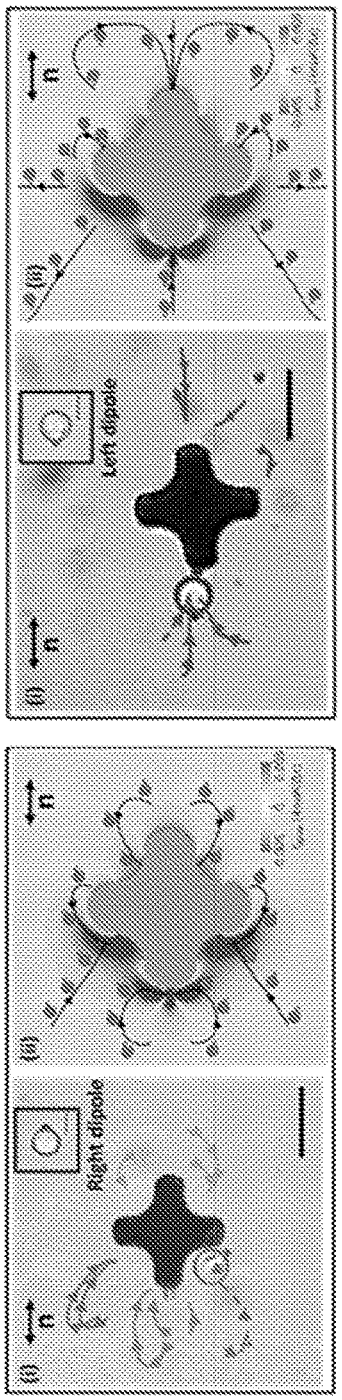
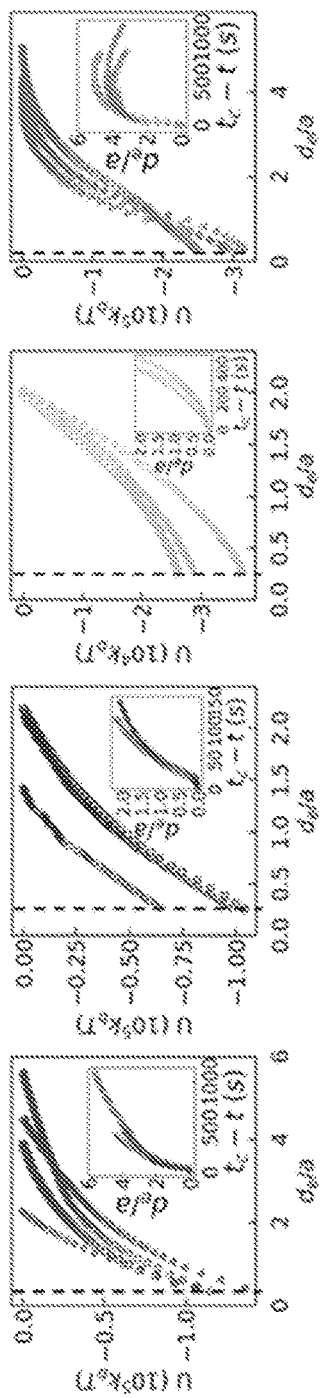

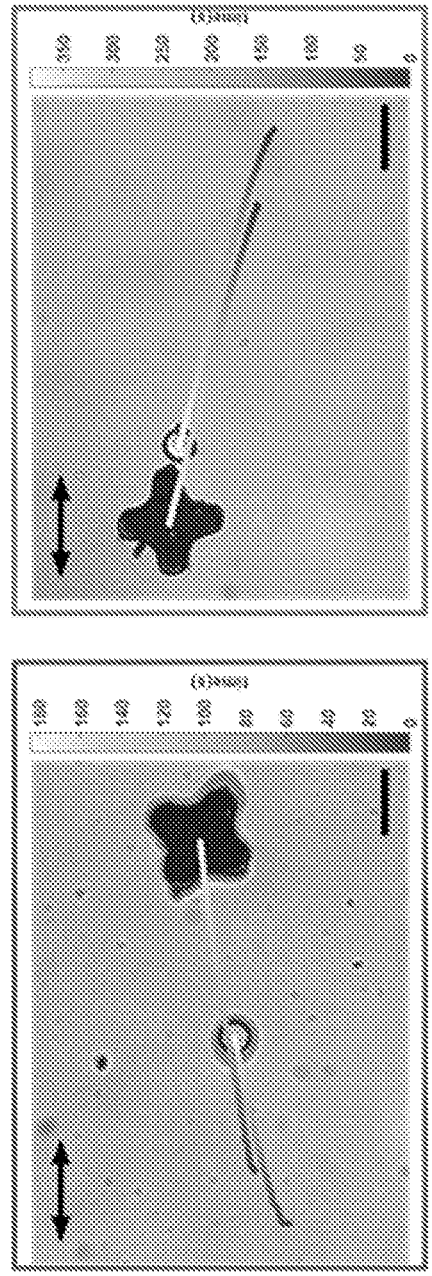
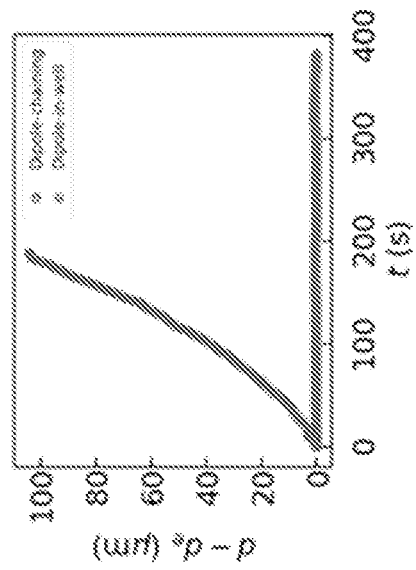
FIG. 20A
FIG. 20B
FIG. 20C

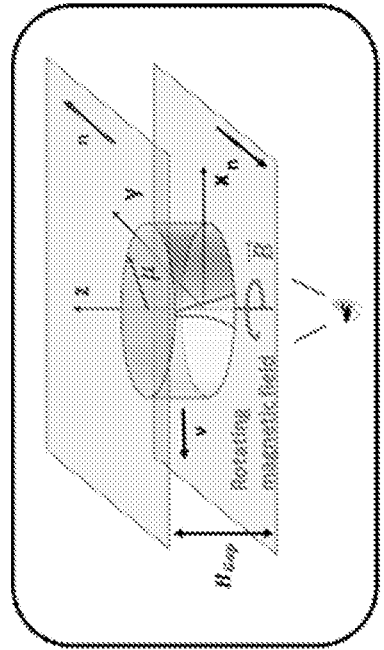
FIG. 22B
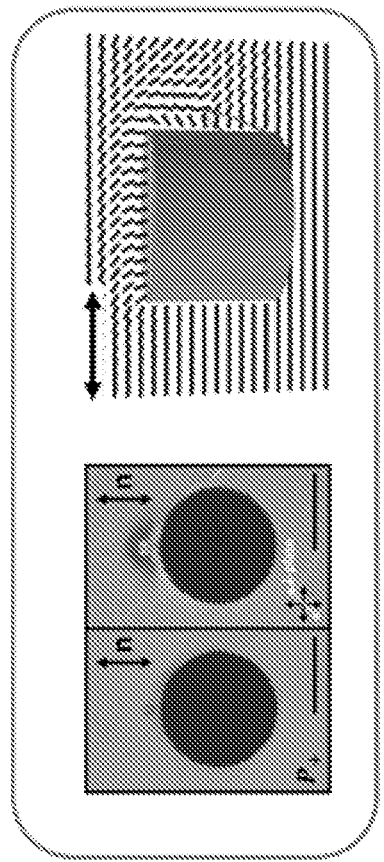
FIG. 22A
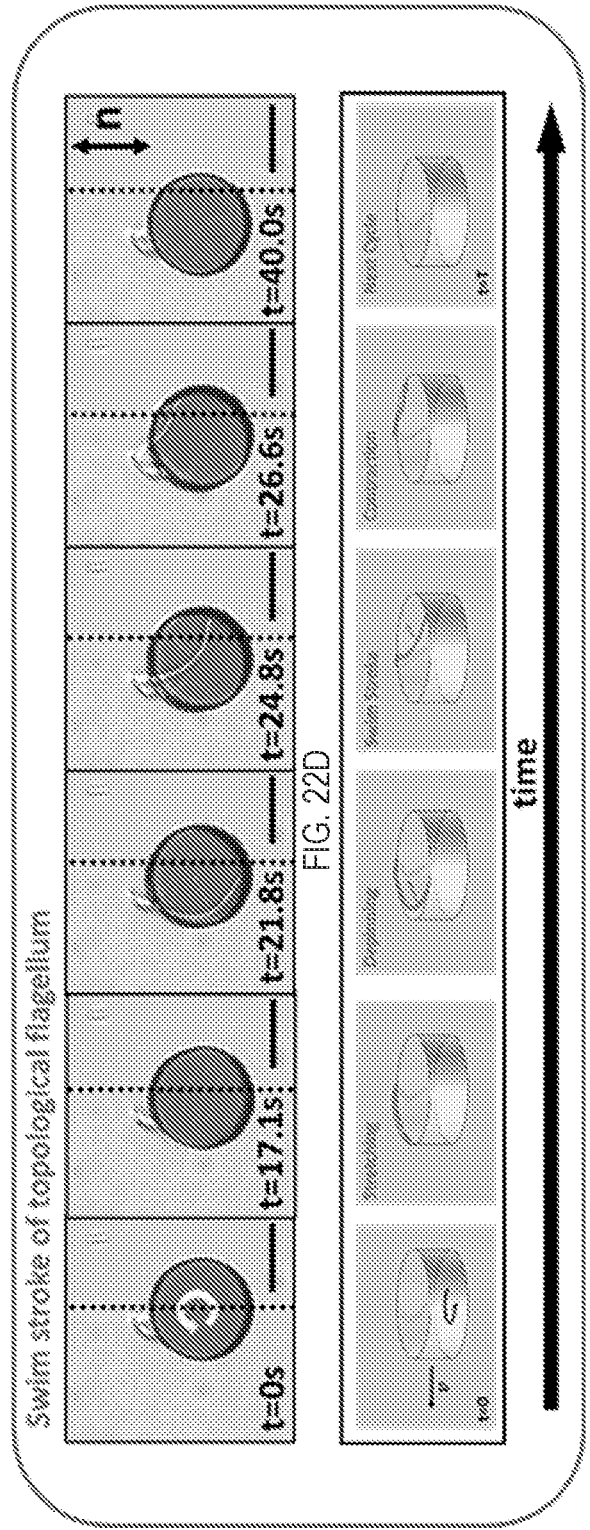
FIG. 22C
FIG. 22D
FIG. 22E

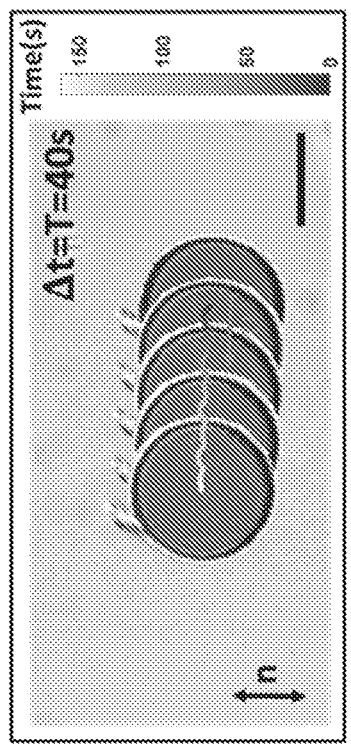
FIG. 23A
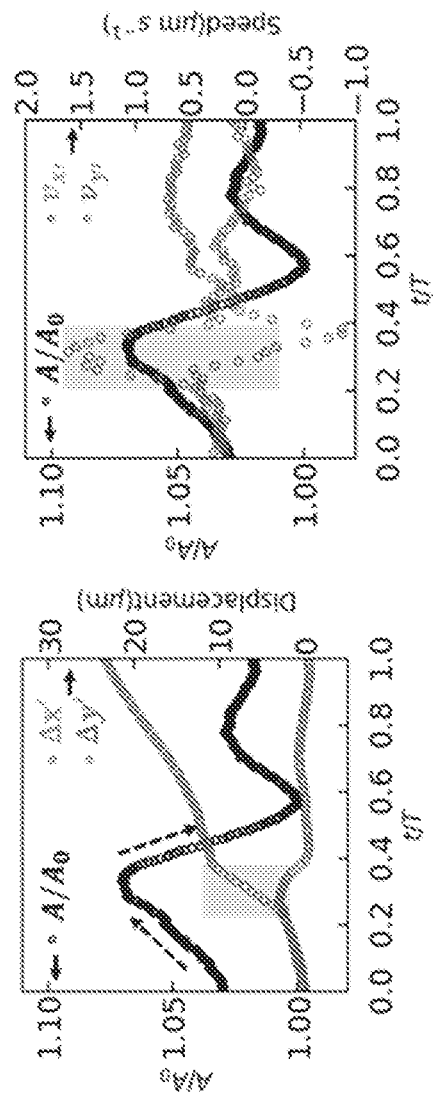
FIG. 23B
FIG. 23C

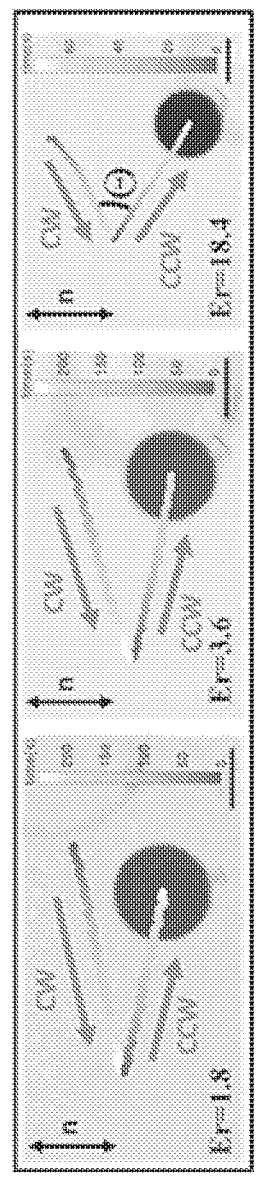
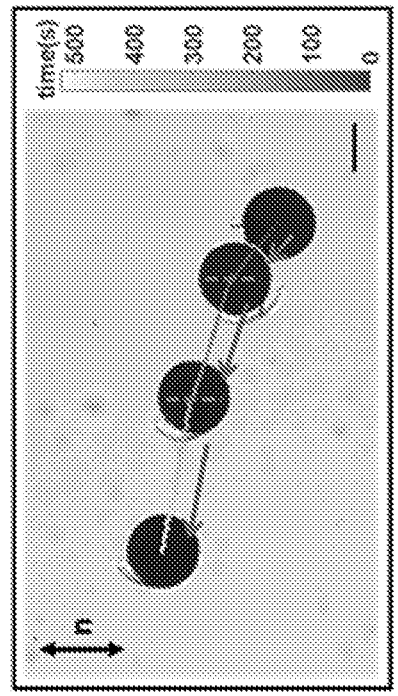
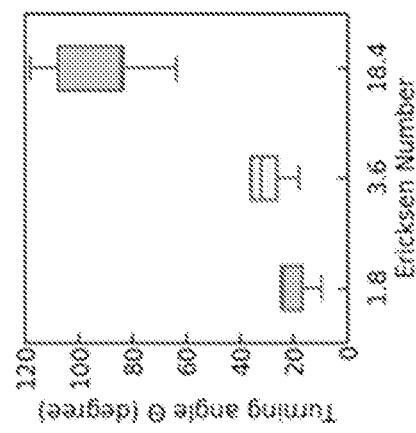
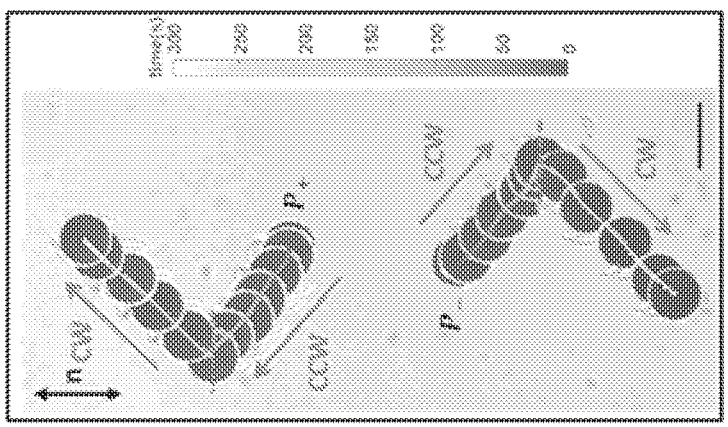
FIG. 25A
FIG. 25B
FIG. 25C
FIG. 25D

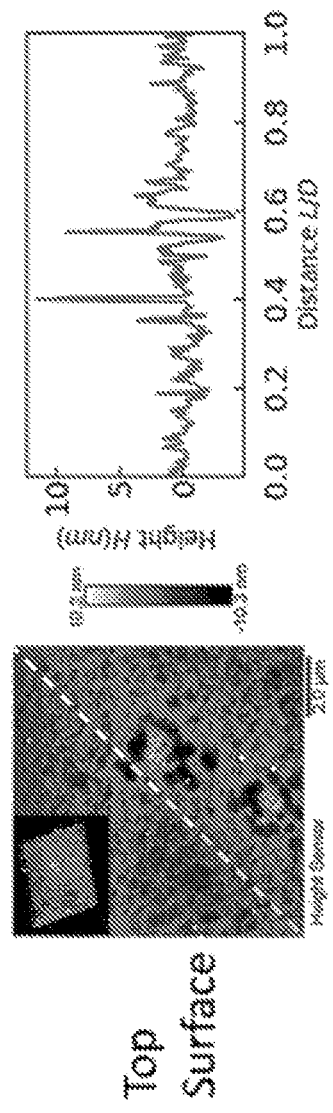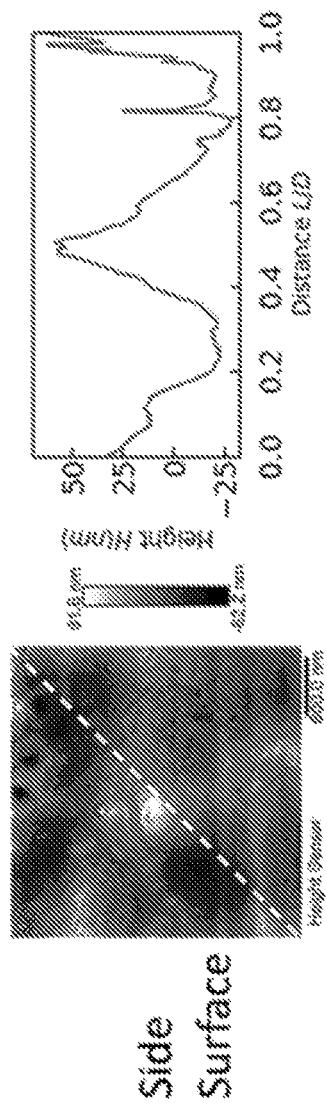
FIG. 40A  FIG. 40B
FIG. 40C  FIG. 40D

ACTIVE NEMATIC COLLOIDS IN MICROROBOTICS

CROSS-REFERENCE TO RELATED APPLICATIONS

The present application claims priority to and the benefit of U.S. patent application No. 63/193,032, "Active Nematic Colloids In Microrobotics" (filed May 25, 2021), the entirety of which application is incorporated herein by reference for any and all purposes.

GOVERNMENT RIGHTS

This invention was made with government support under W911NF-16-1-0288 awarded by the Army. The government has certain rights in the invention.

TECHNICAL FIELD

The present disclosure relates to the field of colloids and to the field of liquid crystals.

BACKGROUND

Active colloids, which can move under the action of external fields or can be self-propelled, offer important degrees of freedom in directed assembly and micromanipulation of colloidal particles. Diverse external fields are used to drive active colloidal motion, including fields of electromagnetic origin. Self-propelled colloids are colloids that consume fuel to move are another means of active colloids motion.

Nematic colloids concern particles immersed in confined nematic liquid crystals (NLCs). Immersion in NLC enables rich interactions owing to elasticity and topology absent for particles in isotropic fluids. In general, nematic colloids interact via distortions that they make in the director field; these distortions generate elastic energy penalties. Colloids interact to minimize these elastic energy penalties and reduce distortion in the director field. These interactions can take several forms. Colloids interact with neighboring colloids to minimize the distortion in the director field. The range and strength of the interactions depends on the type of topological defects formed around colloids (dipole chaining, quadrupole interactions). Typically, these interactions are very strong, and particles, once assembled, are di-assembled only by going into the isotropic state to eliminate the elastic interactions.

Colloids interact with walls or boundaries that generate distortions in the director field. These distortions occur because of boundary anchoring conditions (e.g., repulsion from a planar wall), boundary shape (e.g., repulsion or attraction via lock-and-key interactions) or because of patterned boundary anchoring conditions on the wall that dictate the formation of distortions in the director near the wall. Colloids also interact with defects that can be deliberately positioned at particular location in the domain, including, for example, at sharp edges, and at sites where the anchoring conditions change steeply. Typically, colloid-defect or colloid-disclination line is very high, and colloids attracted to and attached to these disclination lines become trapped. Accordingly, there is a long-felt need in the art for improved nematic colloid compositions and related methods.

SUMMARY

Provided here are develop active colloids as microrobots for dynamic manipulation of passive colloids. The disclosed microrobots (1) can have shapes designed to promote lock and key interactions; and (2) can also have anchoring conditions designed to form disclination lines attached to the active colloid. The disclosed technology addresses driven nematic colloids (microrobots) in isolation and also in interaction with passive active colloids.

In meeting the described long-felt needs, the present disclosure provides a composition, comprising: a nematic colloid, the nematic colloid comprising a nematic liquid crystal and a key colloid; and a lock colloid, the lock colloid optionally being symmetric about an axis, the lock colloid being configured for assembly with the key colloid of the nematic colloid, the assembly optionally being mediated by a dipole interaction between the colloid and the lock colloid, by a disinclination line of the nematic colloid, or any combination thereof.

Also provided are methods, comprising applying an external field to a composition according to the present disclosure (e.g., any one of Aspects 1-10).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various aspects discussed in the present document. In the drawings:

FIGS. 3A and 3B illustrate cargo carrying. FIG. 3A provides a time-stamped image of cargo-carrying from t=0s to t=82s via dipole chaining configuration. Scale bar is 50 μm. FIG. 3B provides normalized center-to-center distance as a function of time; d indicates the distance between centers of arm tip and the assembled colloid.

FIG. 5A—Time-stamped image of releasing of an assembled passive colloid near a wavy wall. Scale bars are 50 μm. FIG. 5B and FIG. 5C are examples of colloidal structures built through our approach: a colloidal chain of 7 colloids (FIG. 5B) and adjacent chains of 1, 2 and 3 colloids (FIG. 5C). Scale bars are 50 μm.

FIG. 9A provides (i) boomerang and (ii) tri-armed lock particles of differing angles between arms to frustrate defect rotational dynamics. One can introduce features including (FIG. 9B) grooves, and (FIG. 9C) so-called "fractal" structures to seed geometrically stabilized defect pairs. Upon rotation or translation these can yield rich dynamics.

DETAILED DESCRIPTION OF ILLUSTRATIVE EMBODIMENTS

Figure 1:
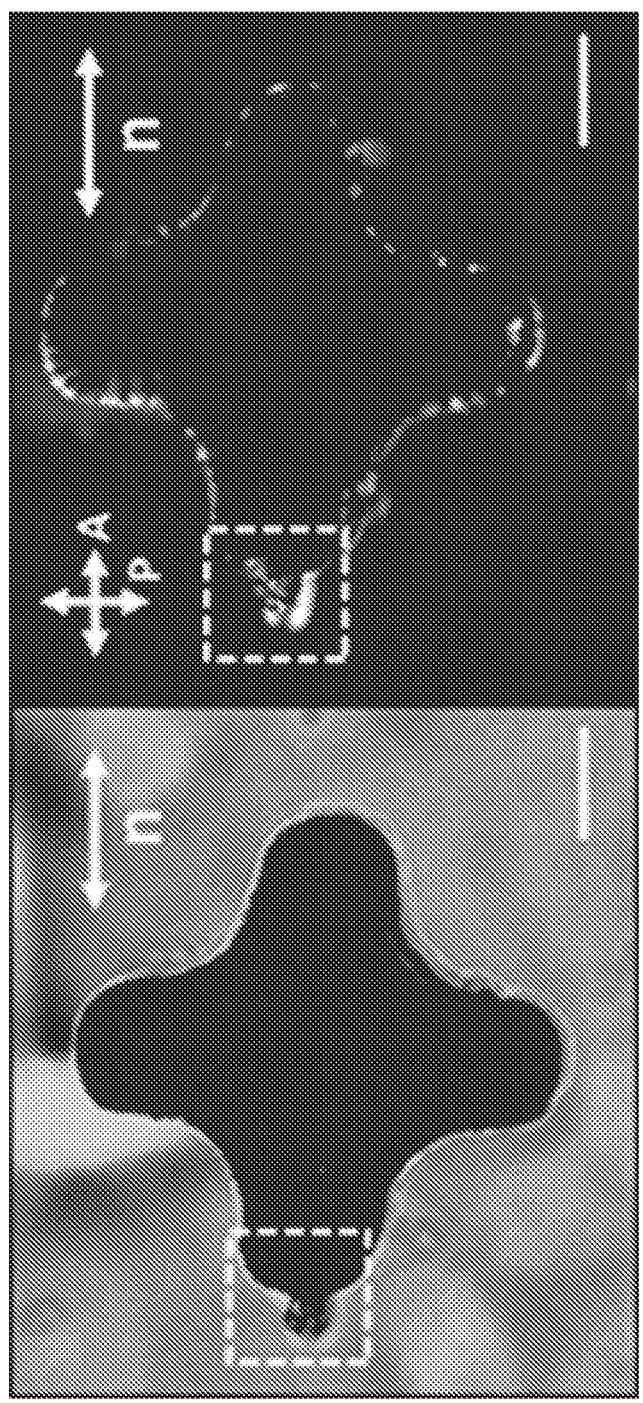
FIG. 1 provides bright field (left) and cross polarizing (right) microscopic images of an example multi-armed microrobot. Scale bar is 20 μm.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

Lock and Key Microrobotics

Provided herein are, inter alia, a multi-armed magnetic microrobots (also termed lock colloids, in some instances) with companion defects useful to manipulate a passive nematic colloid, as shown in FIG. 1. This microrobot can have a companion dipolar defect on one of its arms aligned with the far-field director field and can interact with passive colloids in nematic liquid crystals.

Figure 2:
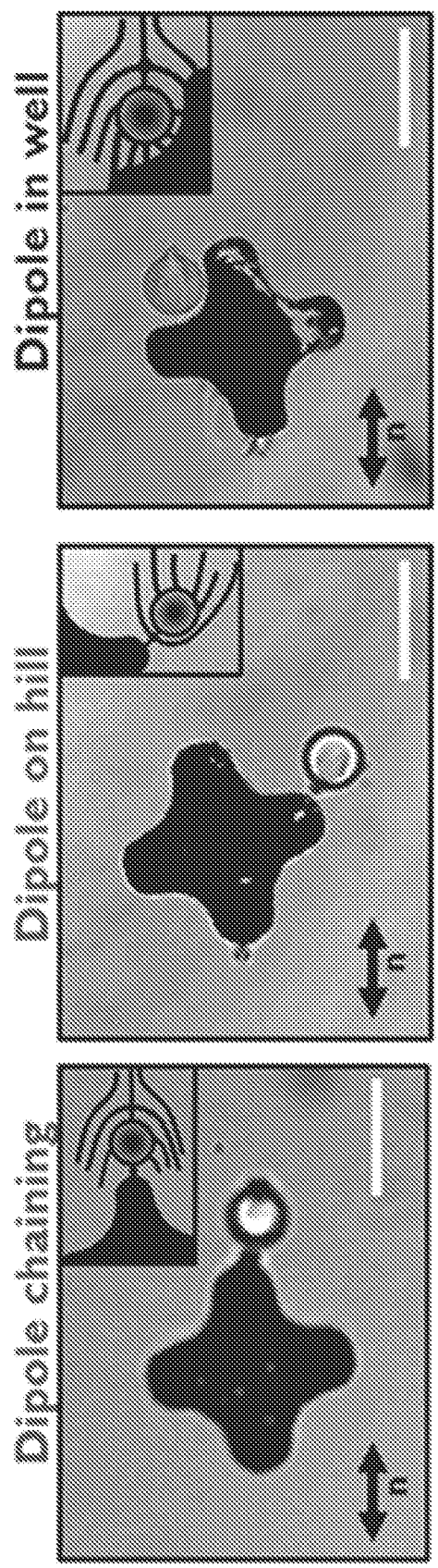
FIG. 2 illustrates directed assembly of passive colloids with dipolar defect. Passive colloids with dipolar defect can be assembled in three different configurations: (1) dipole chaining (left) (2) dipole on hill (middle) and (3) dipole in well (right). Scale bars are 50 μm.

To date, the disclosed technology has shown the following:

A microrobot according to the present disclosure can interact with colloids in, e.g., a Saturn ring or dipolar defect configuration. They can assemble in multiple configurations. For example, passive colloids with dipolar defects can assemble in three different configurations referred as: (1) dipole chaining, (2) dipole on hill, and (3) dipole in well, all of which are shown in FIG. 2. Without being bound to any particular theory or embodiment, passive colloids with a Saturn ring defect can assemble in the well.

After passive colloids (also termed key colloids) are assembled on the microrobot, they can be carried as cargo and translate together with the microrobot under an external field (e.g., a magnetic field) as shown in FIG. 3.

Assembled colloids can be released from the microrobot through rotation as it disturbs the director field around the microrobot.

Assembled colloids can be delivered to other attractive sites in a domain, e.g., a wavy well structure. After a key colloid is released from the microrobot (lock colloid), the key colloid can migrate to those static attractive sites. By repeating the capture, transport and delivery process, multi-element colloidal structures such as lattices and chains can be built using this disclosed approach, as shown in FIG. 5.

Disclination Lines as a Tool for Robotic Assembly and Motion

As described herein, one can deliberately introduce disclination lines that are attached to mobile colloids in nematic liquid crystals. When the colloids move under an external field, the disclinations elongate, with complex dynamics. One can develop these disclination lines as tools to drive active colloid motion and to interact with passive colloids.

Colloid microrobot interactions (e.g., lock and key interactions, and dipole chaining interactions) are very high in energy; colloids are typically trapped once attached to the robot, and cannot leave by thermal motion or by forcing with external fields.

However, the disclination line on the particle provides a release mechanism. Passive colloids docked near the microrobot can be released upon microrobot rotation. This allows cargo to be captured, transported, and released to form structures. Typically, disclination lines in passive systems trap colloids. These far from equilibrium dynamics that result in repulsion are new. (FIG. 6; this involves disclination line dynamics.)

The disclination lines on the microrobot and defects on the passive colloids can merge (shown in FIG. 6) and re-separate in far from equilibrium interactions. Because defects and disclination lines can be loaded with molecular cargo, this merging and re-separating can be used to distribute this molecular cargo between the microrobot and passive colloids.

Figure 7:
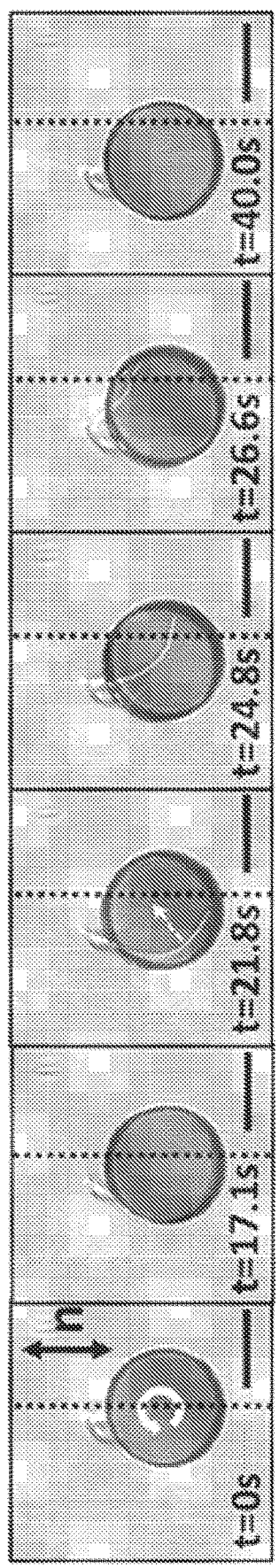
FIG. 7 provides time stamped images of a rotating disk colloid performing a 'swim stroke' in nematic liquid crystals within one period of rotation (T=40s). black dash line indicates the initial center position of the colloid. Scale bars are 50 μm.

Under rotation, the disclination line on the microrobot moves in a complex manner over the robot surface, performing a "swim stroke" as shown in FIG. 7. This swim stroke translates the microrobot in directions related to its defect configuration, its shape, and its rate of rotation. This feature allows one to control motion of small colloids that would otherwise be inaccessible, e.g., by magnetic fields. For example, small ferromagnetic particles are more easily rotated in magnetic fields than translated along field gradients, as it is difficult to generate gradients that are significant over the length scale of the colloid.

Figure 8:
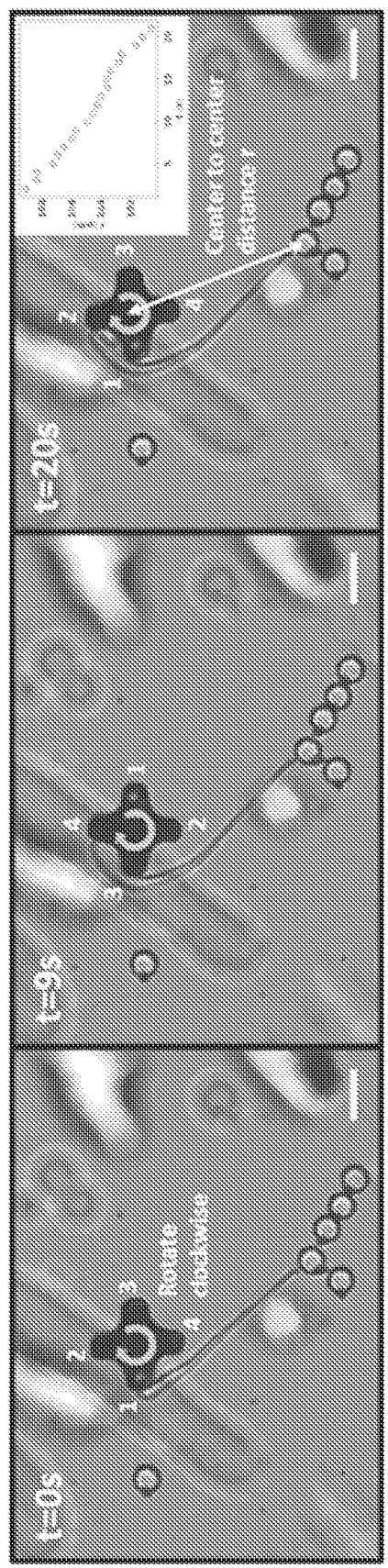
FIG. 8 illustrates cargo towing—as shown, extended defect collects particles, which are reeled-in by lock particle rotation. Inset: center to center distance r versus time. Scale bars are 50 μm.

In addition, disclination lines can be used to tow colloid assembly, as illustrated in FIG. 8.

Further Disclosure

Disclination lines allow one to develop strong interactions with colloids at arbitrary sites in the domain. There are several types of disclination lines, including those that carry a winding number of ½, -½, 0, with or without twist. The dynamics of these various types can differ. With understanding of the topology of the disclinations, one can control which type is formed and how they behave.

Although ferromagnetic microrobots are described here, it should be understood that disclination line dynamics can also be generated on self-propelled microrobots. Further, molecular cargo transfer can be accomplished by dynamic merger and separation of disclination and defect on robot and passive particle.

Although the data shown here are illustrated with microrobots with far from equilibrium disclinations with disk shapes and multi-armed shapes, one can also introduce other features (e.g., as shown in FIG. 9) to deliberately seed defects and disclinations on the structure. Such features can include, without limitation, fractal shapes, corners, re-entrant features, the like to dictate disclination line location and dynamics. Likewise, although the results presented here were obtained in confined systems between two parallel plates and examined in-plane motion, other systems can be used, and less confined systems allow out-of-plane motion, moving from quasi-2D systems to additional degrees of freedom. A lock colloid can be symmetric about 1 or more axes, but this is not a requirement.

FIGURES

The attached figures are illustrative only and do not limit the scope of the present disclosure or the appended claims.

FIG. 1 provides bright field (left) and cross polarizing (right) microscopic images of multi-armed microrobot. Scale bar is 20 µm.

FIG. 2 illustrates directed assembly of passive colloids with dipolar defect. Passive colloids with dipolar defect can be assembled in three different configurations: (1) dipole chaining (left) (2) dipole on hill (middle) and (3) dipole in well (right). Scale bars are 50 µm.

FIGS. 3A and 3B illustrate cargo carrying. FIG. 3A provides a time-stamped image of cargo-carrying from t=0s to t=82s via dipole chaining configuration. Scale bar is 50 µm. FIG. 3B provides normalized center-to-center distance as a function of time. d indicates the distance between centers of arm tip and the assembled colloid.

Figure 4:
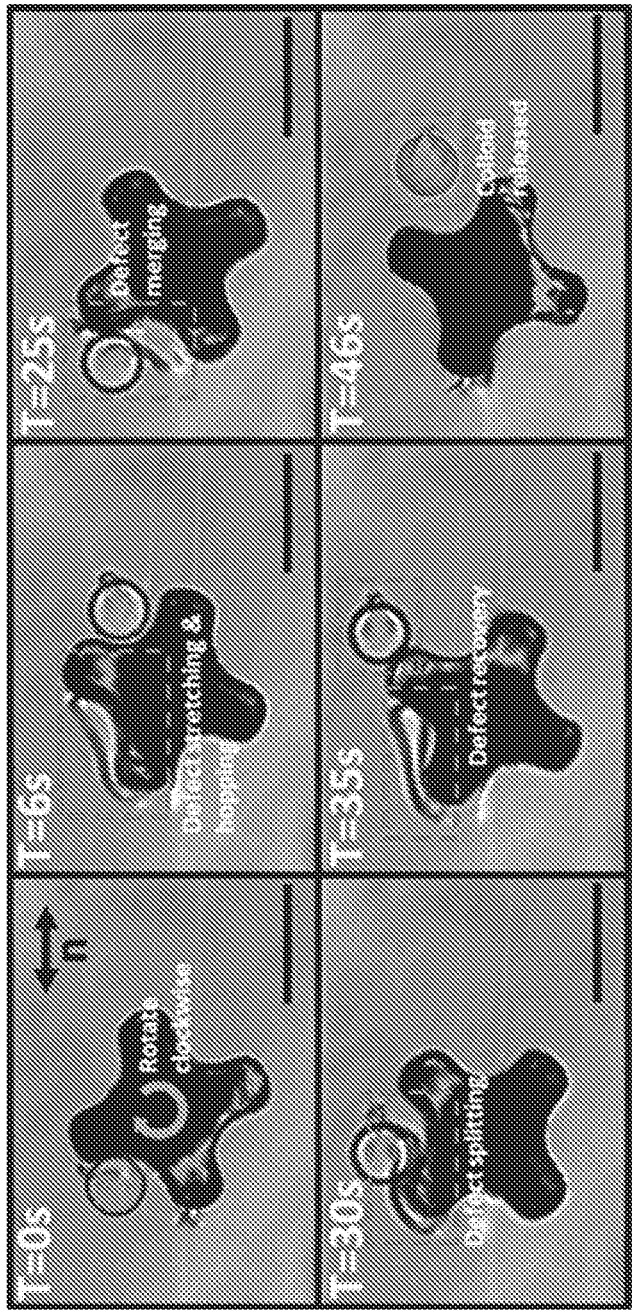
FIG. 4 provides a time-stamped image of desired released of assembled passive in bulk NLCs via rotational motion of the microrobot and dynamic defect interaction. Scale bar is 50 μm.

FIG. 4 provides a time-stamped image of desired released of assembled passive in bulk NLCs via rotational motion of the microrobot and dynamic defect interaction. Scale bar is 50 µm.

Figure 5A:
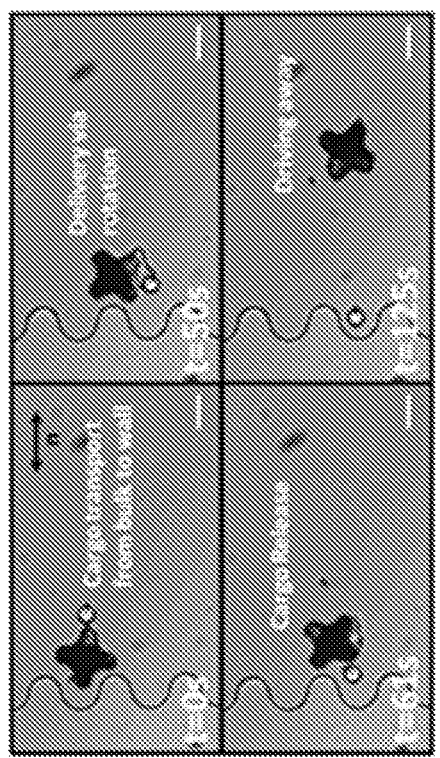
FIGS. 5A-5C illustrate construction of colloidal structures.
Figure 5C:
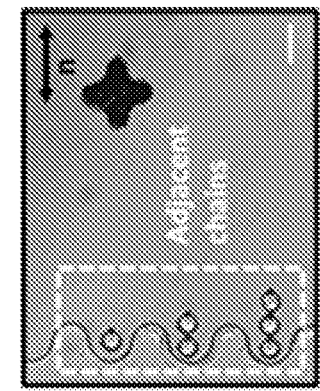
Figure 5B:
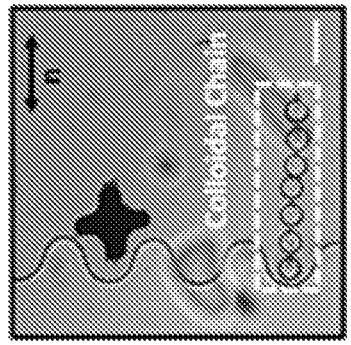

FIGS. 5A-5C illustrate construction of colloidal structures. FIG. 5A—Time-stamped image of releasing of an assembled passive colloid near a wavy wall. Scale bars are 50 µm. FIG. 5B and FIG. 5C are examples of colloidal structures built through our approach: a colloidal chain of 7 colloids (FIG. 5B) and adjacent chains of 1, 2 and 3 colloids (FIG. 5C). Scale bars are 50 µm.

Figure 6:
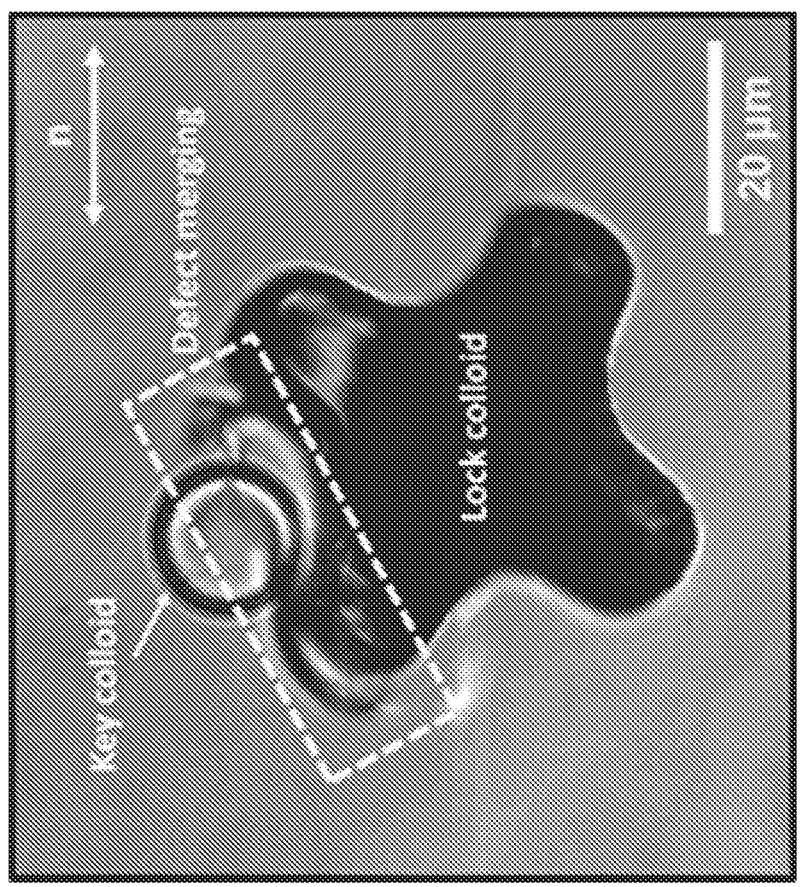
FIG. 6 illustrates defect sharing of bound and rotated lock particles.

FIG. 6 illustrates defect sharing of bound and rotated lock particles.

FIG. 7 provides time stamped images of a rotating disk colloid performing a 'swim stroke' in nematic liquid crystals within one period of rotation (T=40s). The black dash line indicates the initial center position of the colloid. Scale bars are 50 µm.

FIG. 8 illustrates cargo towing—as shown, extended defect collects particles, which are reeled-in by lock particle rotation. Inset: center to center distance r versus time. Scale bars are 50 µm.

Figure 9B:
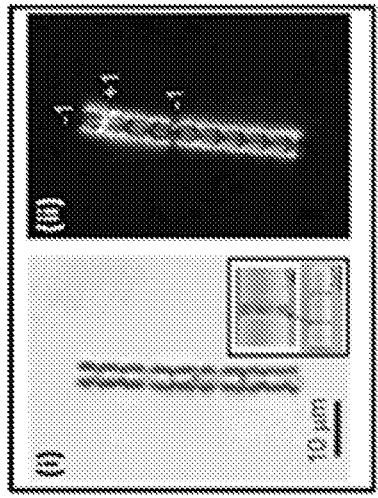
FIGS. 9A-9C provide additional geometries and features for driven lock particle.
Figure 9A:
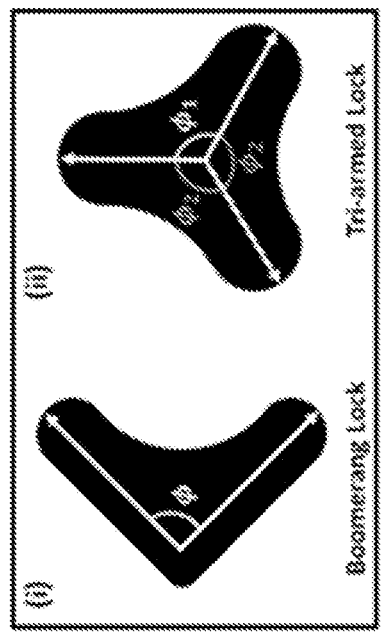
Figure 9C:
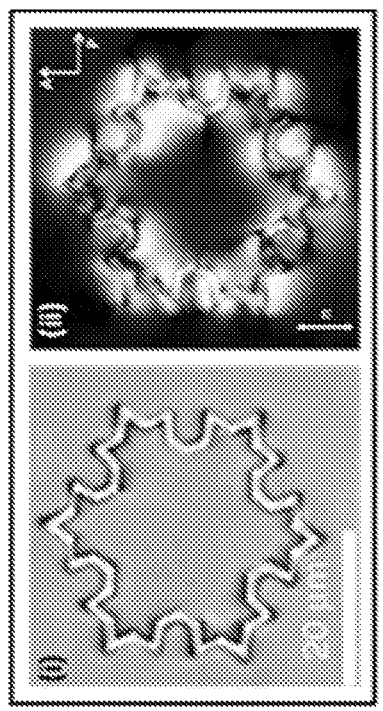

FIGS. 9A-9C provide additional geometries and features for driven lock particle. We will explore (FIG. 9A) (i) boomerang and (ii) tri-armed lock particles of differing angles between arms to frustrate defect rotational dynamics. We will introduce features including (FIG. 9B) grooves (image adapted from Nikkhou et al.) and (FIG. 9C) so-called "fractal" structures (image adapted from Hashemi et al.) to seed geometrically stabilized defect pairs. Upon rotation or translation these should yield rich dynamics.

Figure 10A:
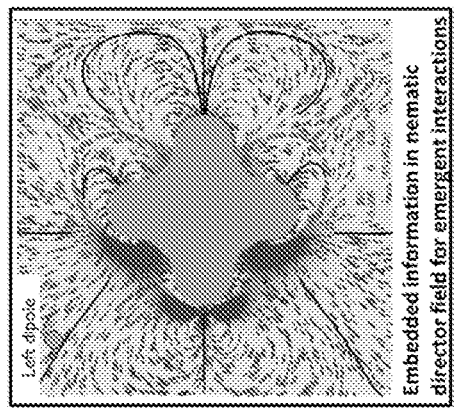
Figure 10B:
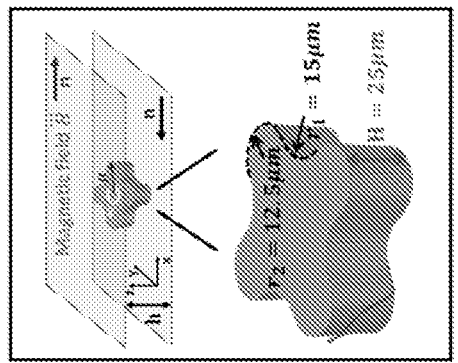
Figure 10C:
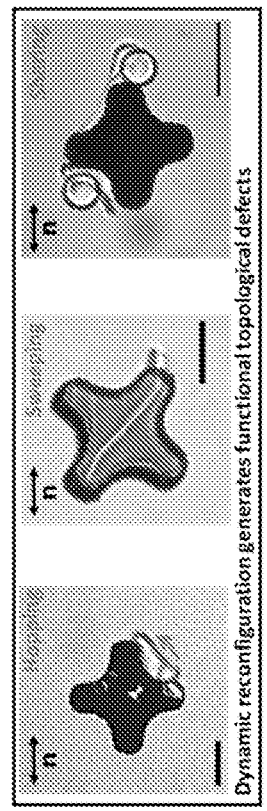

FIGS. 10A-10C. Physically intelligent magnetic micro-robot in nematic liquid crystals (NLCs). (10A) Schematic of the micro-robot in a planar cell filled with NLCs. n denotes the rubbing direction. The thickness of the cell is denoted as h and ~50 µm for this study. $r_1$=15 µm and $r_2$=12.5 µm denote the curvature of the micro-robot whose thickness is H~25 µm. (10B) Emergent force field (green vector field) on a colloid with a left-facing companion defect near the micro-robot due to the embedded nemato-elastic energy landscape. The magenta lines indicate separatrices in the force field, indicating complex boundaries between different modes of interaction. (10C) Far-from-equilibrium defect dynamics, including hopping, sweeping and sharing with colloidal cargo provide dynamic functionalities for micro-robot and cargo manipulation. Scale bars are 50 μm.

Figure 11C:
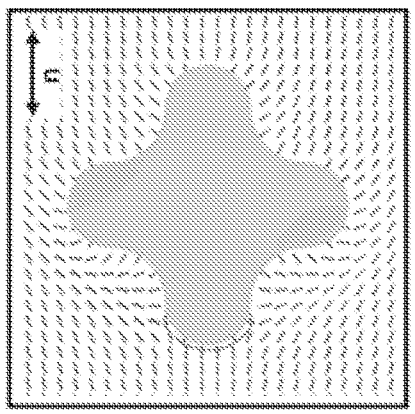
Figure 11B:
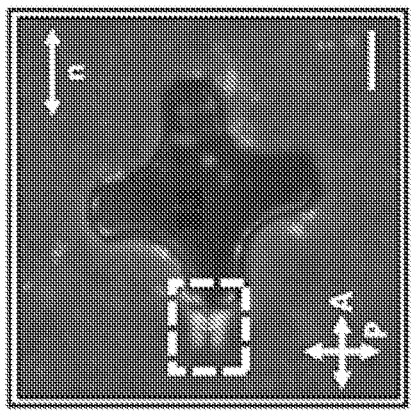
Figure 11A:
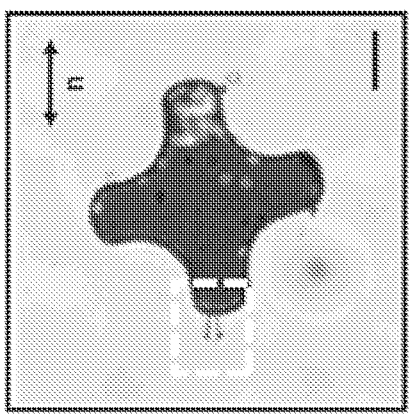

FIGS. 11A-11C. Static dipolar defect structure. Static dipolar defect structure of the 4-armed micro-robot under bright field microscopy (11A), crossed polarization microscopy (11B) and in numerical simulation (11C). The far-field director is along the horizontal direction indicated by the double headed arrows and the scale bars are 20 μm.

FIGS. 12A-12K. Assembly of colloids by nemato-elastic force field around the 4-armed micro-robot. Microscopic images of different assembly configurations: dipole-chaining (12A), zig-zag dipoles (12B), dipole-on-hill (12C), dipole-in-well (12D) and hybrid (12E) configurations around the 4-armed micro-robot. (12F), (12G) Summary of the experimentally observed colloid trajectories (left) and corresponding numerical predictions (right) in the micro-robot fixed frame are shown for right-facing companion hedgehog defects (12F) and left-facing companion hedgehog defects (12G) shown in the insets. Trajectories of different colors represent different final assembly configurations: dipole-chaining (red), zig-zag dipoles (orange), dipole-on-hill (purple), dipole-in-well (blue) and hybrid (blue) configurations. The dashed curves indicate trajectories of the colloids in the present FIGS. (12H)-(12K) Strengths and ranges of interactions of the assembly modes; here, different symbols in each plot indicate different observations. The selection among different modes, and the deviations between different trajectories are mainly caused by different initial relative positions of the micro-robot and colloid. The insets to (12A)-(12E) show schematics of the director fields around the colloids and the insets in (12H)-(12K) shows the strengths of the attractive interactions, respectively. Scale bars are for the insets in (12F) and (12G) and are 50 μm otherwise.

Figure 13A:
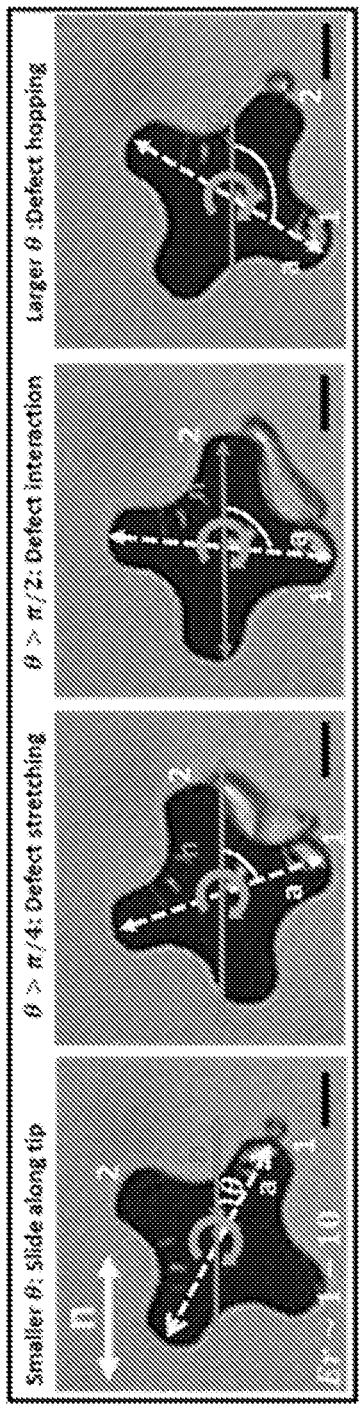
Figure 13B:
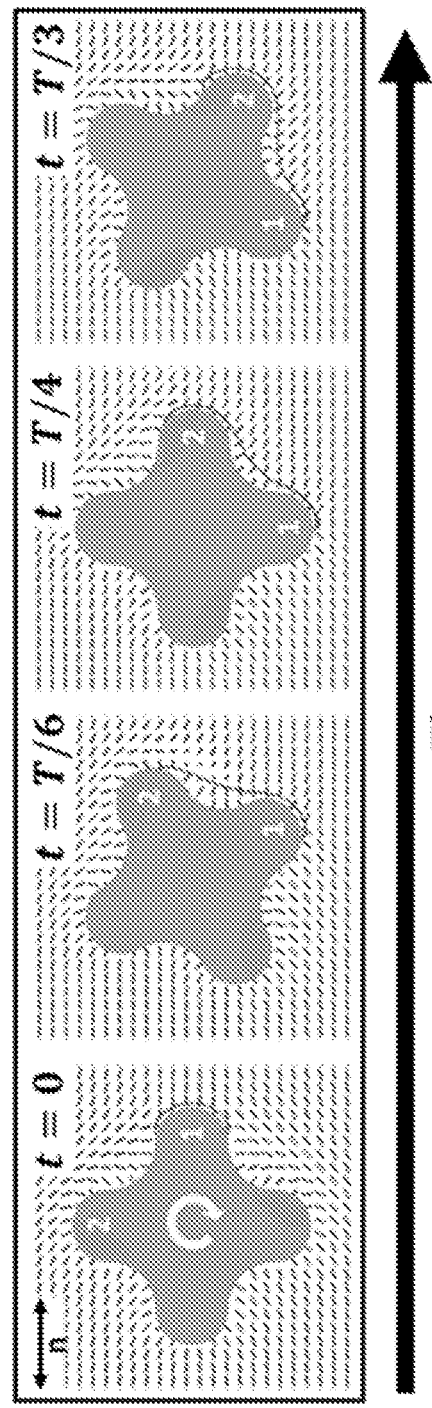

FIGS. 13A-13B. Defect hopping around the 4-armed micro-robot. The defect exhibits a hopping instability. (13A) Experimental time-series images of defect hopping from one arm (labeled as 1) to another arm (labeled as 2) of the 4-armed micro-robot during a clockwise rotation. θ indicates the angle between the director (red arrow) and the diagonal (dashed yellow arrow) of the micro-robot. Scale bars are. (13B) Time-series images of numerical simulation of the dipolar disclination loop defect hopping between the two arms of the 4-armed micro-robot (labeled as 1 and 2) during clockwise rotation. The red curves represent for the companion topological defect.

Figure 14A:
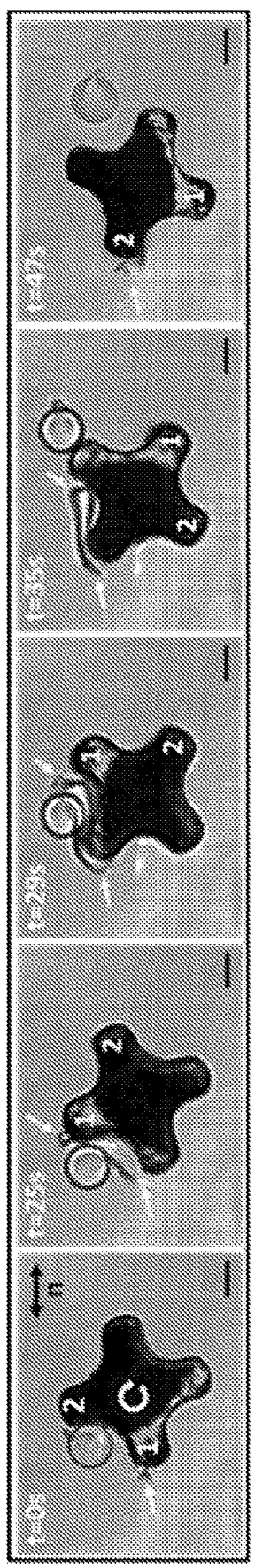
Figure 14B:
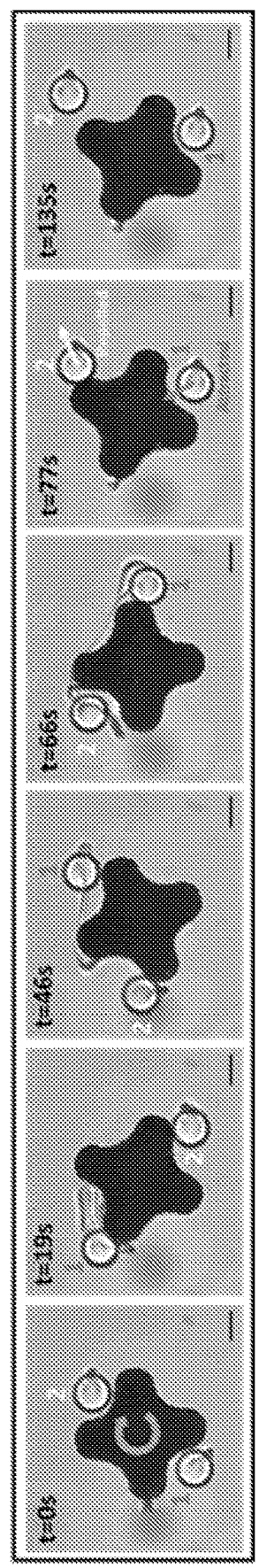

FIGS. 14A-14B. Cargo juggling and release. (14A) Time-stamped images of cargo release of an assembled colloid between two arms of the micro-robot (labeled as 1 and 2) during clockwise rotation via dynamic defect interaction. The yellow arrows indicate the location of the (elongated) disclination loop of the micro-robot. (14B) Time-stamped images of cargo juggling of two colloids (labeled as 1 and 2) during clockwise rotation of the micro-robot via dynamic defect interaction. Scale bars are 20 μm.

FIGS. 15A-15D. Micro-robotic directed assembly of colloidal building blocks. (15A) Time-stamped images of micro-robotic delivery of colloidal building block near a wavy wall exploiting top-down and bottom-up interactions. (15B)-(15D) Examples of colloidal structures built using our approach include a 1D colloidal lattice (15B), a chain of 7 colloids (15C) and an anisotropic structure resembling the signal intensity symbol on cell phones (15D). Scale bars are 50 μm.

Figure 16A:
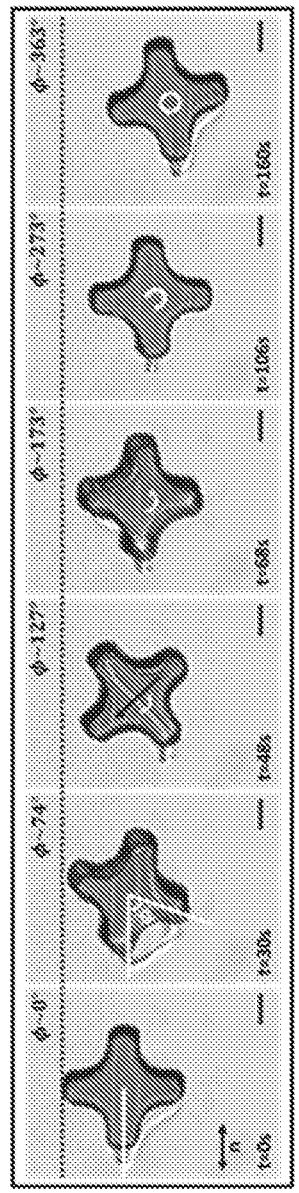
Figure 16C:
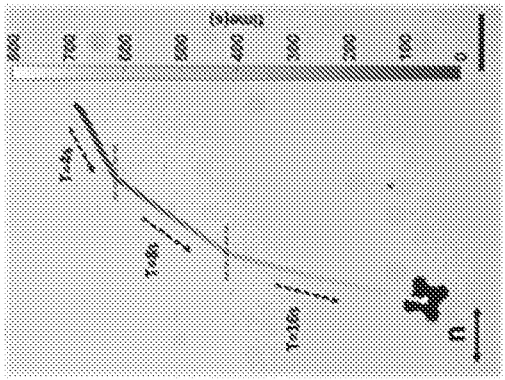
Figure 16B:
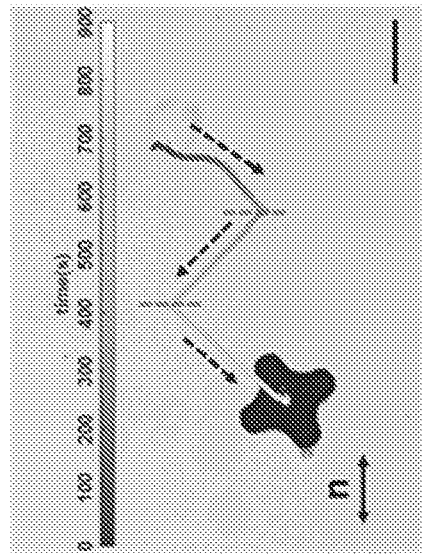

FIGS. 16A-16C. Defect-propelled micro-robot swimming and trajectory planning. (16A) Time-stamped images of defect-propelled swimming of the micro-robot under a clockwise rotating external field of. Besides hopping, a disclination line sweeps across the surface of the micro-robot along the direction, shown by the black arrow in the frame at, which propels the micro-robot. The black dashed line across all frames indicates the initial top arm tip position of the micro-robot. Trajectory planning of the micro-robot: (16B) A N-shaped trajectory of the micro-robot achieved by reversing the sense of rotation of the external field at the locations indicated by the red dashed lines. The initial field is rotating counterclockwise with a period. (16C) A curved trajectory of the micro-robot achieved by tuning the period of the external field from to and then from to after 10 periods at the locations indicated by the red dashed lines, respectively. For both (16B) and (16C), the black dashed arrows indicate the direction of the translation and the colored curved indicates the trajectory of the micro-robot as a function of time. Scale bars are in (16A) and (16B) and is in (16C).

Figure 17:
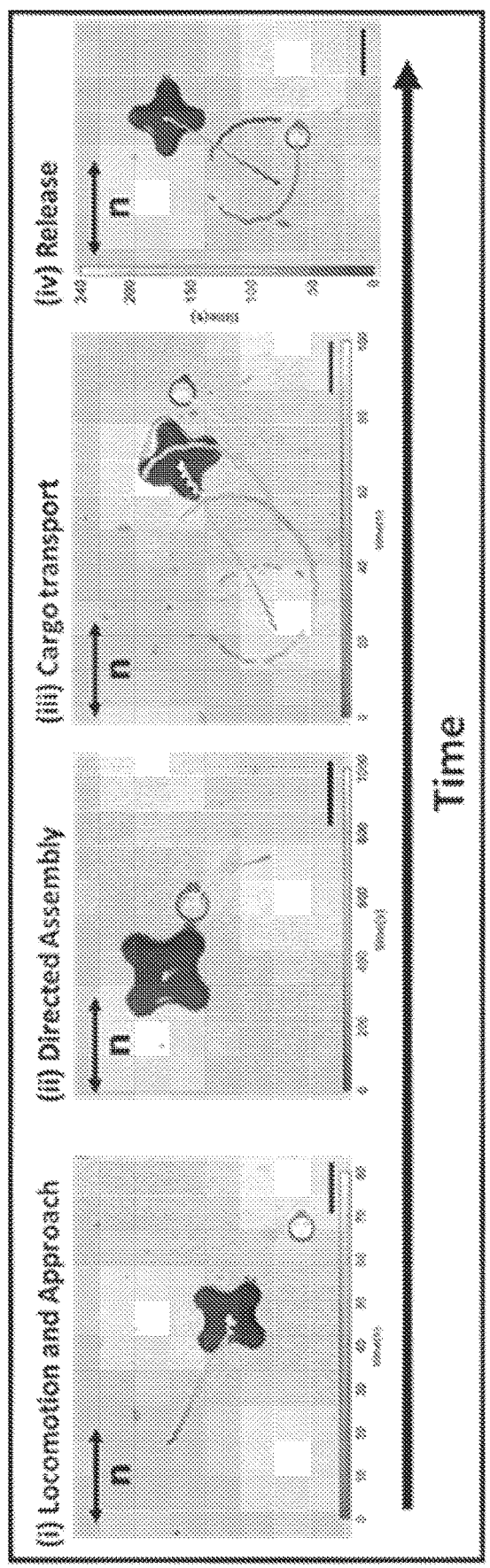

FIG. 17. Fully autonomous cargo manipulation. Fully autonomous cycle of cargo manipulation using our nematic micro-robot. Scale bars are 50 μm.

Figure 18C:
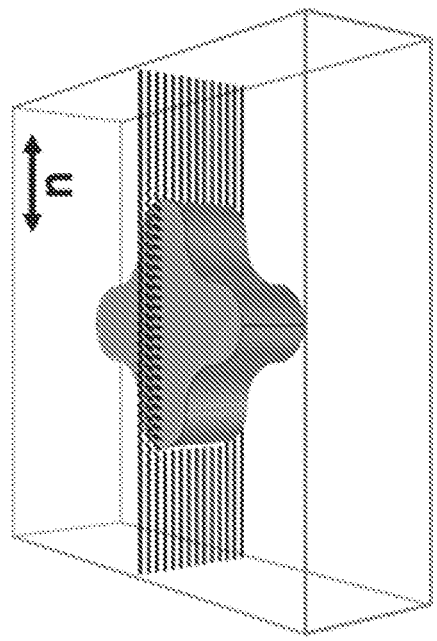
Figure 18B:
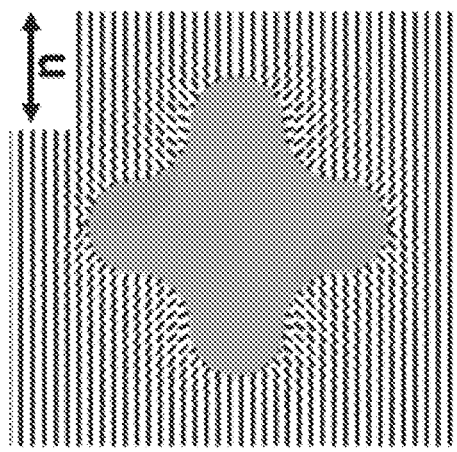
Figure 18A:
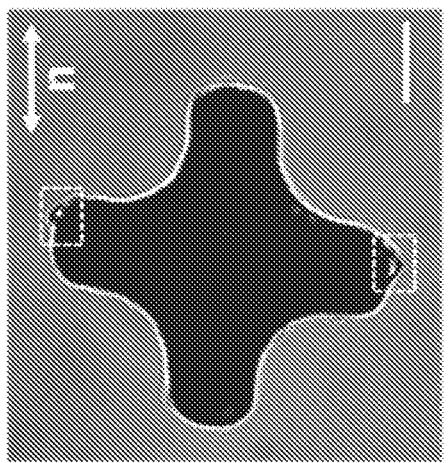

FIGS. 18A-18C. Quadrupolar defect structure on the micro-robot. Microscopic image (18A) and numerical simulation (18A) and (18A) showing the quadrupolar defect configuration around a micro-robot. In the simulation, the micro-robot has homeotropic anchoring at the top and the side surface, and planar degenerate anchoring at the bottom surface. In the quadrupolar configuration, a defect line is pinned to the bottom and the top edge at each side of the particle. Double-headed arrows indicate the far-field director. Scale bar is 20 μm.

Figure 19A:
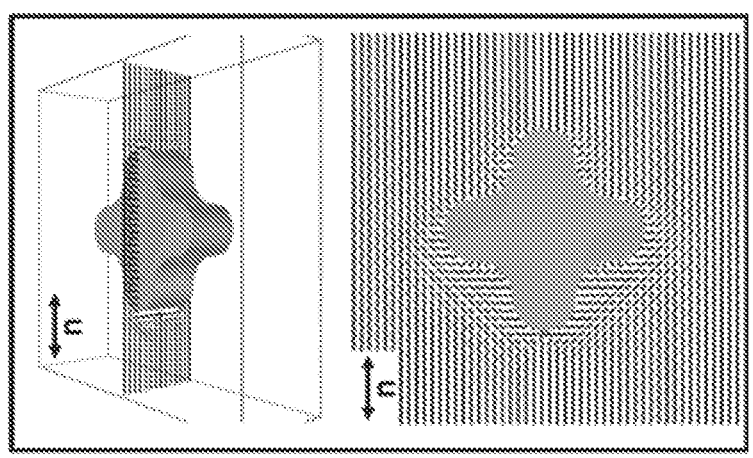
Figure 19B:
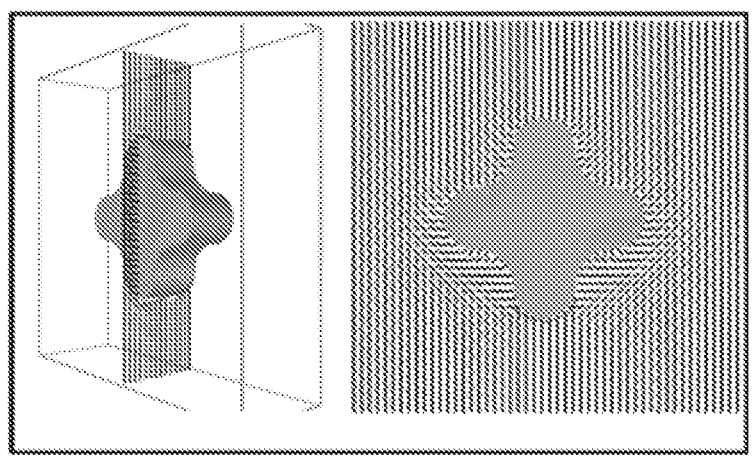
Figure 19C:
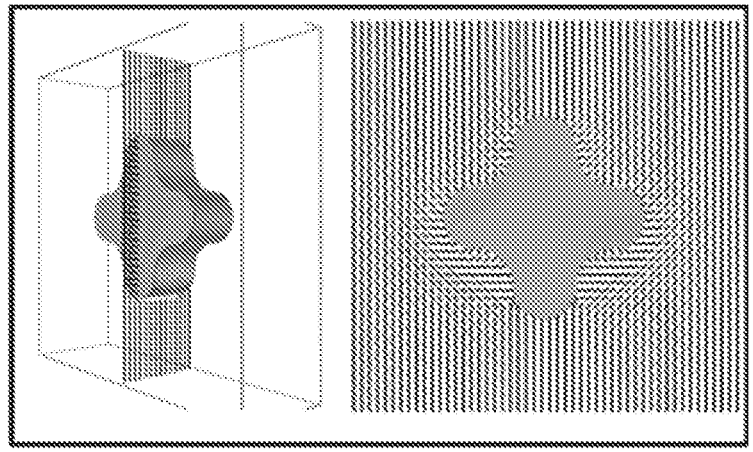

FIGS. 19A-19C. Stable dipolar structures in numerical simulations around the micro-robot. A splay-like director ansatz is used on the micro-robot sidewall to stabilize three distinct defect configurations and director fields, reported in (19A)-(19C). (19A) The tilt angle out of the horizontal plane for the director goes from $-\pi/2$ to $\pi/2$ between the bottom and the top surface of the micro-robot. (19B) The director tilt angle is zero at the bottom half of the sidewall and goes from 0 to $\pi/2$ from the midplane to the top surface. (19C) The director is perpendicular to the surface across the entire sidewall.

FIGS. 20A-20C. Cargo carrying with dipole-in-well and dipole-chaining. (20A) Trajectories of a moving micro-robot and a colloid assembled in the dipole-in-well configuration. (20B) Trajectories of a moving micro-robot and a colloid assembled in the dipole-chaining configuration. Scale bars are 50 μm. (20C) Calibrated center-to-center distance as a function of time indicated by the colored-curves in (20A) and (20B), where is the equilibrium center-to-center distance before the micro-robot started to translate.

Figure 21:
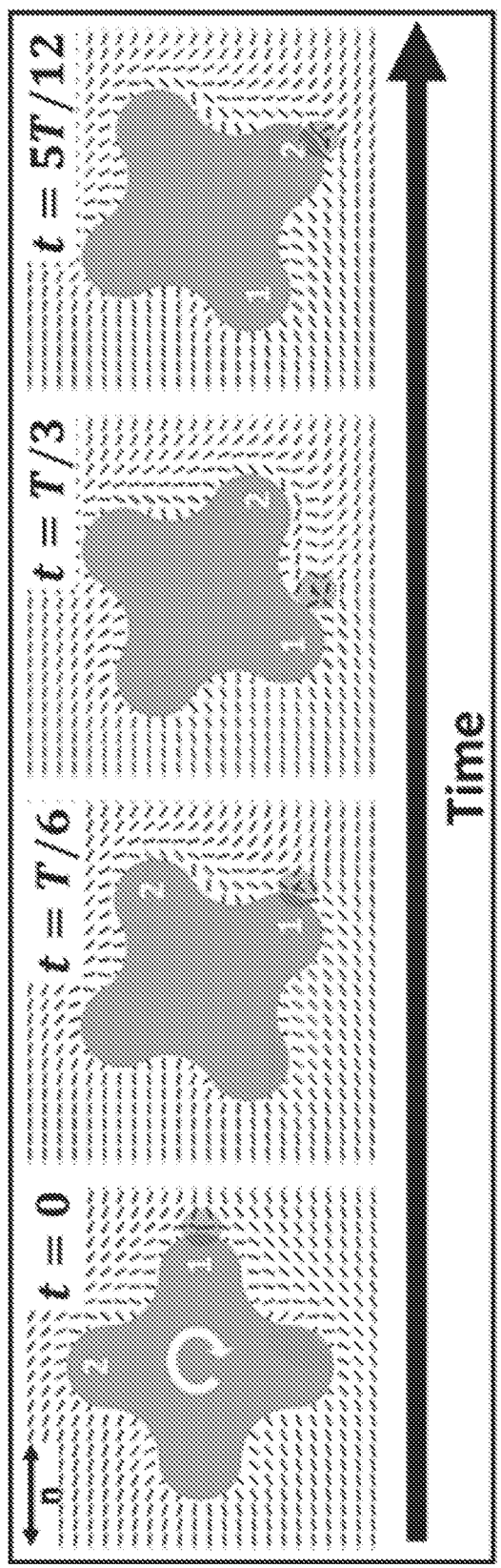

FIG. 21. Hopping of a dipole point defect during rotation of the micro-robot. Two arms of the micro-robot are labelled as 1 and 2 for easier visualization of defect motion. The dipolar point defect (shadowed in dark red), obtained by applying a splay-like director ansatz across the sidewall of the micro-robot, is located on the tip of arm 1 absent micro-robot rotation. Under clockwise rotation of the micro-robot, the dipolar point defect hops from arm 1 to arm 2 by travelling through the bulk liquid crystal adjacent to the micro-robot.

FIGS. 22A-22E. Topological defect's swims stroke propels colloidal translation and generates far-from-equilibrium interactions Topological defects seeded on complex rotating colloids restructure under colloid rotation. The rotating colloids translate or swim as their defects perform complex swim strokes whose dynamics propel swimming. Defect elongation breaks symmetry and allows path planning. Far-from-equilibrium pair interactions emerge that enhance or suppress translation. (22A) Static dipolar defect configuration under bright field (left) and cross-polarization microscopy with a lambda plate (right). The disk is observed from the bottom in these images. (22B) Numerical simulation of the static dipolar configuration in a side view showing the nematic director field (blue) and loop-like defect configuration (red). (22C) Scheme of experimental setup showing a magnetic disk of diameter $2a=75$ μm and thickness $H=25$ μm sandwiched between two glass slides separated by a distance $H_{Gap}$~5 μm with uniform planar anchoring. (22D) and (22E) Time-stamped experimental images (22D) and schematics (22E) of the swim stroke of a disk colloid under a rotating field with period $T=40$ s. The dashed line indicates the initial position of the center, and the white arrow indicates swimming direction.

FIGS. 23A-23C. Defect-propelled swimming. (23A) Superimposed equal time step ($\Delta t=T=40s$) image showing periodic swimming trajectory over four periods of rotation (colored curve). The red arrow indicates the velocity of the disk. Scale bar is 50 μm. (23B) Normalized projected area $A/A_0$ (black circles, left axis) and displacement parallel (red circles) and perpendicular (blue circles) to the translation direction within one period. The projected area of a tilted disk swimmer (23A) is always greater than the area of a flat disk swimmer ($A_0$) due to the finite thickness of the disk colloid. (23C) Normalized projected area $A/A_0$ (black circles, left axis, repeated from 23B) and translation speed parallel (red circles) and perpendicular (blue circles) to the translation direction within one period.

Figure 24A:
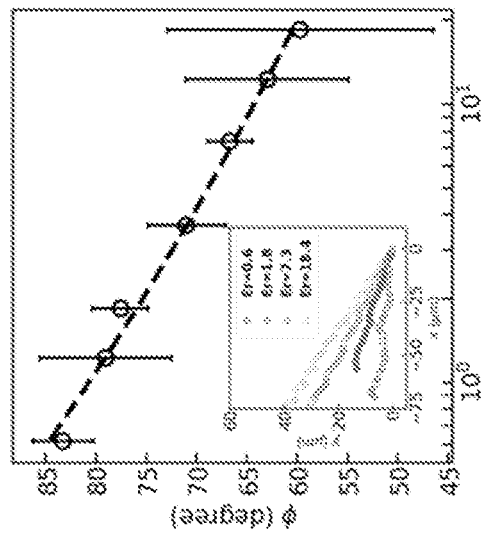
Figure 24B:
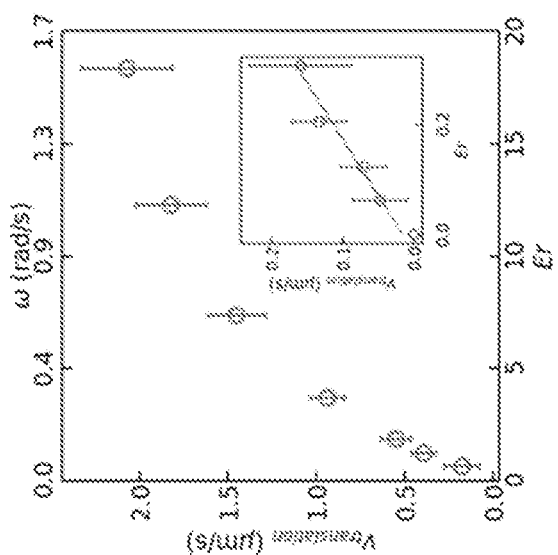
Figure 24C:
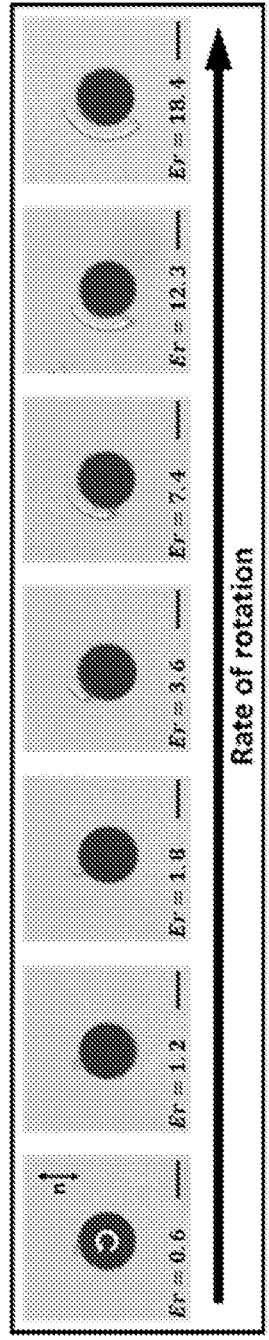

FIGS. 24A-24C. Dynamically elongated defect allows control over swimming direction. (24A) Translational speed of the defect-propelled nematic swimmer as a function of Er (bottom axis) and average angular velocity ω (upper axis). The inset shows the same relationship for small Er. (24B) Translational direction of the defect-propelled nematic swimmer as a function of Er. The inset shows the trajectories of swimmers under Er=0.61, 1.83, 7.3 and 18.4, assuming they have the same initial position at (0,0). (24C) Defect elongation as a function of Er with rate of rotation increasing from left to right. Scale bars are 50 μm.

FIGS. 25A-25D. Trajectory planning for the nematic swimmer. (25A) Superposed images ($\Delta t=25$ s) of two swimmers in same field of view with opposite polarities change swimming directions upon reversing sense of rotation of external field. The period of the external field is 4s and the red dashed lines indicate the position at which the external field was switched from counterclockwise to clockwise rotation. The polarities are labeled P+ and P−, respectively, adjacent to the disk's initial position. (25B) Reversing the sense of rotation of single swimmers from clockwise to counterclockwise rotation with Er=1.8, 3.6 and 18.4 (left to right). The colored curves indicate the trajectories of swimmers. (25C) Turning angles Θ of single swimmer when their senses of rotation are reversed with different Er. The turning angle Θ is defined as in B. (25D) Superposed images of a curved trajectory of a swimmer following a curved trajectory in 520s. The period of the external field is changed from 4s to 12s and then 12s to 36s at the locations indicated by the red dashed line. Scale bar is 100 μm for A and are 50 μm for 25B and 25D.

Figure 26B:
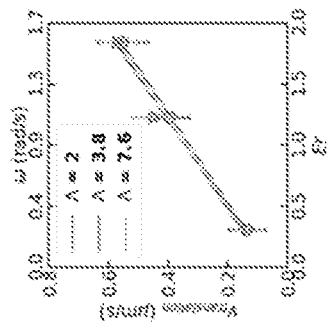
Figure 26A:
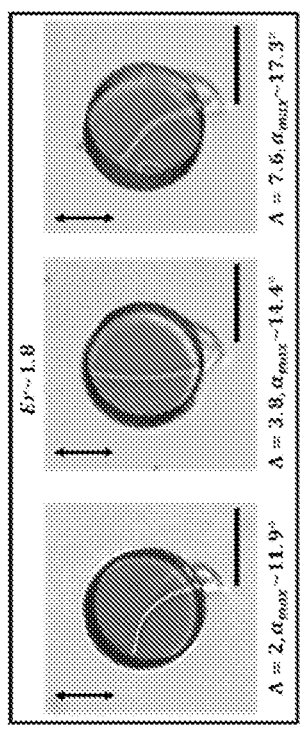
Figure 26C:
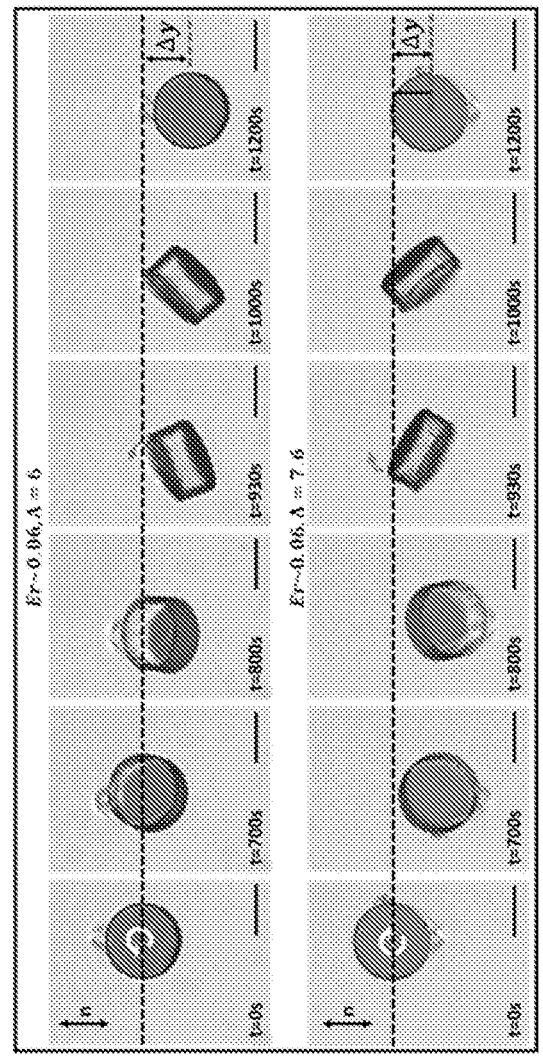
Figure 27B:
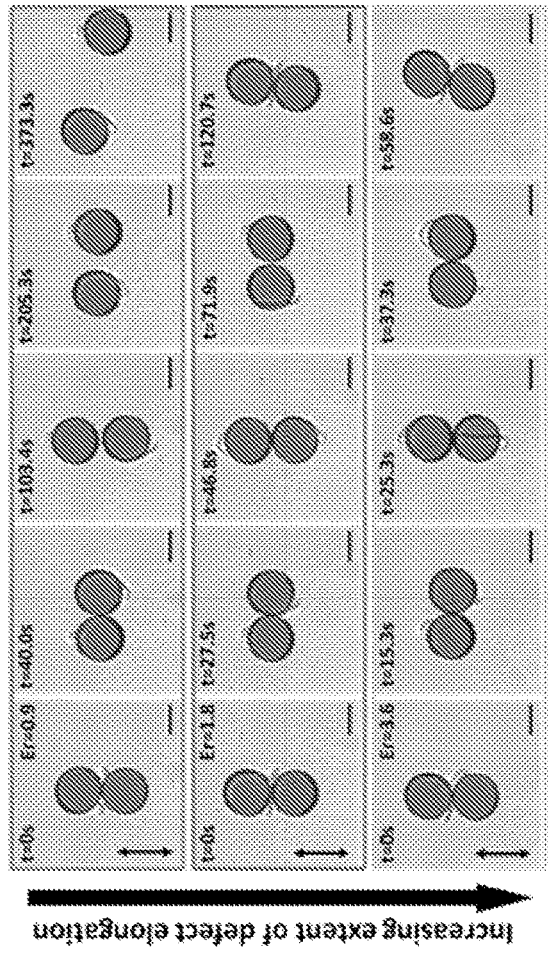
Figure 27D:
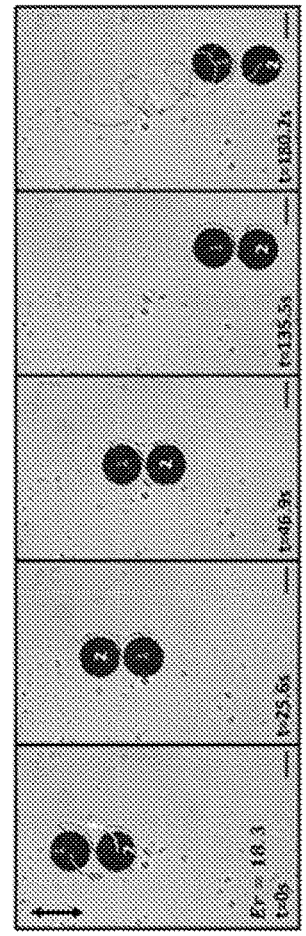
Figure 27A:
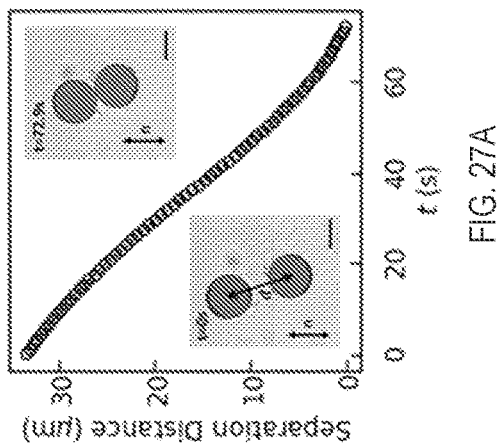
Figure 27C:
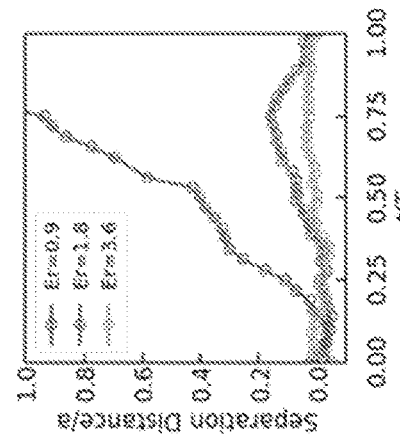

FIGS. 26A-26C. Confinement effects (A) Disks rotated in cells with ratio of gap height to disk thickness over the range $2 \leq \Lambda \leq 7.6$ at Er=1.8 have slightly increased tilt angles. (26B) Disks rotated in cells with ratio of gap height to disk thickness over the range $2 \leq \Lambda \leq 7.6$ show similar dependence on Er. (26C) Slow rotation of weakly confined disks generates a tilting/flopping motion underscoring the use of confinement in limiting disk tilting. Tilting and rotation of an individual swimmer weakly confined cells under slowly rotating CCW (top row, $\Lambda=6$) and CW (bottom row $\Lambda=7.6$) external rotating field (T=1200s; Er=0.06).

FIGS. 27A-27D. Pair interactions between swimmers. (27A) Change in interparticle distance (d-2a) by quasi-static nematic interaction for colloids with opposite defect polarities absent rotation. Insets show configurations at t=0s, and the final anti-parallel arrangement at 72.9s. (26B) Time-stamped images of dynamic pair interactions of colloids with opposite defect polarities under rotating fields of T=80s (top row), 40s (middle row) and 20s (bottom row), respectively. (26C) Normalized separation distances as a function of time of Er=0.92 (red), 1.83 (blue) and 3.65 (orange). (26D) Time-stamped images of co-rotation and translation of dimer formed by two colloids (labeled as 1 and 2) with similar defect polarity under rotating field of T=4s. The red and yellow dash curves in the last frame indicated the helical trajectories of colloids 1 and 2, respectively. Scale bars are 50 μm.

Figure 28:
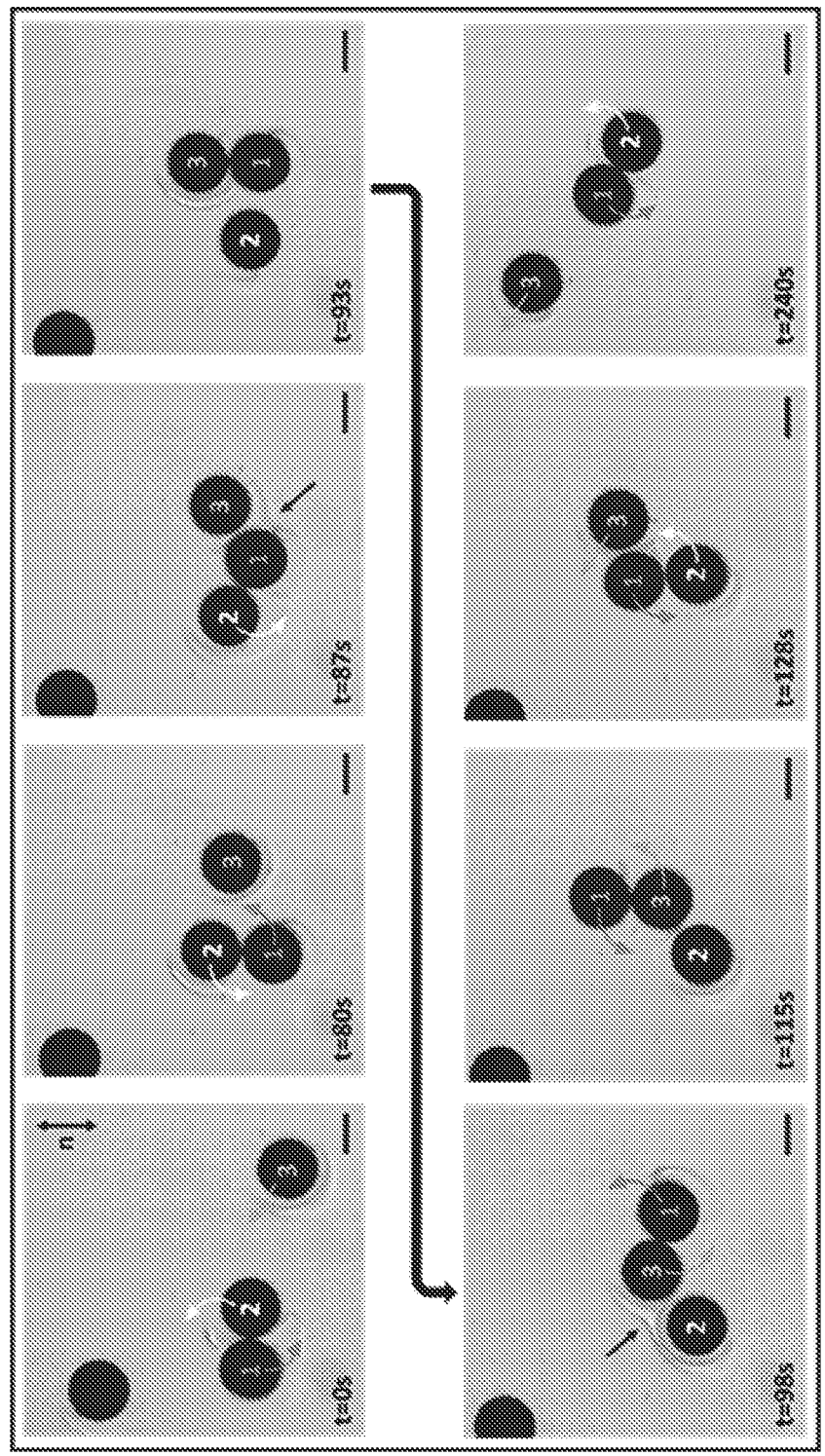

FIG. 28. Multi-body interactions. Time-stamped images of dynamic interactions between three swimmers (labeled as 1, 2 and 3) under an external counterclockwise rotating field of T=4s. The arrows of different colors indicate instantaneous velocities of the swimmers, respectively. Black arrows point to the region where significant defect interactions occur. Scale bars are 50 μm.

Figures 29A, 29B:
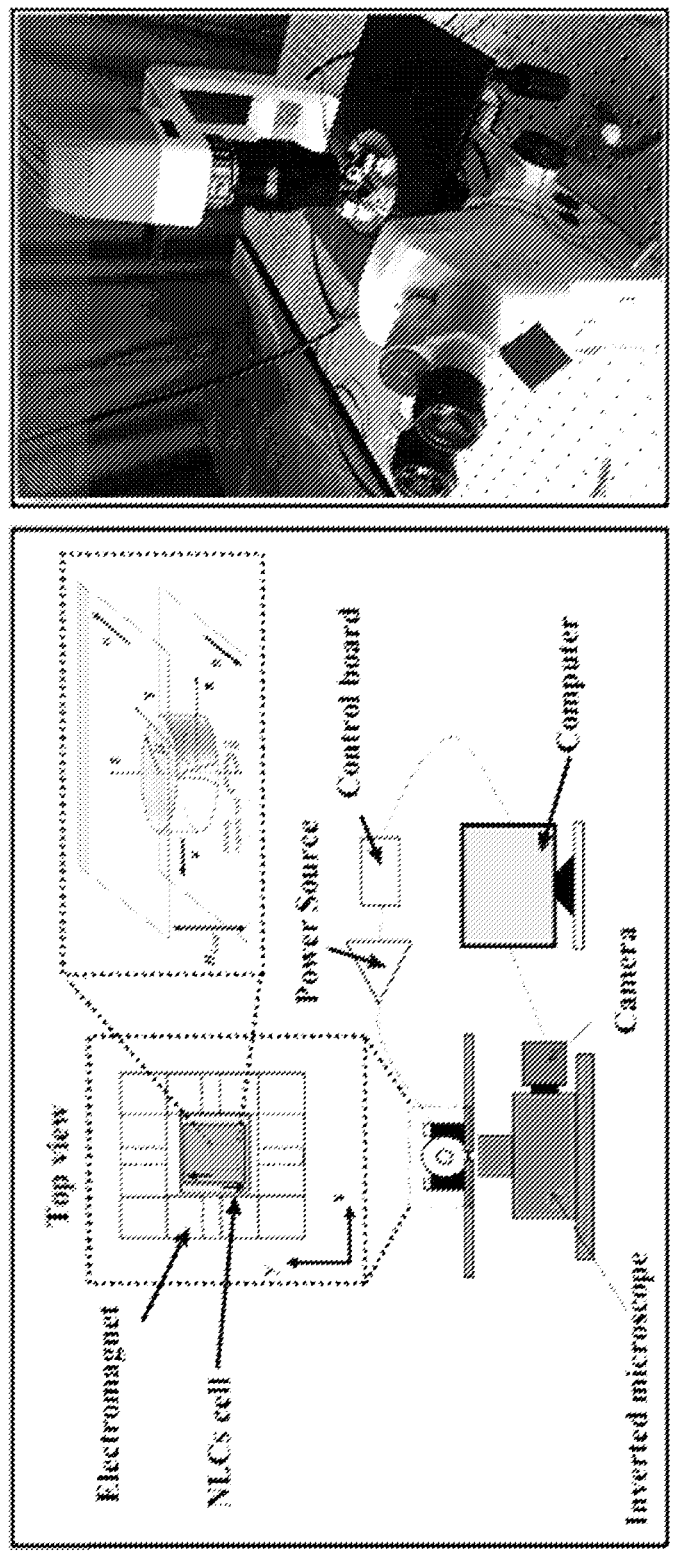

FIGS. 29A-29B. Experimental setup. Schematics (29A) and picture (29Bb) of the experimental apparatus.

Figure 30B:
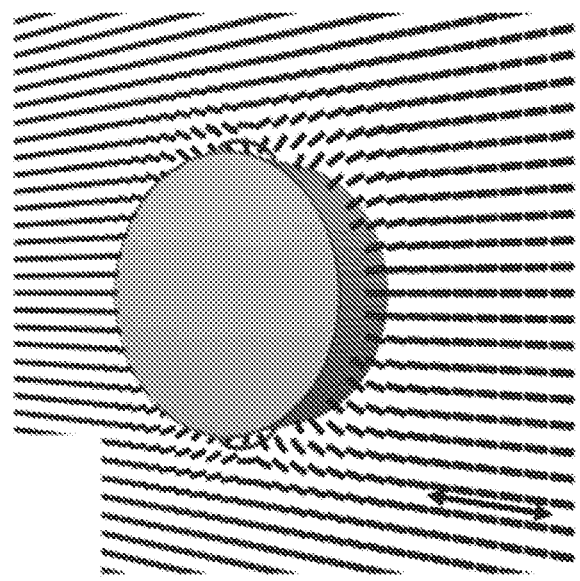
Figure 30A:
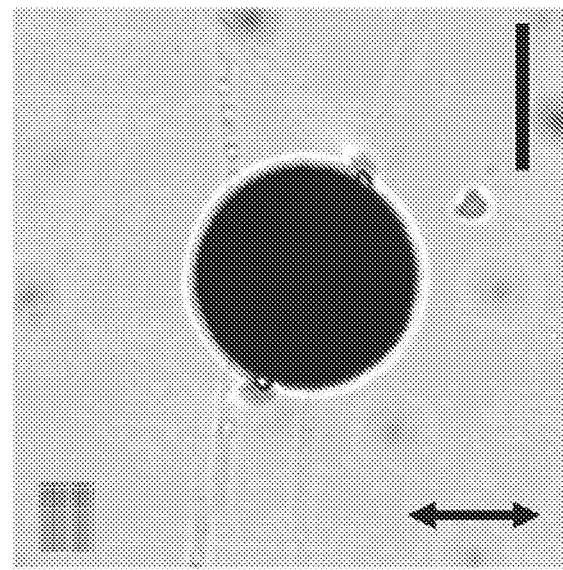

FIGS. 30A-30B. Quadrupolar defect structure on the static hybrid disk colloid. Microscopic image (30A) and numerical simulation (30B) showing the quadrupolar defect configuration around a disk colloid. The double-headed arrows indicate the far-field director. Scale bar is 50 μm. We studied the relative stability of the two defect configurations on the hybrid disk colloids. The details are given in the main text. The results in FIG. 31. indicate that, in experiment, the quadrupolar defect is metastable, while the dipole is stable.

Figure 31:
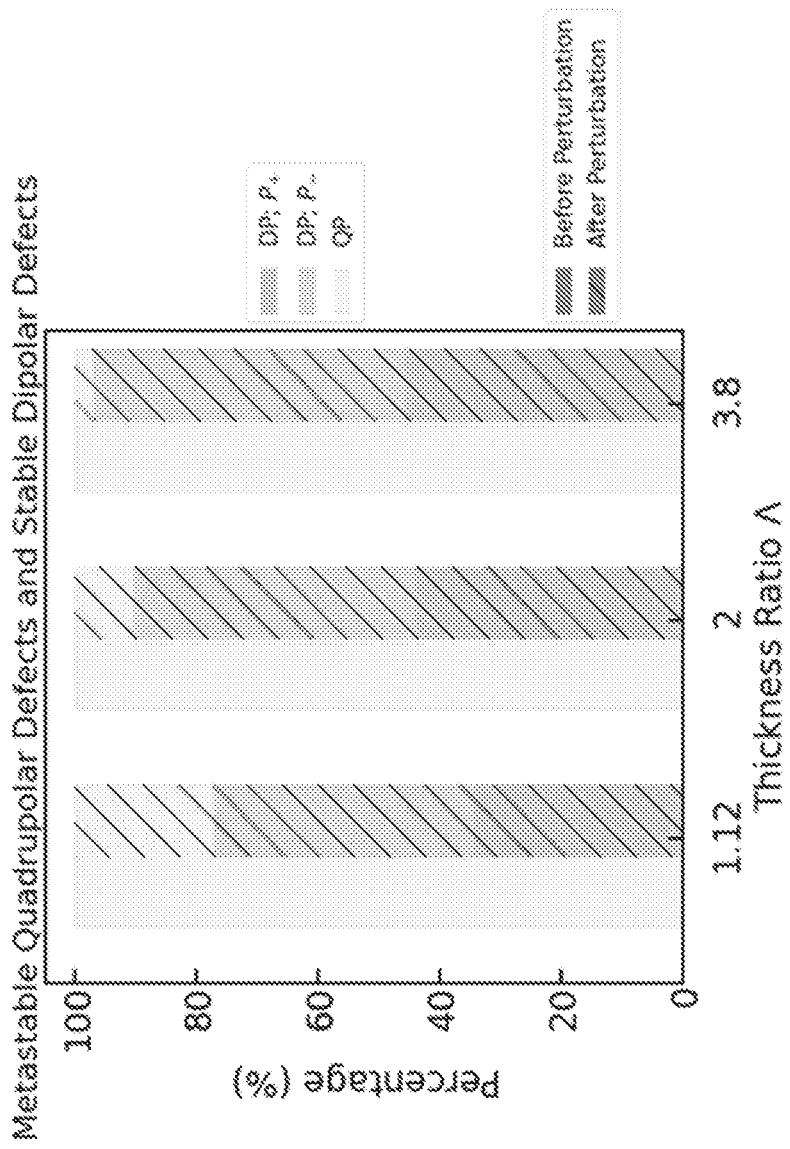
Figure 32A:
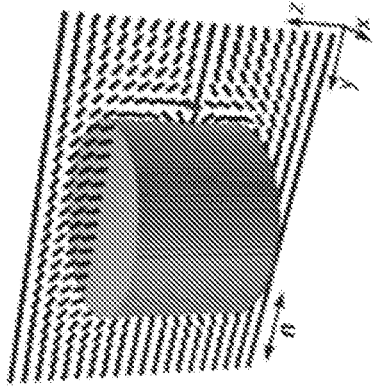
Figure 32B:
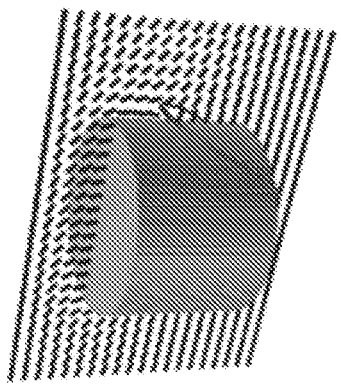
Figure 32C:
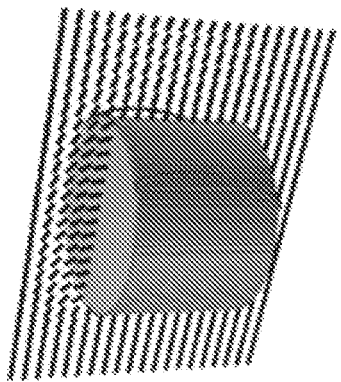
Figure 32D:
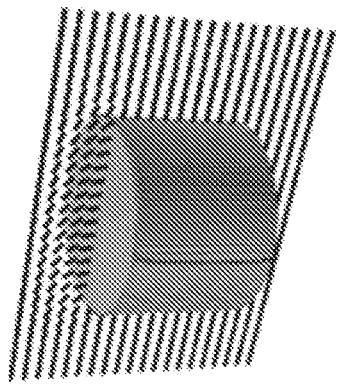

FIG. 31. The quadrupolar defect configuration is metastable while the dipolar defect configuration is the stable state. Statistics for single swimmers' defect configurations before and after rotation under the magnetic field as a function of confinement. 'DP' and 'QP' in the legend denote dipolar and quadrupolar defect configurations, respectively. P+ and P− indicate the polarization of the dipolar defect along the y-axis as defined in the main text. In the histogram, the left column indicates that all defects are in a quadrupolar mode before perturbation. The right column indicated the distribution of dipolar and quadrupolar modes after perturbation. To construct this graph, the number of observations N for each confinement ratio was
$N_{\Lambda=1.12}=35; N_{\Lambda=2}=114; N_{\Lambda=3.8}=33$.

FIGS. 32A-32D. Defect configurations on static hybrid disks in numerical simulations. Depending on the boundary condition on the disk surface, simulations can show various dipolar or quadrupolar solutions. In all panels, anchoring on the disk's bottom surface is planar degenerate and its top surface is homeotropic. The disk is positioned in a cell with the director orientation along y axis on the top and the bottom plane. (32A) On the sidewall of the disk a splay-like director field is defined, going from −z to +z orientation between the bottom and the top surface. This boundary condition stabilizes a point defect in the form of a small loop along the director far-field axis. (32B) If the splay-like boundary condition is enforced only on the top half of the disk's sidewall, a defect line is the stable dipolar configuration. The defect line is pinned at two points to the bottom edge of the disk, and its cross-section shows a half-integer profile. (32C) If the boundary condition on the whole sidewall is homeotropic, the nematic field evolves from the initial dipolar ansatz into a solution with two defect lines, each pinned to the top and the bottom edge. This dipolar solution is unstable and in time evolves into the quadrupolar field (32D).

Figure 33:
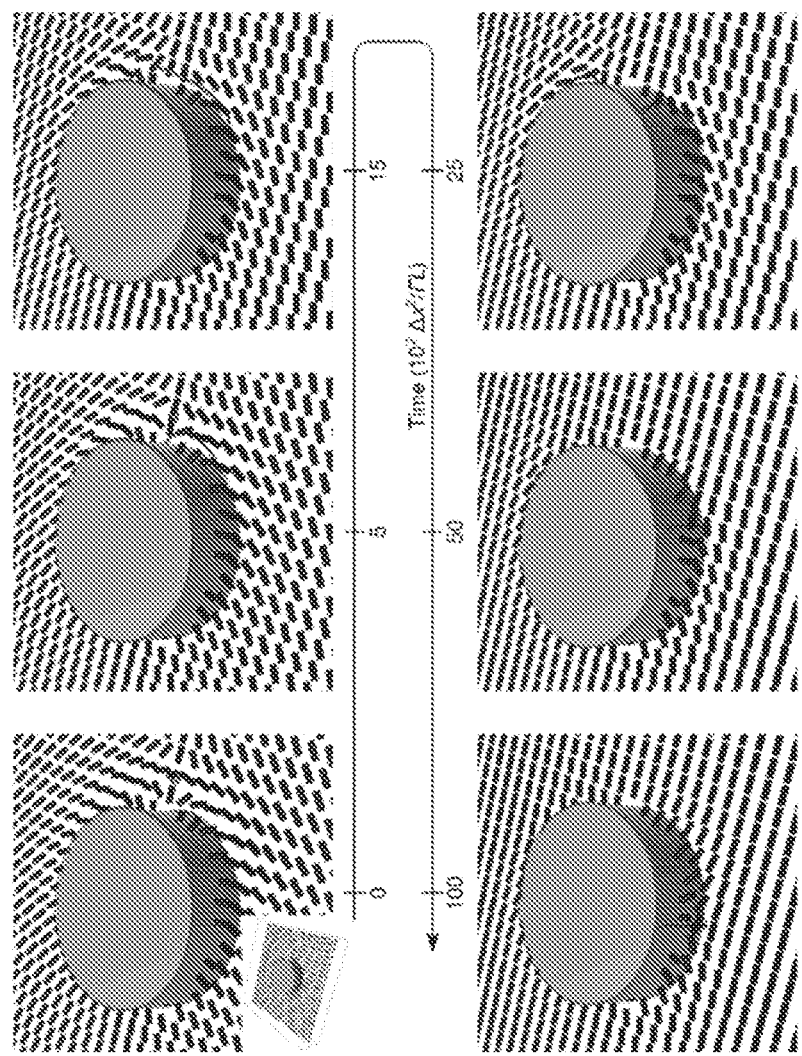

FIG. 33. Time evolution from the dipolar to the quadrupolar configuration on a static hybrid disk colloid. The initial configuration is a dipolar director field with a point defect not in contact with the disk surface. Inset shows the disk position and dimension inside the numerical simulation box. In time, the point defect comes in close proximity to the defect line protruding from the disk bottom edge (t=500 $\Delta x^2/\Gamma L$), and eventually they merge (t=1500$\Delta x^2/\Gamma L$) The newly formed defect line then gets pinned to the top edge (t=2500$\Delta x^2/\Gamma L$), forming two line segments that gradually move away from each other, leading to a stable quadrupolar director field configuration.

Figure 34B:
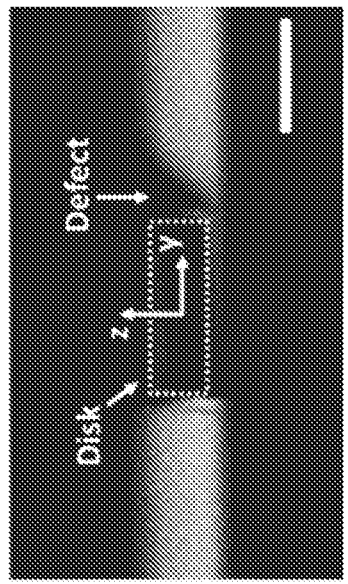
Figure 34C:
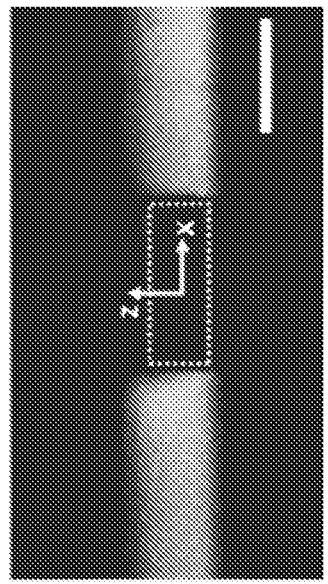
Figure 34A:
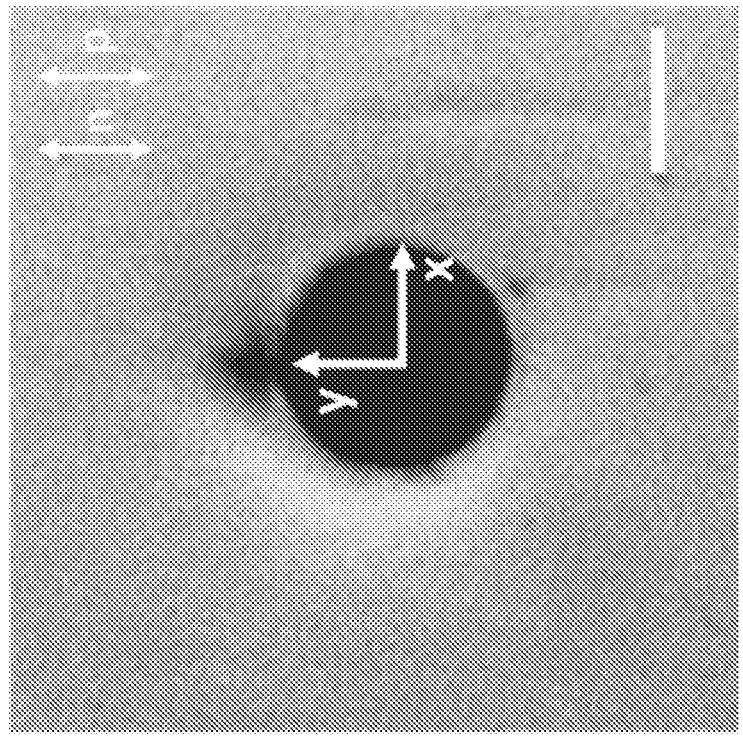

FIGS. 34A-34C. Characterization of static defect structure. Fluorescent confocal polarizing microscopy (FCPM) images of a disk colloid with dipolar defect shown in (34A) xy-plane, (34B) yz-plane and (34C) xz-plane. Scale bars are 50 μm.

Figure 35:
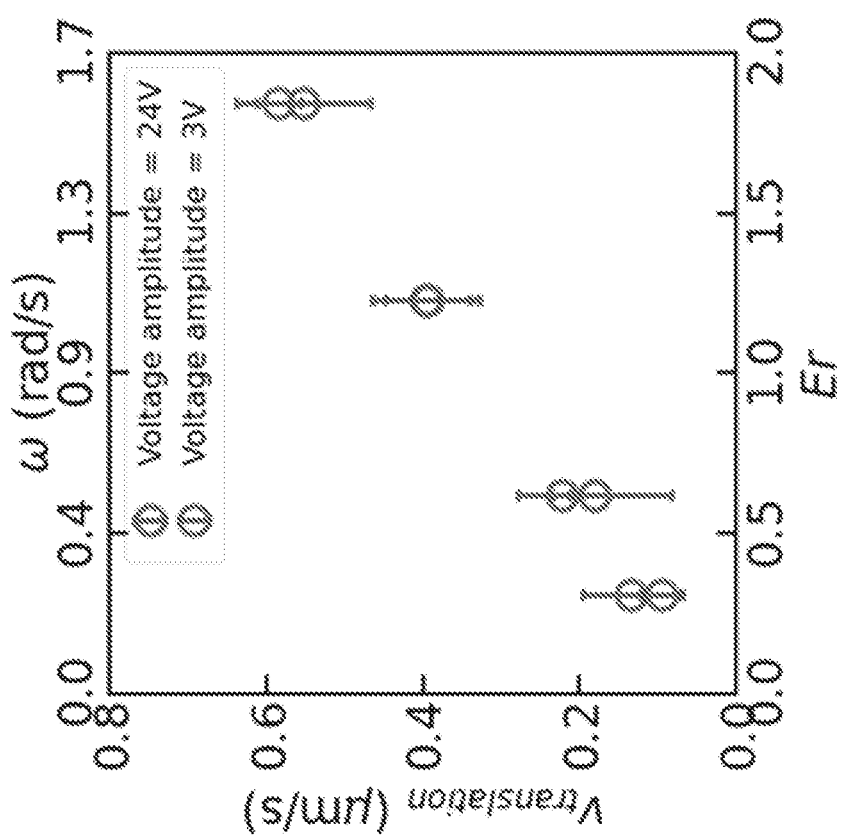

FIG. 35. Swimming speed does not depend on the strength of the rotating field. Translational speed of topological swimmers as a function of Ericksen number under different field amplitudes of 3V and 24V.

Figure 36:
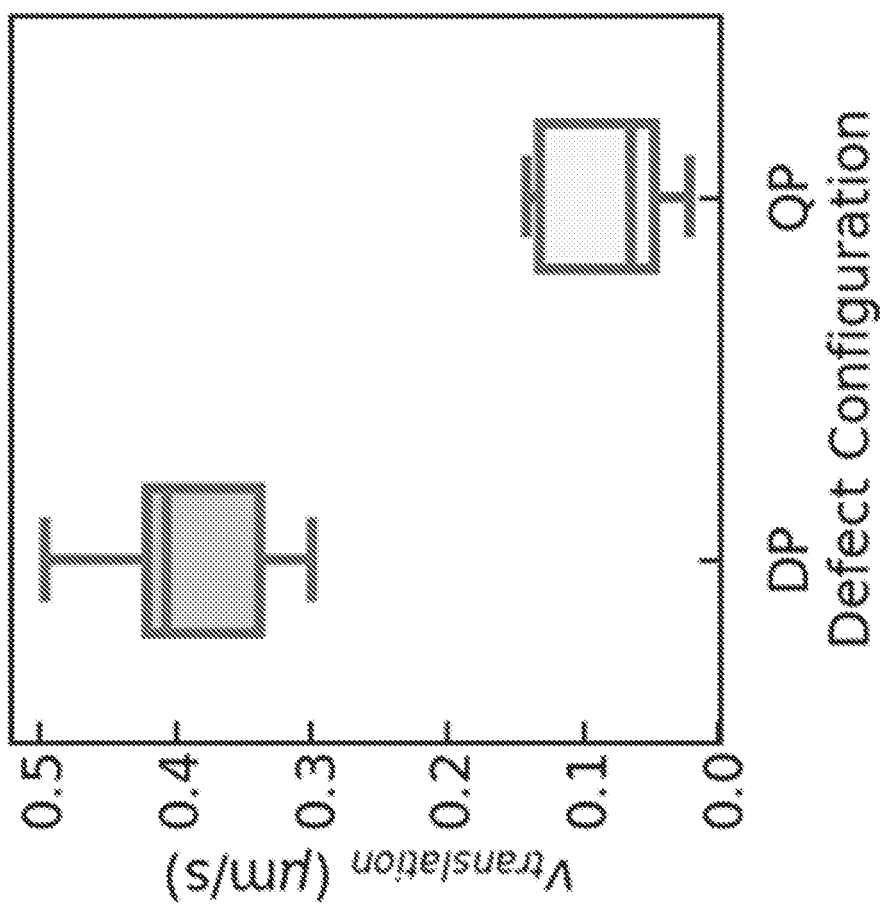

FIG. 36. Broken symmetry is essential for topological swimmers. Comparison of translational speeds of topological swimmers with dipolar (DP) and quadrupolar (QP) defect under the same external rotating magnetic field of T=60s.

Figure 37B:
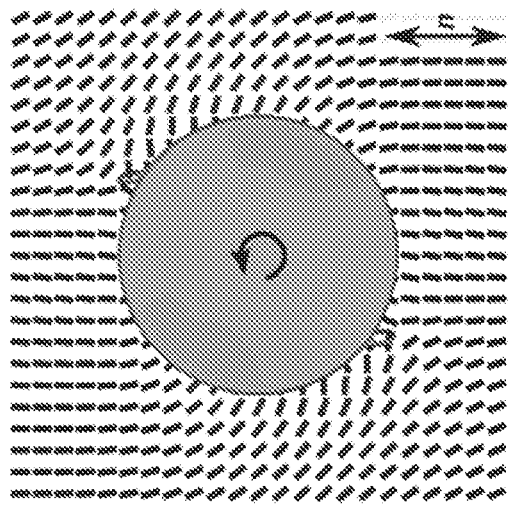
Figure 37A:
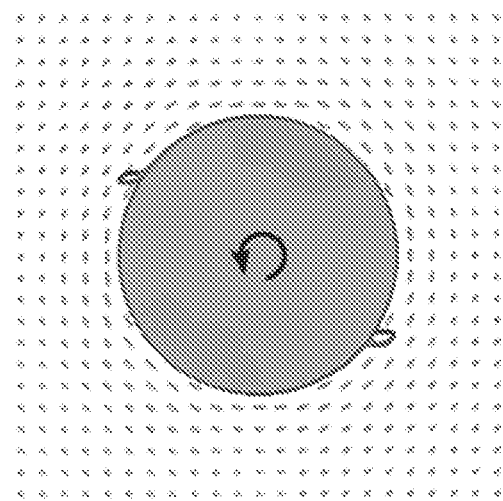

FIGS. 37A-37B. Defect displacement in quadrupolar configuration due to rotation of the disk. (37A) Flow field due to disk rotation. The magnitude of the flow corresponds to Er=1.22. (37B) Director field is distorted by the flow. Anchoring on the top and bottom plate is along the vertical direction. Rotation of the disk displaces two defect lines along the flow field.

Figure 38:
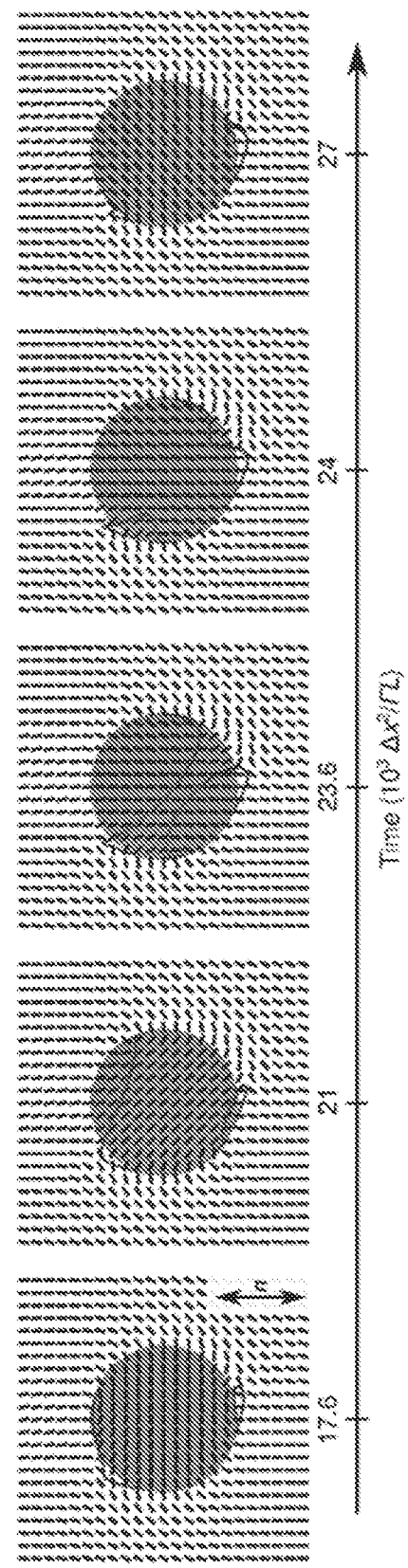

FIG. 38. Defect sweeping motion in simulation. The timeline shows a period of defect motion. Disk is viewed from the bottom directly towards the planar surface. Surface anchoring profile rotates with the disk and generates a sweeping motion of the defect lines across the disk surface.

Figure 39:
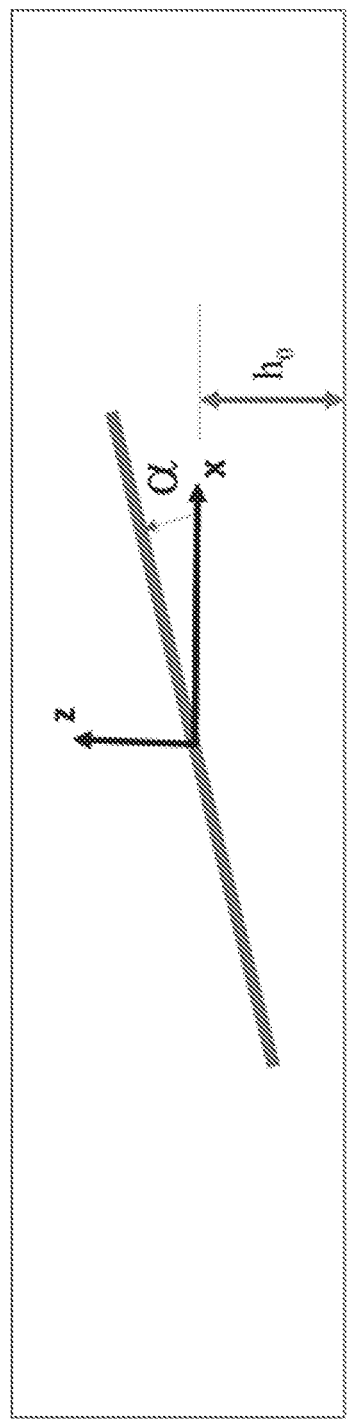

FIG. 39. Geometry defining the coordinates used in the calculation of the lubrication force and the resulting translational velocity.

FIGS. 40A-40D. Roughness of the disk colloid's top and side surfaces. (40A) and (40C) AFM images of a 10 μm by 10 μm area on the top surface of the disk and a 3 by 3 μm area on the side surface of the disk, respectively. Scale bars are 2 μm and 600 nm. (40B) and (40D) indicate the height profile along the white dash diagonals in (40A) and (40C). Note difference in scale in (40B) and (40D).

Figure 41:
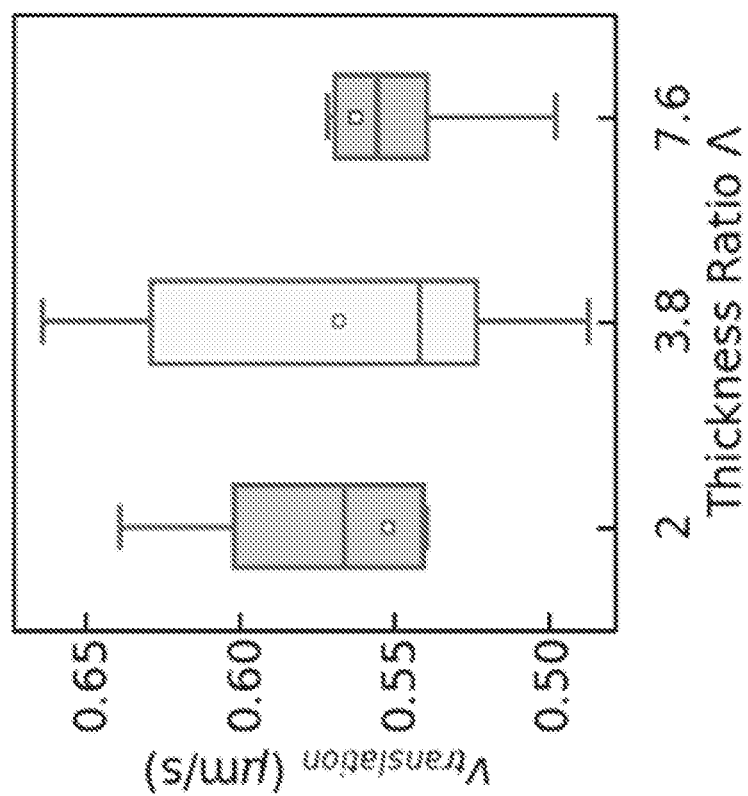

FIG. 41. Translational speeds for swimmers at fixed Er under different confinement. The disks move with similar translation speeds, indicated in the box plots in which the squares indicate the means and the lines within the box indicate the medians of multiple observations under three different confinements $\Lambda$=2, 3.8 and 7.6, respectively.

Figures 42A, 42B, 42C:
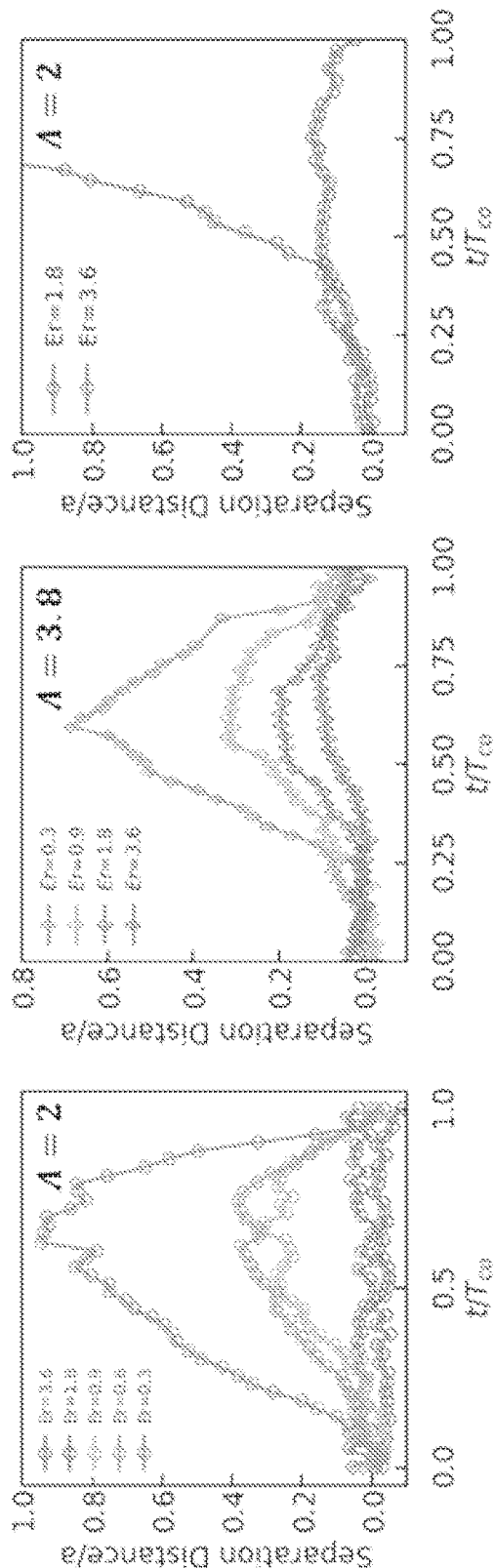

FIGS. 42A-42C. Co-rotation of dynamic dimer pairs formed by two anti-parallel swimmers. Separation distance (center-to-center distance subtracted by two radii) during one co-rotation period for stable dynamic dimers in cells with (42A) $\Lambda$=2 and (42B) $\Lambda$=3.8. (42C) The separation distance of a stable dynamic dimer (red) and an unstable dynamic dimer (blue) in a cell with $\Lambda$=2. In order to show the motion of the stable and unstable dynamic dimers on a single graph, the data for stable dynamic dimers are normalized by the co-rotation period of the dimer pair, while the data for the unstable dynamic dimers, which migrated apart, is normalized by the time required for the disks to be separated by two disk radii.

Additional Disclosure—I

Physically intelligent micro-robotic systems exploit information embedded in micro-robots, their colloidal cargo, and their milieu to interact, assemble and form functional structures. Nonlinear anisotropic fluids like nematic liquid crystals (NLCs) provide untapped opportunities to embed interactions via their topological defects, complex elastic responses, and their ability to dramatically restructure in dynamic settings. Here we design and fabricate a 4-armed ferromagnetic micro-robot to embed and dynamically reconfigure information in the nematic director field, generating a suite of physical interactions for cargo manipulation. The micro-robot shape and surface chemistry are designed to generate a nemato-elastic energy landscape in the domain that defines multiple modes of emergent, bottom-up interactions with passive colloids. Micro-robot rotation expands the ability to sculpt interactions; the energy landscape around a rotating micro-robot is dynamically reconfigured by complex far-from-equilibrium dynamics of the micro-robot's companion topological defect. These defect dynamics allow transient information to be programmed into the domain and exploited for top-down cargo manipulation. We demonstrate robust micro-robotic manipulation strategies that exploit these diverse modes of nemato-elastic interaction to achieve cargo docking, transport, release, and assembly of complex reconfigurable structures at multi-stable sites. Such structures are of great interest to developments of LC-based advanced optical device and micro-manufacturing in anisotropic environments.

Untethered mobile micro-robots are the focus of intensive research with diverse strategies for actuation, mobility and interaction (1-6). Given their scale, the development of these systems has exploited and inspired research in far-from-equilibrium colloidal systems. Micro-robot mobility is achieved by various mechanisms including self-propulsion and actuation under external fields, intersecting with the field of active colloids (7-11). The physical dimensions of micro-robots make it challenging to integrate computational elements that imbue them with computational intelligence. Thus, micro-robots typically exploit physical intelligence (12) to perform essential tasks including colloidal-scale cargo capture, transport and delivery. Physical intelligence refers to diverse interactions between the micro-robot, its cargo, or domain boundaries that can be harnessed to perform useful work, often drawing on concepts at the forefront of directed colloid manipulation and assembly. For example, micro-robot motion is exploited to generate hydrodynamic interactions that dictate cargo displacement (13, 14), and external electromagnetic fields are applied to generate and control colloid-micro-robot interaction (15-17). Such interactions can be tailored by design of micro-robot and cargo shape, material properties and those of the domain boundaries (17). While many studies in this arena are motivated by biomedical applications (2, 3, 6), there are opportunities for micro-robotics in technologically relevant environments to generate reconfigurable structures for functional metamaterials ranging from advanced optical devices (18-21) to energy harvesting materials (22, 23).

While micro-robots are typically studied in isotropic fluids, highly anisotropic domains provide additional degrees of freedom for designing the interactions between a micro-robot and its cargo. For example, curvature fields at fluid interfaces have been designed to direct colloid motion by capillarity (24); such interactions have recently been exploited for micro-robotic assembly and cargo manipulation (25-27). Nematic liquid crystals (NLC) are anisotropic fluids in which physical information can be embedded via the organization of nematogens and the presence of topological defects to generate emergent interaction among microscale objects in the domain (28-36). The introduction of micro-robot dynamics dramatically expands the opportunity to sculpt such interactions. For example, micro-robot shape and anchoring conditions can mold nematogen orientation and dictate the formation of topological defects; the ability to reposition the micro-robot allows this information to be embedded at arbitrary sites in the domain. Furthermore, in far-from-equilibrium systems, the energy landscape around micro-structures can be dynamically reconfigured to generate dynamic defect structures (37-43) by an interplay of the elasticity and external fields in these highly non-linear fluids. Such reconfigurable energy landscapes provide exciting opportunities for exploitation in untethered micro-robotic systems.

In this paper, we design and fabricate a 4-armed ferromagnetic micro-robot which can be actuated using an external magnetic field (FIG. 10A). The micro-robot's shape and surface chemistry are designed to embed a nemato-elastic energy landscape that generates complex force fields (FIG. 10B) on passive colloids. These emergent interactions drive the colloids along well-defined paths toward distinct sites for assembly with interactions strengths of magnitude $\sim 10^5$ $k_B$g. Micro-robot rotation by an external magnetic field generates far-from-equilibrium dynamics of the micro-robot's companion topological defect (FIG. 10, C-E) which provide additional opportunities for micro-robot mobility and passive cargo manipulation and assembly. In this research, we introduce and characterize these aspects of NLC micro-robotics as forms of physical intelligence and exploit them in top-down and bottom-up assembly of robust reconfigurable micro-structures.

Results

Micro-Robot Design and its Static Defect Configurations

We fabricate a ferromagnetic 4-armed micro-robot using standard lithographic methods followed by PVD sputtering of a layer of Ni (~20 nm and ~200 nm for thin and thick coating, respectively) and subsequent treatment with dimethyloctadecyl [3-(trimethoxysilyl)propyl] (DMOAP). The resulting micro-robot has homeotropic (perpendicular) anchoring on its Ni-coated top and side surfaces, and degenerate planar anchoring on its bottom face. When placed in a uniform planar cell filled with the nematic liquid crystal 4-cyano-4'-pentylbiphenyl (5CB) (FIG. 10A), the micro-robot molds the local director field, a headless vector n, which describes the orientational order of the nematogens. The micro-robot's arms and wells have curvatures designed to generate gentle distortions in the domain to promote lock-and-key assembly of passive colloids (FIGS. 10, A and B). Given the micro-robot's complex anchoring and sharp edges, its defect configurations differ significantly from their well-known counterparts on smooth particles with uniform anchoring.

Once placed in the planar cell, two different defect structures emerge depending on the gap thickness between the two plates. For highly confined systems where the ratio of cell thickness to micro-robot thickness h/H is ~1.2, the system assumes a metastable defect configuration with a quadrupolar symmetry, with two defects at the tip of the two arms aligned perpendicularly to the far field director (FIG. 18). For less confined systems (h/H~2), a stable configuration emerges with dipolar symmetry, with a single defect visible at the tip of one of the arms aligned parallel to the far field director as shown in FIGS. 11A and 11B. Numerical simulation (FIG. 10A and FIG. 11C) reveals that this defect is a disclination loop that is anchored on two locations on the micro-robot's degenerate planar face and extends along the micro-robot's side toward its homeotropic face. The stability and shape of the dipolar structure in simulations depend on the details of the surface anchoring (FIG. 19). In experiments, the quadrupolar structure irreversibly transforms to the dipolar structure under external perturbation. In addition to these defects, simulation reveals zones of diminished order along the sharp edges of the micro-robot.

To study these micro-robots in interaction with passive colloids under weak confinement, DMOAP-treated silica colloids (2a=25 μm) with homeotropic anchoring are suspended with the micro-robot in 5CB; this suspension is introduced into the planar cell in the isotropic state, and subsequently quenched into the nematic state by cooling below the isotropic-nematic transition temperature ($T_{IN}$~35.2° C.). We focus on the weakly confined case in which both the micro-robot and the colloid carry dipolar defects. Under the action of an external magnetic field (details in the Methods section), the micro-robot can translate or rotate with complex defect dynamics that are harnessed to interact with passive colloids.

Directed Assembly of Colloids in Nemato-Elastic Force Field

The micro-robot embeds a complex energy landscape in the surrounding NLC that generates emergent interactions that drive colloids along distinct paths. The path followed by a particular colloid depends on the colloid's polarity, its initial position, and the pose of the micro-robot. We enumerate the interactions that occur for a micro-robot at a fixed position with a defect on its left arm in interaction with colloids with either polarity in FIG. 12. Five types of attractive interactions were observed: (i) dipole-chaining, in which the colloid chains with the dipolar loop adjacent to the robot with its companion defect pointing outward, oriented along the far field director (FIG. 12A), (ii) a rarely-observed zig-zag dipole configuration, in which the colloid assembles with its defect oriented facing the defect of the micro-robot assemble into an anti-parallel structure (FIG. 12B), (iii) a dipole-on-hill configuration, in which the colloid docks on the curved tip of the robot arm with its companion defect pointing toward the robot (FIG. 12C), and (iv) a dipole-in-well configuration, in which the colloid docks in a well between two arms of the micro-robot with its companion defect pointing outwards, oriented along the far field director (FIG. 12D), and, finally, (v) a hybrid configuration where the colloid partially docks in a well with its companion defect tilted toward the nearest arm (FIG. 12E). The dipole-chaining and zig-zag configurations are reminiscent of dipole-dipole interactions of uniform colloids with homeotropic anchoring (44), although the details of the defect configurations on the micro-robot differ. Note that the zig-zag dipole configuration relies on the micro-robot and colloid being in close proximity. The other three cases are a recapitulation of lock-and-key interactions in which colloids interact with gentle distortion fields seeded by the curved boundaries, as shown in the insets to FIGS. 12 C-E.

Far from the micro-robot, the hedgehog companion defects on the colloids align with the far-field director with either rightward-facing or leftward-facing companion defects aligned with the far field director; this orientation defines the colloids' polarity, as shown in the insets to FIG. 12F (i) and FIG. 12G (i), respectively. Colloid-micro-robot interactions depend on this polarization and the colloid's initial position with respect to the micro-robot. The trajectories of all colloids that assembled on the micro-robot are superposed on the micro-robot frame for colloids with rightward-facing defects in FIG. 12F (i) and leftward facing defects in FIG. 12G (i). In these figures, trajectories are color-coded in terms of their final mode of assembly. For example, the green curves represent the colloids' trajectories as they approach the micro-robot and docks in the dipole-in-well configuration, while the blue curves represent the hybrid configuration in which the colloids are first repelled away from the micro-robot and then are attracted to the final equilibrium positions, resulting in complex, curved trajectories. All five assembly configurations and their trajectories are predicted by numerical analysis (FIGS. 12F(ii) and 12G(ii)). We consider the free energy of point dipoles aligned along the local director field, $F_d = 4\pi K p \cdot (\nabla \cdot n)$, where K is the elastic constant and p is the dipolar orientation (29). Predicted colloid trajectories corresponding to the negative gradient in free energy are calculated for colloids with right-facing defects (FIG. 12F(i)) and left-facing defects (FIG. 12G (i)) in the far-field. Only the director gradients in the horizontal plane are considered in the analysis to avoid any influence of the director field ansatz on the sidewall of the micro-robot. These distinct modes of assembly depend strongly on initial relative positions and polarizations of the colloid and differ in range and strength, allowing for selective directed assembly.

To better understand these interactions, we track trajectories and compare the normalized separation distance to their equilibrium position $d_e/a$ as a function of time $t_c - t$, where $t_c$ is the time when the colloid reaches its equilibrium position as shown in insets to FIGS. 12H-12K. The dipole-chaining and hybrid configurations have longer-ranged interaction, with attraction observed for distances as large as 6a from the colloids' equilibrium positions, while the dipole-on-hill and dipole-in-well configurations have attractions up to separation distances of roughly 2a. Since colloids move with negligible inertia, i.e. with Reynolds number $$Re = \frac{\rho u a}{\mu} \sim 10^{-7} - 10^{-6},$$

where $\rho$ is the density of 5CB, u is the speed of the colloid and $\mu$ is the average viscosity of 5CB, inertia can be neglected and the energy of interaction U between a colloid and the micro-robot can be inferred from the energy dissipated along the colloids' trajectories. Estimates for U (shown in FIGS. 12 H-K) are calculated for each colloid-micro-robot configuration by integrating the viscous drag forces along the trajectories of the colloids $$U = \int_{S_0}^{S_t} F_{drag}(s)ds = C_D 6\pi\mu a \int_{S_0}^{S_t} u(s)ds$$

where $s_0$ is the reference point, $s_t$ is an arbitrary point along the trajectory and $C_D$ is the effective drag coefficient for this confined setting (31). The plots for U are truncated at $d_e=0.25a$ (dashed lines in FIGS. 12 H-K) to exclude the region very near contact as near-field hydrodynamic interactions between the micro-robot and the colloid become more dominant. The stronger interactions are of magnitude $\sim 10^5 k_B T$, including the dipole-chaining, dipole-on-hill, and hybrid configurations, all of which involve the colloid's defect in their final assembled configuration. However, the relatively weak dipole-in-well configuration, of magnitude $\sim 10^4 k_B T$, relies only on matching regions of bend and splay distortion around the colloid as it docks in the well.

The slopes of the energy of interaction U as the colloids approach their equilibrium positions reveal features of the different docking configurations. While the parabolic shape of the U plot for the dipole-in-well configuration suggests an elastic force on the colloid is on the order of a few pN with elastic constant in the order of $10^{-7}$ N/m, the more linear relationships between U and separation distance d for the other assembled configurations suggest that these structures require a force in excess of a yield force on the order of $10^1$-$10^2$ pN to separate the colloid from the micro-robot. The distinct strengths and characteristic behaviors of the different docking configurations have implications in terms of the ability of the micro-robot to retain and carry colloidal cargo as it moves about in the domain. For example, the elastic nature of the dipole-in-well configuration implies that the colloidal cargo will be displaced by viscous drag as the micro-robot moves, causing it to be lost from the binding pocket and left in the bulk (FIGS. 20a and 20c). In contrast, the colloid assembled on the micro-robot via the strongly attractive modes like the dipole-chaining configuration move together with the micro-robot (FIGS. 20b and 20c) as long as the hydrodynamic drag does not exceed the yield force. While such configurations allow the micro-robot to capture, retain, and transport colloidal cargo, their very strength may impede cargo release. This motivates our exploration of far-from-equilibrium defect structures.

Far-from-Equilibrium Defect Dynamics

Under a rotating magnetic field, a far-from-equilibrium defect emerges whose dynamics are influenced by the micro-robot's hybrid anchoring conditions, complex shape, and sharp edges. Under slow rotation, the dipolar loop, situated at rest on a micro-robot arm aligned with the far field director, extends as it is placed in an antagonistic orientation with respect to the anchoring imposed on the planar bounding surfaces of the cell. At higher rotation rates, backflow becomes significant in addition to this geometric frustration, as the director field and flow field become coupled to leading order. Upon rotation by $$\frac{\pi}{2}$$

radians, the defect becomes unstable and hops to the arm that has become aligned with the far field as shown in FIG. 13A. As the defect hops, the dipolar structure interacts with a portion of the disclination loop beneath the micro-robot. When rotation ceases, the defect retracts to the dipolar configuration on the arm aligned with the director over time scales characterized by the relaxation dynamics of the system, given by $$\tau = \frac{L^2 \gamma_1}{K},$$

where L is the characteristic length of the micro-robot, $\gamma_1$ is the rotational viscosity of NLCs. Under continuous slow rotation, the defect 'travels' via periodic extension, interaction, hopping and contraction in the opposite sense of the micro-robot's rotation. For the example, as shown in FIG. 13A, where the Erickson number Er=1.55. Similar behavior has been observed for Er as low as 0.06. Numerical simulations suggest distinct modes of defect hopping. Simulations of the rotating micro-robot with a dipolar loop (FIG. 13B) show dynamic elongation of the loop and sliding of the defect's pinning point on the micro-robot's edge. This sliding mechanism allows the loop to move from one arm to another. Simulations of a micro-robot with a dipolar hedgehog companion defect (FIG. 21) show another mode of hopping. In this case, the defect hops between neighboring arms of the micro-robot through the bulk phase due to strong dynamic alignment of the director field. Structurally, both pathways for defect hopping occur in regions of large director field deformations, and the motion of the defect reduces the elastic free energy of the system. Both experiment and simulation capture hopping of the defect between adjacent arms on the rotating micro-robot, as the system attempts to preserve the overall dipolar orientation with respect to the far-field. Under continuous rotation at angular velocity ω at rates that challenge the natural relaxation dynamics, the defects form smeared-out dynamic structures with periodic rearrangements that depend on the Ericksen number Er=ωτ. Under high Er~18, for example, the defect becomes significantly elongated and remains 'smeared out' while hopping along the structure every $$\frac{\pi}{2}$$

radians determined by the geometric symmetry of the 4-armed micro-robot, lagging the alignment of the arm tips without relaxing back to the equilibrium structure. The extent of defect elongation is positively related to Er; larger Er leads to greater defect elongation around the micro-robot. These defect dynamics play a role when interacting with colloidal cargo.

Cargo Juggling and Release

The emergence of far-from-equilibrium defects during micro-robot rotation are evidence of non-linear restructuring of the director field and provide a means to manipulate colloidal cargo. FIG. 14A shows a colloid assembled in the upper left well in the hybrid configuration at t=0s. As the micro-robot rotates, the assembled colloid moves around the micro-robot influenced by steric hindrance and hydrodynamics and encounters the micro-robot's dynamic defect at t=25s after $$\frac{3}{2}\pi$$

rotation. The elongated disclination loop of the micro-robot and the hedgehog defect from the colloid then merge to form a shared defect that carries the colloid along with it at t=29s. Upon further rotation, the shared defect separates to restore the colloid's companion hedgehog defect and the micro-robot's elongated defect (t=35s). These dynamics place the colloid in a repulsive configuration on the hill of the arm adjacent to its initial docking site, with its defect pointing outward; the colloid is repelled from the micro-robot (t=47s). Colloids assembled in other configurations can also be released by rotation via similar defect dynamics.

In another example, two identical colloids docked on the micro-robot can be juggled, rearranged, and restructured by far-from-equilibrium defect dynamics. The micro-robot with assembled colloids, shown in FIG. 14B at t=0s, is initially at rest, with colloid 1 (shown in red) docked in the bottom left well in the hybrid configuration and colloid 2 (shown in yellow) docked in the upper right well in the dipole-in-well configuration. As the micro-robot rotates in the clockwise direction, its defect lags behind the arm, elongates and merges with colloid 1's companion defect to form a shared structure (t=19s). This merged, shared defect carries colloid 1, rearranging its orientation and position on the micro-robot (t=46s). Thereafter, the merged defect further elongates along the sharp edges of the micro-robot and encounters the companion defect of colloid 2 (t=66s), forming a merged defect that is now shared with both colloids. This larger loop also rotates and re-positions colloid 2. Finally, as shown in FIG. 14B at t=77s, the merged defect becomes unstable and contracts; the micro-robot recovers its original defect structure, and the colloids' companion hedgehog defects are restored. However, the changes in the positions and orientations of the colloids alter their ensuing interactions with the micro-robot. Colloid 1 eventually stably docks in the dipole-in-well configuration on the upper right. Colloid 2, however, placed in an antagonistic orientation at the tip of the arm with its hedgehog defect pointing outward, moves away from the micro-robot. Thus, colloid 1 is retained and colloid 2 is repelled from t=77s to t=135s.

Micro-Robotic Directed Assembly of Colloidal Structures

Figure 15A:
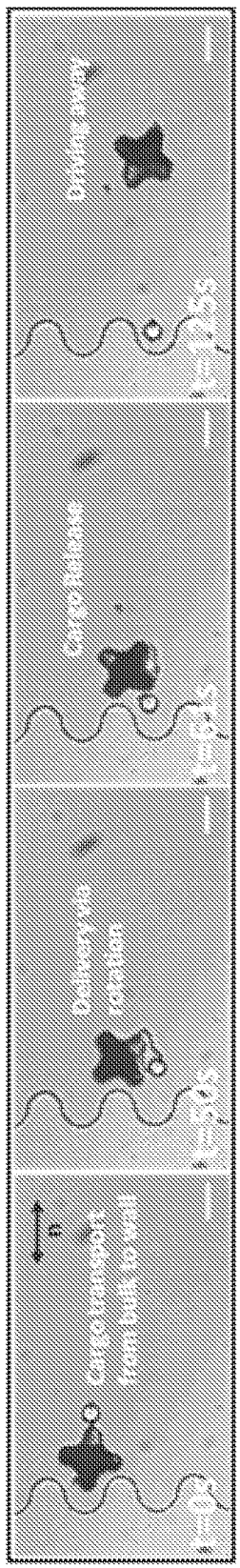
Figure 15D:
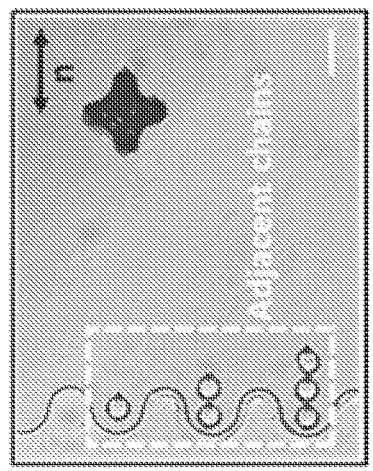
Figure 15B:
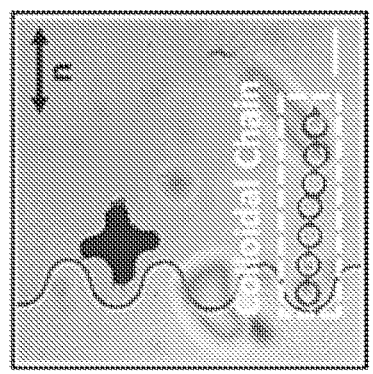
Figure 15C:
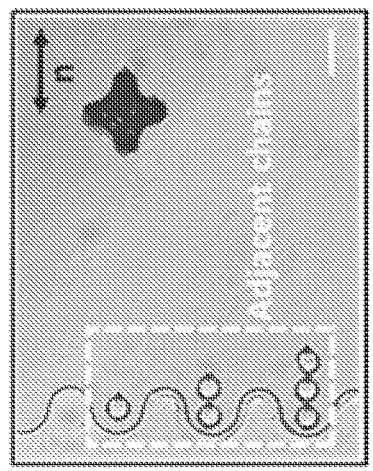

Having demonstrated the ability to assemble, transport and release passive cargo using our micro-robot, we further exploit the micro-robot for assembly of colloids and build structures by releasing these colloids near attractive sites on wavy walls (31, 34, 35). For example, a colloid in a dipole chaining configuration (FIG. 15A) was carried as cargo by a micro-robot. This cargo was released near an attractive well on a wavy micro-structure via rotational defect dynamics like those described above, including defect elongation, merger, separation, and recovery. Once detached from the micro-robot, the colloid migrates into the attractive well (FIG. 15A (iii)) and the micro-robot is driven away to retrieve a different colloidal building block in the domain. This process, which combines top-down direction by the micro-robot motion and bottom-up assembly via the emergent interactions between the colloid, the micro-robot and the wall, can be repeated and multi-element systems can be built. Depending on the design of the attractive sites, various colloidal structures can be constructed by the sequential addition of colloidal building blocks to prescribed sites. For example, using a bounding wavy wall as a construction site, as shown in FIG. 15A, multiple structures were constructed including a 1D colloidal lattice (FIG. 15B), a chain of 7 colloids (FIG. 15C) and a more complicated anisotropic structure (FIG. 15D). Our approach is material-independent as the nemato-elastic energy field is only dictated by the surface anchoring of the micro-robot and passive cargo which is defined by the initial surface treatment process and can be easily controlled. Thus, such micro-robotic assembly approach can be applied to functional building blocks made of differing materials for reconfigurable devices.

Trajectory Planning of Micro-Robot and Fully Autonomous Cargo Manipulation

The generation of strong magnetic field gradients on the micro- and smaller scales remains challenging and would hamper efforts to scale down this system to manipulate colloids of smaller radius. To address this issue, we exploit a defect-propelled swimming modality of nematic colloids using a purely rotating external field to actuate the micro-robot toward fully autonomous cargo manipulation (45). Upon rotation, the companion defect of the micro-robot undergoes periodic rearrangement in which the defect depins from the micro-robot's sharp edge and sweeps across the surface of the micro-robot; this occurs even as the defect hops between the micro-robots' arms as shown in FIG. 16A. This defect sweeping motion acts as a swim stroke that drives micro-robot swimming; via this effect, micro-robot rotation generates unidirectional translation. For example, the micro-robot with its top arm initially positioned in contact with the dashed line in FIG. 16A traveled a distance of 30.3 µm in one period of rotation (T=160s). Translational speed and direction are controlled by the rate and sense of rotation, as described in a detailed study of a rotating magnetic disk with similar hybrid anchoring in a separate study from our group (45). We use this modality to actuate and control the micro-robot trajectories as shown in FIGS. 16B and 16C. Mirror symmetric changes in micro-robot trajectory with respect to the axis perpendicular to the far field director were achieved by reversing the micro-robot's sense of rotation as shown in FIG. 16B. The direction of the external field of T=12s was reversed twice at the locations indicated by the red dashed lines which led to a N-shaped trajectory of the micro-robot. More complex changes of direction are also possible. The direction of micro-robot translation depends on the rate of rotation, affording an additional degree of control. As shown in FIG. 16C, by changing the period of rotation from 4s to 8s and finally to 16s at the locations indicated by the red dashed lines, the micro-robot moves along a curved trajectory. This ability to steer the micro-robot relies on the rotation-rate dependent defect elongation which enhances broken symmetry in the system. With the ability to steer and make sharp turns while translating purely by tuning the rotation rate and direction, the micro-robot can be exploited for fully autonomous micro-robotic cargo manipulation.

We demonstrate fully autonomous micro-robotic cargo manipulation using our 4-armed micro-robot under a programmable rotating magnetic field as shown in FIG. 17. The complete process was divided into four stages: (i) locomotion and approach, (ii) directed assembly, (iii) transport and (iv) release. Firstly, the micro-robot was driven towards a colloid, following an almost linear path of ~137 µm with an average speed of 1.71 µm/s under a clockwise rotating external field of T=4s (FIG. 17(*i*)). Upon cessation of rotation, the micro-robot recovers its static dipolar defect and the colloid is attracted and migrates a distance ~5.6a to dock in the dipole chaining configuration (FIG. 17(*ii*)). Note that the time required for this docking process depends on the initial separation distance between micro-robot and colloid which determines the strength of the elastic interaction; this time can be greatly reduced if the micro-robot is placed closer to the colloid. Here, we parked the micro-robot relatively far from the colloid in order to demonstrate the range of this interaction. Once assembled, the pair was rotated counterclockwise under the same period of T=4s. During this process, the micro-robot followed a linear path while the colloid follows a helical trajectory and travels an effective distance ~16.4a; the retention of the colloid is influenced by a complex interplay of defect-defect interaction and hydrodynamics (FIG. 17(*iii*)). Finally, upon reducing the period of rotation to T=20s, the extent of defect elongation is reduced, weakening the attractive interactions between the colloid and micro-robot's defects. The colloid is released from the micro-robot (FIG. 17(*iv*)), completing this fully autonomous cargo manipulation process.

Discussion

We have introduced the concept of driven micro-robots in NLC as physically intelligent systems imbued with the capability to sense, attract and assemble colloidal building blocks via material agnostic nemato-elastic interactions and to dynamically restructure their environment. This untethered micro-robotic platform in NLC can generate complex colloidal reconfigurable structures via a combination of top-down and bottom-up assemblies. The motion of micro-robots in NLC is strongly coupled to the highly anisotropic nematic organization, and vice versa, providing opportunity to dramatically reconfigure the elastic energy landscape and to write transient director fields into the domain for micro-robotic applications.

Here we have described micro-robots with shapes and surface chemistry designed to embed elastic energy landscapes and generate distinct emergent interactions with colloidal cargo. Furthermore, the micro-robot's rotational motion can deform its companion topological defect to generate rich non-equilibrium defect dynamics. We have exploited such dynamics as virtual functional structures that generate modalities of motion and interaction to enable reconfigurable assembly of passive building blocks with remarkable degrees of freedom. Finally, we have demonstrated a fully autonomous cycle of cargo manipulation using a swimming modality enabled by the dynamic defect, which propels micro-robot translation. This ability to generate dynamic force fields, dynamically restructure the topological defects and exploit them as functional structures for colloidal assembly greatly expands the opportunities for assembly of reconfigurable functional systems. We envision applications ranging from functional metasurfaces and devices to manage electromagnetic, including thermal, fields. Our approach, which exploits the nematic liquid crystals' anisotropic response to generate micro-robot-colloidal cargo interactions differs from existing approaches for reconfigurable devices that exploit nematic liquid crystal's optical birefringence. Should our approaches gain traction, the opportunity for impact is vast, as society has made tremendous investment in the grooming of liquid crystalline responses, for example, in the over $160B/year thin-film transistor (TFT) liquid crystal display industry (46).

The field of micro-robotics has spurred advancements in far-from-equilibrium soft matter colloidal physics. In this research, the highly nonlinear dynamic response of nematic liquid crystals revealed by the micro-robot's motion has generated open fundamental questions that are worthy of detailed study. For example, the micro-robot has hybrid anchoring and rough sharp edges whose impact on dynamic defect pinning/depinning and defect elongation thresholds remain to be elucidated. The elongated defect undergoes multiple complex rearrangements including the swim stroke and defect hopping instabilities whose dependence on micro-robot properties and rotational dynamics warrant further study. In far-from-equilibrium micro-robot/cargo interactions, transient defect-defect interactions including defect sharing, merger and separation play central roles in cargo fate.

Materials and Methods

Fabrication of Micro-Robots and Assembly of Planar NLC Cell

Micro-robots with dimensions shown in FIG. 10A were fabricated out of SU-8 photoresist (Kayaku Advanced Materials, Inc.) following lithographic processes on a supporting wafer. Thereafter, a layer of nickel was sputtered onto the surface using a Lesker PVD75 DC/RF Sputterer to make the colloids ferromagnetic. Subsequently, treatment with 3 wt % solution of N-dimethyl-n-octadecyl-3-aminopropyl-trimethoxysilyl chloride (DMOAP, Sigma-Aldrich) imposed homeotropic anchoring condition on the disk's Ni coated surfaces. Silica spherical colloids of 2a=25 µm (Spherotech Inc.) were also treated with DMOAP, washed and dried before adding into 4-cyano-4'-pentylbiphenyl (5CB, Kingston Chemicals). Finally, the micro-robots were released from the wafer and dispersed in a suspension of passive colloids in 5CB. Glass slides were spin-coated with polyimide (PI-2555, HD Microsystems) and rubbed with a velvet cloth along the desired direction to impose uniform planar anchoring. Two glass slides with uniform planar anchoring were assembled in an antiparallel fashion and glued together using a UV sensitive epoxy with two layers of 15 µm plastic spacers in between. The resulting thickness of the cell was ~50 µm. Finally, a mixture suspension of 5CB with micro-robots and passive colloids was introduced into the cell from the side by capillarity in the isotropic state of 5CB before quenching down to the nematic state. Depending on the thickness of the nickel layer, the coated micro-robot could either appear transparent (nickel layer~20 nm) or black (nickel layer~200 nm). While the transparent micro-robot allowed us to visualize the sweeping motion of the disclination line, micro-robots with thicker coating possess stronger magnetic moments, enabling faster rates of rotation and translation under external magnetic fields.

Application of External Magnetic Fields

Controlled rotations of the micro-robots were achieved by placing the assembled NLC cell in a rotating magnetic field generated by a custom-built magnetic control system. The system consists of two orthogonal pairs of electromagnetic coils (APW Company) mounted on an aluminum supporting structure arranged around the workspace. Visual feedback is provided by a CCD camera (Point Grey Grasshopper3 Monochrome) mounted on a Zeiss inverted microscope (ZEISS Axio Vert.A1). Each coil pair was powered independently using a programmable power supply (XG 850W, Sorensen) whose outputs were controlled by a Python algorithm written in-house. Sinusoidal time-dependent voltages are applied on each pair and the waveforms are separated by a $$\frac{\pi}{2}$$

phase lag to achieve a rotating field. The field gradient was applied by using a rectangular NdFeB magnets (K&J Magnetics, Inc.) held to the end of a tweezer. The magnet was placed roughly ~0.5 cm from the cell. The amplitudes of the magnetic field applied are measured using a magnetometer and are in the order of a few mT, far below the magnetic Fréedericksz transition threshold to reorient the NLC molecules, but sufficiently strong to overcome the drag and move the micro-robot in arbitrary directions.

Details on Numerical Modeling

Numerical simulations of static and dynamic nematic structures were performed using a Q-tensor order parameter formulation of nematodynamics. The scalar degree of order S and the director n are the largest eigenvalue and the corresponding eigenvector of the Q-tensor, respectively. Equilibrium configurations correspond to minima of the Landau-de Gennes free energy with volume density of $$f_{vol} = \frac{A}{2}Q_{ij}Q_{ji} + \frac{B}{3}Q_{ij}Q_{jk}Q_{ki} + \frac{C}{4}(Q_{ij}Q_{ji})^2 + \frac{L}{2}(\partial_k Q_{ij})(\partial_k Q_{ij}), \quad (1)$$

where A, B, C are phase parameters that dictate the degree of order in equilibrium homogeneous director field $S_{eq}$, and L is the elastic constant. Additionally, Fournier-Galatola planar-degenerate surface potential describes the anchoring of nematic molecules on the bottom surface of the active micro-robot $$f_{surf} = W(\tilde{Q}_{ij} - \tilde{Q}_{ij}^\perp)^2, \quad (2)$$

where $\tilde{Q}_{ij} = Q_{ij} + \frac{S_{eq}}{2}\delta_{ij}$, $\tilde{Q}_{ij}^\perp = (\delta_{ik} - v_i v_k)\tilde{Q}_{kl}(\delta_{lj} - v_l v_j)$, and $\vec{v}$ is the surface normal.

On the micro-robot's side wall, top surface and cell's top and bottom boundaries, the director field is fixed.

Equilibrium structures are found by using a gradient descent for the Q-tensor $$\dot{Q}_{ij} = \Gamma H_{ij}, \quad (3)$$

where $H_{ij}$ is the molecular field $$H_{ij} = -\frac{1}{2}\left(\frac{\delta F}{\delta Q_{ij}} + \frac{\delta F}{\delta Q_{ji}}\right) + \frac{1}{3}\frac{\delta F}{\delta Q_{kk}}\delta_{ij}$$

and $\Gamma$ is the rotational viscosity parameter.

On the planar degenerate surface, Q-tensor follows the dynamics of $$\dot{Q}_{ij}^{surf} = \Gamma_{surf}\left[\frac{1}{2}(H_{ij}^{surf} + H_{ji}^{surf}) - \frac{1}{3}\delta_{ij}H_{kk}^{surf}\right], \quad (4)$$

where $\Gamma_{surf}$ is the surface rotational viscosity parameter, and $$H_{ij}^{surf} = -\frac{\partial f_{vol}}{\partial(\partial_k Q_{ij})}v_k - \frac{\partial f_{surf}}{\partial Q_{ij}}$$

is the surface molecular field.

Simulations for the rotating micro-robot were solved in the rotating frame of the micro-robot, in which case the time derivative of the Q-tensor includes an additional term of $Q_{ik}\Omega_{kj} - \Omega_{ik}Q_{kj}$, where $\Omega_{ij}$ is the vorticity tensor of the rotating colloid corresponding to Er≈6.

Equation (3) was solved using a finite difference method on a 800×800×240 mesh. The dimensions of the micro-robot were H=75Δx, $r_1$=45Δx, and $r_2$=37.5Δx in accordance to FIG. 10A. Neumann boundary conditions are used in the lateral directions of the numerical simulation box. Mesh resolution is set to $$\Delta x = 1.5\xi_N = 1.5\sqrt{L/\left(A + BS_{eq} + \frac{9}{2}CS_{eq}^2\right)},$$

where $\xi_N$ is the nematic correlation length that sets the size of the defect cores. The following values of the model parameters are used:

B/A=12.3, C/A=−10.1, W=0.5L/Δx, $\Gamma_{surf}$=Γ/Δx, and a timestep of $0.1(\Delta x)^2/(\Gamma L)$.

Statistical Analysis

Strengths of micro-robot-colloid interaction were determined from at least three independent experiments for each mode for statistical significance.

4. K. Han, C. W. Shields IV, O. D. Velev, Engineering of Self-Propelling Microbots and Microdevices Powered by Magnetic and Electric Fields. *Advanced Functional Materials*. 28, 1705953 (2018).
5. A. C. H. Tsang, E. Demir, Y. Ding, O. S. Pak, Roads to Smart Artificial Microswimmers. *Advanced Intelligent Systems*. 2, 1900137 (2020).
6. B. Wang, K. Kostarelos, B. J. Nelson, L. Zhang, Trends in Micro-/Nanorobotics: Materials Development, Actuation, Localization, and System Integration for Biomedical Applications. *Advanced Materials*. 33, 2002047 (2021).
7. J. Elgeti, R. G. Winkler, G. Gompper, Physics of microswimmers—single particle motion and collective behavior: a review. *Rep. Prog. Phys.* 78, 056601 (2015).
8. C. Bechinger, R. Di Leonardo, H. Löwen, C. Reichhardt, G. Volpe, G. Volpe, Active Particles in Complex and Crowded Environments. *Rev. Mod. Phys.* 88, 045006 (2016).
9. A. Zöttl, H. Stark, Emergent behavior in active colloids. *J. Phys.: Condens. Matter.* 28, 253001 (2016).
10. J. Zhang, E. Luijten, B. A. Grzybowski, S. Granick, Active colloids with collective mobility status and research opportunities. *Chem. Soc. Rev.* 46, 5551-5569 (2017).
11. G. Gompper, R. G. Winkler, T. Speck, A. Solon, C. Nardini, F. Peruani, H. Löwen, R. Golestanian, U. B. Kaupp, L. Alvarez, T. Kiørboe, E. Lauga, W. C. K. Poon, A. DeSimone, S. Muiños-Landin, A. Fischer, N. A. Söker, F. Cichos, R. Kapral, P. Gaspard, M. Ripoll, F. Sagués, A. Doostmohammadi, J. M. Yeomans, I. S. Ammon, C. Bechinger, H. Stark, C. K. Hemelrijk, F. J. Nedelec, T. Sarkar, T. Aryaksama, M. Lacroix, G. Duclos, V. Yashunsky, P. Silberzan, M. Arroyo, S. Kale, The 2020 motile active matter roadmap. *J. Phys.: Condens. Matter.* 32, 193001 (2020).
12. M. Sitti, Physical intelligence as a new paradigm. *Extreme Mechanics Letters*. 46, 101340 (2021).
13. S. Floyd, C. Pawashe, M. Sitti, Two-Dimensional Contact and Noncontact Micromanipulation in Liquid Using an Untethered Mobile Magnetic Microrobot. *IEEE Transactions on Robotics*. 25, 1332-1342 (2009).
14. H.-W. Tung, K. E. Peyer, D. F. Sargent, B. J. Nelson, Noncontact manipulation using a transversely magnetized rolling robot. *Appl. Phys. Lett.* 103, 114101 (2013).
15. A. F. Demirörs, F. Eichenseher, M. J. Loessner, A. R. Studart, Colloidal shuttles for programmable cargo transport. *Nat Commun.* 8, 1872 (2017).
16. A. F. Demirörs, M. Tolga Akan, E. Poloni, A. R. Studart, Active cargo transport with Janus colloidal shuttles using electric and magnetic fields. *Soft Matter*. 14, 4741-4749 (2018).
17. Y. Alapan, B. Yigit, O. Beker, A. F. Demirörs, M. Sitti, Shape-encoded dynamic assembly of mobile micromachines. *Nat. Mater.* 18, 1244-1251 (2019).
18. N. Fang, H. Lee, C. Sun, X. Zhang, Sub-Diffraction-Limited Optical Imaging with a Silver Superlens. *Science*. 308, 534-537 (2005).
19. Y. Zhao, M. A. Belkin, A. Alù, Twisted optical metamaterials for planarized ultrathin broadband circular polarizers. *Nat Commun.* 3, 870 (2012).
20. A. Komar, Z. Fang, J. Bohn, J. Sautter, M. Decker, A. Miroshnichenko, T. Pertsch, I. Brener, Y. S. Kivshar, I. Staude, D. N. Neshev, Electrically tunable all-dielectric optical metasurfaces based on liquid crystals. *Appl. Phys. Lett.* 110, 071109 (2017).
21. E. Arbabi, A. Arbabi, S. M. Kamali, Y. Horie, M. Faraji-Dana, A. Faraon, MEMS-tunable dielectric metasurface lens. *Nat Commun.* 9, 812 (2018).
22. H. Wang, V. Prasad Sivan, A. Mitchell, G. Rosengarten, P. Phelan, L. Wang, Highly efficient selective metamaterial absorber for high-temperature solar thermal energy harvesting. *Solar Energy Materials and Solar Cells*. 137, 235-242 (2015).
23. P. Yu, L. V. Besteiro, Y. Huang, J. Wu, L. Fu, H. H. Tan, C. Jagadish, G. P. Wiederrecht, A. O. Govorov, Z. Wang, Broadband Metamaterial Absorbers. *Advanced Optical Materials*. 7, 1800995 (2019).
24. I. B. Liu, N. Sharifi-Mood, K. J. Stebe, Capillary Assembly of Colloids: Interactions on Planar and Curved Interfaces. *Annual Review of Condensed Matter Physics*. 9, 283-305 (2018).
25. W. Wang, J. Giltinan, S. Zakharchenko, M. Sitti, Dynamic and programmable self-assembly of micro-rafts at the air-water interface. *Science Advances*. 3, e1602522.
26. G. Grosjean, M. Hubert, N. Vandewalle, Magnetocapillary self-assemblies: Locomotion and micromanipulation along a liquid interface. *Advances in Colloid and Interface Science*. 255, 84-93 (2018).
27. T. Yao, N. G. Chisholm, E. B. Steager, K. J. Stebe, Directed assembly and micro-manipulation of passive particles at fluid interfaces via capillarity using a magnetic micro-robot. *Appl. Phys. Lett.* 116, 043702 (2020).
28. P. G. de Gennes, J. Prost, *The Physics of Liquid Crystals* (Clarendon Press, 1993).
29. H. Stark, Physics of colloidal dispersions in nematic liquid crystals. *Physics Reports*. 351, 387-474 (2001).
30. N. M. Silvestre, P. Patricio, M. M. Telo da Gama, Key-lock mechanism in nematic colloidal dispersions. *Phys. Rev. E*. 69, 061402 (2004).
31. Y. Luo, F. Serra, K. J. Stebe, Experimental realization of the "lock-and-key" mechanism in liquid crystals. *Soft Matter*. 12, 6027-6032 (2016).
32. I. Muševič, *Liquid Crystal Colloids* (Springer International Publishing, Cham, 2017; http://link.springer.com/10.1007/978-3-319-54916-3), *Soft and Biological Matter*.
33. I. I. Smalyukh, Liquid Crystal Colloids, 22 (2018).
34. Y. Luo, D. A. Beller, G. Boniello, F. Serra, K. J. Stebe, Tunable colloid trajectories in nematic liquid crystals near wavy walls. *Nat Commun.* 9, 3841 (2018).
35. Y. Luo, T. Yao, D. A. Beller, F. Serra, K. J. Stebe, Deck the Walls with Anisotropic Colloids in Nematic Liquid Crystals. *Langmuir*. 35, 9274-9285 (2019).
36. S. Čopar, M. Ravnik, S. Žumer, Introduction to Colloidal and Microfluidic Nematic Microstructures. *Crystals*. 11, 956 (2021).
37. C. Lapointe, A. Hultgren, D. M. Silevitch, E. J. Felton, D. H. Reich, R. L. Leheny, Elastic Torque and the Levitation of Metal Wires by a Nematic Liquid Crystal. *Science*. 303, 652-655 (2004).
38. S. Khullar, C. Zhou, J. J. Feng, Dynamic Evolution of Topological Defects around Drops and Bubbles Rising in a Nematic Liquid Crystal. *Phys. Rev. Lett.* 99, 237802 (2007).
39. J. B. Rovner, D. S. Borgnia, D. H. Reich, R. L. Leheny, Elastic and hydrodynamic torques on a colloidal disk within a nematic liquid crystal. *Phys. Rev. E*. 86, 041702 (2012).

40. A. Sengupta, U. Tkalec, M. Ravnik, J. M. Yeomans, C. Bahr, S. Herminghaus, Liquid Crystal Microfluidics for Tunable Flow Shaping. *Phys. Rev. Lett.* 110, 048303 (2013).
41. A. Eremin, P. Hirankittiwong, N. Chattham, H. Nádasi, R. Stannarius, J. Limtrakul, O. Haba, K. Yonetake, H. Takezoe, Optically driven translational and rotational motions of microrod particles in a nematic liquid crystal. *PNAS.* 112, 1716-1720 (2015).
42. L. Giomi, Ž. Kos, M. Ravnik, A. Sengupta, Cross-talk between topological defects in different fields revealed by nematic microfluidics. *PNAS.* 114, E5771-E5777 (2017).
43. Y. Yuan, G. N. Abuhaimed, Q. Liu, I. I. Smalyukh, Self-assembled nematic colloidal motors powered by light. *Nat Commun.* 9, 5040 (2018).
44. I. Muševič, M. Škarabot, U. Tkalec, M. Ravnik, S. Žumer, Two-Dimensional Nematic Colloidal Crystals Self-Assembled by Topological Defects. *Science.* 313, 954-958 (2006).
45. T. Yao, Ž. Kos, Y. Luo, E. B. Steager, M. Ravnik, K. J. Stebe, Topological defect-propelled swimming of nematic colloids. *arXiv:* 2109. 14584 [*cond-mat*] (2021) (available at http://arxiv.org/abs/2109.14584).
46. Global TFT-LCD Display Panel Market Report and Forecast 2022-2027, (available at https://www.expertmarketresearch.com/reports/tft-lcd-market).
47. F. C. Keber, E. Loiseau, T. Sanchez, S. J. DeCamp, L. Giomi, M. J. Bowick, M. C. Marchetti, Z. Dogic, A. R. Bausch, Topology and dynamics of active nematic vesicles. *Science.* 345, 1135-1139 (2014).
48. G. Duclos, R. Adkins, D. Banerjee, M. S. E. Peterson, M. Varghese, I. Kolvin, A. Baskaran, R. A. Pelcovits, T. R. Powers, A. Baskaran, F. Toschi, M. F. Hagan, S. J. Streichan, V. Vitelli, D. A. Beller, Z. Dogic, Topological structure and dynamics of three-dimensional active nematics. *Science* (2020), doi:10.1126/science.aaz4547.

Additional Disclosure—II

Topological defects on colloids rotating in nematic liquid crystals form far-from-equilibrium structures that perform complex swim strokes characterized by periodic defect extension, depinning, and contraction. These defect dynamics propel the colloid, generating translation from rotation. The swimmer's speed and direction are determined by the topological defect's polarity and extent of elongation. Defect elongation is controlled by a rotating external magnetic field, allowing control over particle trajectories. The swimmers' translational motion relies on broken symmetries associated with lubrication forces between the colloid and the bounding surfaces, line tensions associated with the elongated defect, and anisotropic viscosities associated with the defect elongation adjacent to the colloid. The scattering or effective pair interaction of these swimmers is highly anisotropic, with polarization-dependent dimer stability and motion that depends strongly on entanglement and sharing of their extended defect structures. This research introduces transient, far-from-equilibrium topological defects as a class of virtual functional structures that generate modalities of motion and interaction.

Colloidal propulsion and locomotion, features of active matter, are produced by diverse mechanisms in natural and synthetic systems (1-6). Self-propelled swimmers convert chemical energy to generate motion with examples including bacteria and algae (7-9) which swim by rotation of their flagella, Marangoni stress propelled droplets (10) move via gradients in surface stresses, and catalytic Janus particles (11, 12) which swim by phoretic motions generated by chemical reaction. Driven colloidal systems rely on external fields, including electrophoretic fields (13, 14), magnetic fields (15, 16) and thermophoretic motion driven by temperature gradients (17) to generate colloid translation.

Interactions of swimmers with their environment play roles in determining their dynamic behavior (18, 19). Hydrodynamic interactions, confinement, and swimmer geometry (4, 15, 20-23) are of use in such systems, as they affect locomotion speed and direction, and can lead to the formation of dynamic aggregates that can be harnessed as functional structures (24, 25).

Distinctly anisotropic environments like nematic liquid crystals (NLCs) provide means for controlling the microlocomotion via a combination of their internal orientational order—described by a headless vector field n called the director—and their highly anisotropic viscosities. NLC can exhibit topological defects or regions of lost orientational order in the form of lines, points or even walls that strongly affect the behavior of active nematic colloids (26-31). For example, bacteria align and move along the local director (32), causing them to accumulate at sites of splay and to be depleted from sites of bend (33). Self-propelled microdroplets powered by encapsulated bacteria move along paths that can be designed by patterning the NLC director field (31).

The anisotropy of nematogens and their orientational order also allow diverse electrokinetic effects that rely on the NLC fluid's dielectric anisotropy (34, 35). These effects have been harnessed to generate directed colloid motion and complex collective interactions. For example, electrophoretically driven colloids move along or perpendicular to the director field, made possible by the fluid's dielectric anisotropy (34, 35). Electrophoretically driven motion of Janus beads with metallic hemispheres have been studied to enhance the broken symmetry (36, 37). Electric field driven flow fields have also been harnessed; electrohydrodynamic rolls oriented within NLC have been exploited to direct the formation and motion of functional assemblies (38).

The presence and symmetry of defects on self-propelled colloids and droplets play essential roles in active colloid motion. For example, spherical colloids with dipolar defects move along paths influenced by periodic defect displacement and NLC tilt generated by confinement under AC electric fields (39). Defect asymmetry can allow more complex trajectories to emerge. For example, Marangoni-stress propelled NLC droplets lose axial symmetry by flow-induced displacement of their topological defects which generates torques that result in helical trajectories (40). This latter example shows the use of broken symmetry and topological defects in determining nematic colloid behavior and indicates the general use of dynamic effects in systems with topological defects.

In this work, we introduce the concept of swimming propelled by the dynamics of a far-from-equilibrium defect formed on rotating nematic colloids, as illustrated in FIG. 1. Specifically, we study disks with hybrid anchoring in planar cells filled with NLC; a dipolar companion defect loop (FIGS. 1A and 1B) forms adjacent to the disk, pinned on the disk's sharp edges. When the disk is rotated by an external magnetic field (FIG. 1C), we observe periodic defect rearrangements; the disclination loop sweeps along the disk's surface, performing a 'swim stroke' that propels the disk in a well-defined direction (FIGS. 1D and 1E). The translational velocity ti depends on the angular velocity ω, the sense of rotation, and the defect polarity. These swimmers exhibit complex interactions and form dynamic dimers whose stability depends on their polarization and the topology of their defects.

Results

Circular disk colloids were fabricated using lithographic methods and made magnetic by sputtering of a Ni film. Thereafter, homeotropic anchoring was imposed on the Ni coated surfaces and the disks were released from the substrate and dispersed in 4-cyano-4'-pentylbiphenyl (5CB). The resulting disks have hybrid anchoring, as the face of the disk that is not covered with Ni has degenerate planar anchoring. The colloidal suspension was introduced into the gap between two glass slides with uniform planar anchoring. As is customary in such experiments, these slides are arranged in an antiparallel arrangement to avoid biases in the nematic field by pre-tilt of the nematogens that can introduced by the process of imposing planar arrangement (41-43). Disks have typical thicknesses H=25 µm and radii a=37.5 µm; typical gap heights between top and bottom bounding surfaces $H_{GAP}$~50 µm unless otherwise specified. There is some variation in the gap thickness owing to the method of assembling the cell. Finally, the cell was placed in a rotating magnetic field generated by a custom-built magnetic control system which disk rotation is achieved via periodically addressing four electromagnetic coils configured around an inverted optical microscope. An image of the apparatus is provided in FIG. 29. Details are described in the Materials and Method section.

We have simulated equilibrium configurations which correspond to minima of the Landau-de Gennes free energy with a surface potential describing the anchoring of nematic molecules on confining surfaces. Because of the complexities of the system dynamics and the scale of the system, and the need to develop methods to capture defect pinning and de-pinning essential to the mechanics, we performed numerical simulations of nematodynamics in the limit in which the director field does not feedback into the hydrodynamics. Time evolution of the tensor order parameter is described by the Beris-Edwards model (44). While these simulations allow us to explore the stability of structures and their response to the disk's rotation, they are not a direct simulation of experiment. Further information concerning the model and the numerical approach can be found in the Materials and Methods section.

Defect Configurations Around the Nematic Colloids

When introduced into the NLC-filled planar cell, a complex defect initially forms on the colloid with two disclination loops that connect the top and bottom faces of the disk; these loops appear on either side of the disk arranged in a quadrupolar configuration (FIG. 30). Upon perturbation, the defect transforms irreversibly to a static dipolar configuration. Such transitions from metastable quadrupolar configurations to stablef dipolar defect configurations are well known for microscale spherical colloids with uniform homeotropic anchoring owing to the differences in elastic free energy related to gradients of the nematic distortion in the domain and the relative costs of the dipolar versus quadrupolar defect (26). For such colloids, the quadrupolar configuration is metastable, and is observed absent external fields in experiment only under strong confinement in cells of thickness similar to the colloid's diameter (45, 46). However, the disks feature sharp edges and hybrid anchoring, known to strongly influence defect configurations (47, 48). To probe the stability of the disk's defect configurations, we study disks in cells with different ratios of gap to disk thickness $$\Lambda = \frac{H_{Gap}}{H}$$

for characteristic disk thickness is H=25 µm. The quadrupolar defect configuration is typically observed on all disks immediately after quenching 5CB into the nematic phase. However, after the disks are rotated by the external magnetic field and that field is removed, the probability of observing the quadrupolar mode reduces significantly. Typically, unless very strongly confined, after perturbation, a dipolar defect forms at either pole aligned with the far field director with equal probability as shown in FIG. 31. This suggests that the quadrupolar configuration is metastable and is stabilized by confinement, and that the dipolar configuration is the stable state. Given the system's head to tail symmetry, dipolar defects form at either pole aligned with the far field director with roughly equal frequency. Dipolar defects along the y-axis at polar angle $$\theta = \frac{\pi}{2}$$

are termed P+ whereas those at $$\theta = -\frac{\pi}{2}$$

are termed P−.

The dipolar defect configuration features a single loop on one side of the disk (FIG. 1A). Numerical simulation (FIG. 1B) reveals that this defect is a disclination loop anchored at two locations on the degenerate planar face that extends along the side of the disk toward the homeotropic face. This figure shows a side view of the equilibrium configuration of the disk colloid with headless vectors that show the director field winding around the defect. Details of the simulation on equilibrium defect configurations around the disk can be found in FIGS. 32 and 33. The stable defect configuration is shown schematically in FIG. 1C. Fluorescence confocal polarizing microscopy (FCPM) (49) indicates that this disclination loop appears along the y axis, which corresponds to the direction of the far field director (FIG. 34A). Cross-sectional images in the xz- and xy-planes (FIGS. 34B and 34C) show that the defect loop extends from the bottom surface toward the top surface adjacent to the disk in agreement with numerical simulations. The dynamics of the dipolar defect configuration upon rotation of the disk generate complex responses with exciting implications.

Far-from-equilibrium defect propels swimming of individual nematic colloid

When the disk is rotated continuously and slowly, the dipolar defect undergoes a periodic rearrangement (FIGS. 1D and 1E), forming a complex dynamic topological structure whose dynamics propel the disk nearly perpendicular to the far field director as shown in FIG. 2A. This propulsion occurs even at small Ericksen number $$Er = \frac{\gamma \omega a^2}{K},$$

which characterizes the product of the disk rotation frequency ω and the natural time scale for relaxation in the nematic fluid $$\tau = \frac{\gamma a^2}{K}$$

determined by the balance of viscous and nemato-elastic stresses. In these expressions, γ is the rotational viscosity, a is the disk radius, κ is the elastic constant and ω is determined by the period T of the rotating field $$\omega = \frac{2\pi}{T}.$$

The disclination line initially stretches while remaining pinned on the disk's sharp edge, storing elastic energy in the form of effective line tension of the defect core as well as in elastic distortion of the NLC director field that deviates from equilibrium. These effects combined with material flow generate complex torques that cause the disk to tilt, with its projected area (black circles) oscillating twice in each period (FIG. 2B). When the stored energy is high enough to depin the defect, the disclination line contracts by sweeping across the disk's face and returns to its initial configuration. As this occurs, the disk flattens and subsequently weakly tilts again as the defect re-forms its dipolar configuration.

The directed sweeping motion of the far-from-equilibrium disclination line and the tilting motion of the disk play significant roles in generating the broken symmetries that propel the colloid swimmer. As shown in FIG. 2B, roughly half of the swimmer's displacement occurs in less than one fifth of the period. During this time, as labelled with pink rectangles in FIGS. 2B and 2C, the defect sweeps across the disk's surface, generating stresses in the thin gap between the disk and the bounding surface. As this occurs, the disk tilts and subsequently flattens. The disk's projected area allows the tilt angle to be determined; in this example, the disk reaches a maximum inclination angle of 12° with respect to the horizontal direction. The implication of this sweeping event can also be noted in the speed of the swimmer within one period as shown in FIG. 2C. A sharp peak of swimming speed along the translation direction v (red circles) is observed during the defect's sweeping motion. The defect causes the disk to tilt as it sweeps across the disk's face. The disk flattens after the defect's sweeping motion, generating broken symmetries essential to translation. The scallop theorem dictates that non-symmetric strokes are required to swim in Newtonian fluids in creeping flow. Similarly, in the limit of small Er, non-symmetric disclination line motion is required to achieve topological swimming in NLC.

To confirm the essential role played by the defect's swim stroke, and to demonstrate that forces from magnetic field gradients cannot produce the observed translation, we have performed a series of control experiments. We have rotated the same magnetic disk colloid in 5CB in the isotropic phase and in the nematic phase in our confined cell. The disk colloid translated with velocities of 0.025 μm/s in the isotropic phase and 0.94 μm/s in the nematic phase under the same rotating external field with period T=20s. These results confirm that magnetic field gradients over the length scale of the disk are too weak to drive the observed motion. Notably, the velocity in the isotropic phase is decreased even though the viscosity is reduced; the viscosity of 5CB decreases with temperature and is lower in the isotropic phase than in the nematic phase. For the above control experiments, and for all experiments presented here, the amplitude of the power supply to the coils is 24V.

Experiments were also performed with a much weaker amplitude voltage of 3V, and therefore much weaker magnetic field. In these experiments, the disks were rotated in 5CB in the nematic phase at identical Ericksen numbers. The translation speed of our swimmer under both fields are similar under the same Er (See FIG. 35). Since gradients in the experimental domain should scale with the magnitude of the applied voltage, these results also indicate that the swimmer is not driven by the field gradient.

Finally, we have performed experiments to confirm the implication of broken symmetries related to the dipolar defect's dynamics in generating translation. Rotation of disks with a quadrupolar defect translate much slower than the disks with dipolar defect due to reduced broken symmetry. For example, under the same rotating external field with T=60s, disks with a dipolar defect translate at a speed $v_{dp}=0.39\pm0.06$ μm/s while disks with quadrupolar defect translate at $v_{qp}=0.08\pm0.05$ μm/s in a Λ~2 cell (See FIG. 36). The rotated disks with quadrupolar defects also exhibit periodic disclination line pinning and release (FIG. 37). There is a relationship between the distortion of the quadrupolar defect configuration and the disk's translation speed. Under rotation, some of the quadrupoles become weakly polarized. Those with greater polarization have great broken symmetry and translate faster. Those that are more symmetric translate more slowly.

Defect Elongation, Swimming Direction and Trajectory Planning

The behavior of these topological swimmers can be characterized in terms of the Ericksen number; changes in swimming behavior at different Er show clearly that the propulsion is affected by both the nematic elasticity and flow. Notably, these effects are significant even for swimmers moving in creeping flow; the swimmer moves with Reynolds number $$Re < \frac{\rho \omega a^2}{\gamma}$$

on the order of $10^{-5}$ or less, where ρ is the density of 5CB. For slow rotation, the velocity v is linear in ω (inset in FIG. 3A) and is directed along an angle φ~90°, where φ is defined as the angle between the director and the translational velocity. The defect polarity and the disk's sense of rotation together determine the swimming direction, which can be reversed by changing the disk's sense of rotation. This reversal of swimming direction is reminiscent of single-flagellated bacteria which can reverse direction by changing their sense of flagellar rotation (50).

As ω increases (finite Er), v deviates from the linear relationship, reaching velocities in excess of 2 μm/s for the highest frequencies probed. Moreover, the angle φ in FIG. 3B, which characterizes the translation direction, decreases logarithmically with Er. In this regime, highly non-linear coupling between the flow and director fields, also referred to as the backflow effect, cause the defect to elongate significantly, as shown in FIG. 3C.

Defect elongation adjacent to the disk further breaks the symmetry of the system and biases the swim direction, as zones of reduced nematic order have lower effective viscosity. The degree of defect elongation depends on defect depinning from the rough, sharp edges of the disk, which has a stochastic character, explaining the broad range of φ observed for different disks at a given Er. Consider a P+ dipole; under CCW rotation, the defect on a disk elongates primarily in the quadrant defined by $$\frac{3\pi}{2} \leq \theta \leq 2\pi.$$

This generates a zone of reduced effective viscosity, causing the disk to swim in the direction of the elongated defect along a path that forms an angle $$\frac{\pi}{2} - \phi$$

with respect to the −x axis. Under CW rotation, this same disk's defect elongates in the quadrant $$0 \leq \theta \leq \frac{\pi}{2}$$

causing the disk to swim along a path with angle $$\frac{\pi}{2} - \phi$$

with respect to me x-axis. The dependence of swimming direction on Er gives rise to additional control for trajectory planning. Swimmers move along a path, and, upon reversal of the sense of rotation, follow trajectories that are mirror symmetric with respect to the x-axis (FIGS. 4A and 4B) with some turning angle $\Theta = \pi - 2\phi$.

Furthermore, at any value of Er, owing to the symmetries of the system and the fact that the nematic director is a headless vector, colloids with opposite defect polarities migrate in opposite directions under the same external field. FIG. 4A illustrates both the mirror symmetric trajectories and the motion of colloids with opposite polarities in opposite directions. Two disks with opposite defect polarity at t=0s move in opposite directions (red arrows) under the same external field. When the sense of disk rotation is reversed by changing the external field from CCW to CW rotation (indicated by the red dashed lines in FIG. 4A), the swimmers execute V-shaped trajectories. Further experimentation shows that, as expected, the turning angle increases with Er (FIGS. 4B and 4C). However, these responses are also affected by the stochastic character of the defect elongation, causing different disks to follow a broad range of turning angles at any given Er (FIG. 4C).

Finally, the dependence of translation direction on Er can be exploited to steer the swimmer during rotation; the defect-propelled colloid followed a curved path by tuning the rate of rotation of the swimmer at locations indicated by the red dashed lines as shown in FIG. 4D. By exploiting these dependencies, a disk colloid with given defect polarity can explore a half space by simply tuning the sense of rotation and frequency of the external field.

Scaling Analysis of the Propulsion Mechanisms

We attribute the observed swimming behavior to mechanisms associated with the presence of the topological defect and the associated anisotropic order within the NLC. Here, we characterize the relevant mechanisms in terms of the disk size, viscoelastic properties of the nematic, and disk rotation frequency to estimate the swim velocities that each mechanism can produce.

We first consider the effects of elastic stress exerted on confined objects in a nematic medium, which is described by a stress tensor formulated by Ericksen (42). The elastic stress displaces objects in order to minimize the nematic elastic free energy. Assuming that the length scale over which the director distortion occurs is of the order of disk radius a, the elastic stress scales as $$\sigma_K \Box \frac{K}{a^2}.$$

The associated elastic force is calculated by integrating the elastic stress over the disk surface, which scales as $2\pi a^2 + 2\pi aH$ where the disk's thickness H∼2/3a. The resulting propulsion force is therefore of the order of $$F_K \Box \frac{10\pi K}{3}.$$

Another approach to estimate the elastic force on the disk is through the concept of defect line tension. Geometric frustration due to the rotation of the disk generates a periodic reshaping of a pinned defect line. During this swim stroke, the pinned defect line pulls on the colloidal particle. The elongated pinned defect line acts on the disk surface with a force $\pi K/4 \ln(a/a_{core})$ (51), where we have again used the radius a as a measure of the length scale and $a_{core}$ is the size of defect line cores. (For 5CB $a_{core}$ is of the order of a few nm). As the logarithmic factor changes very slowly with a and the result for the experimental radius is similar in magnitude to the $F_K$ above, we shall use the scaling of $$\frac{10\pi K}{3}$$

in our analysis. At equilibrium, elastic forces act symmetrically on the disk and therefore generate no propulsion. As the nematic configuration is periodically driven out of equilibrium at low Er, the disclination line elongates quasi-statically, depins, and contracts at the rate determined by the balance of elasticity and viscosity. The periodic reshaping of the disclination line leads to elastic stresses acting on the disk surface and the corresponding upper estimate of the propulsion speed can be estimated $$v \sim \frac{F_K}{C_D} \sim \frac{10\pi K}{3C_D} \qquad (5)$$

where $C_D$ is the drag coefficient of the disk translating between two plates and η is the estimated average viscosity of 5CB. For a disk translating in a confined environment between two parallel plates, the drag coefficient is estimated from lubrication theory as $$\frac{C_D}{\eta a} \sim \frac{4a}{h_0} + \frac{4a}{h_1},$$

where $h_0$ and $h_1$ are the gap thickness between the disk surface and the bottom plate and the top plate, respectively. For a typical experiment, FCPM reveals that $$h_0 \sim \frac{1}{2}h_1 \sim 8.6 \mu m.$$

By defining a dimensionless parameter $$\varepsilon = \frac{h_0}{2a},$$

the drag coefficient can be estimated as $$C_D = \eta a \frac{3}{\varepsilon}.$$

Using these expressions for $F_{prop}$ and $C_D$, and relevant parameter values of K=6.5 pN (51), a=37.5 µm, and η=0.064 Pa s (51), we predict a translational velocity $$v \sim 1.08 \frac{\mu m}{s}$$

Note that, while the disk rotation frequency is not explicitly included in Eq. 1, it enters through the periodic forcing of the elastic deformation.

We next consider the lubrication forces associated with the flow generated by the defect's sweeping motion. The disk periodically tilts and flattens as the disclination line elongates and sweeps across its surface. The resulting flow results in a hydrodynamic force in the thin gaps between the disk and the bounding plates. On the top face of the disk, where the defect performing the swim stroke is absent, the disk does not experience a net force due to the scallop theorem since the tilting and flattening are completely reversible. However, below the disk, as the defect sweeps over the bottom face, it causes the disk to tilt. The disk then flattens after the defect has left the gap. The resulting difference in viscosity in the thin gap with and without the defect avoids the constraints of the scallop theorem, and results in a net hydrodynamic force on the disk.

To estimate this hydrodynamic force, we assume the thickness of the liquid film absent tilt between the disk and the bottom wall $h_0$ is small compared to the disk radius a, consistent with experiment. Defining the small parameter $$\varepsilon = \frac{h_o}{a} \ll 1,$$

we expand Stoke's equation for an incompressible fluid to find the thin film equations (52, 53). We integrate these equations to find the pressure field exerted on the disk and integrate the pressure field to find the hydrodynamic force.

We consider one cycle of disk tilting and flattening generated by the defect's sweeping motion; the tilting and flattening events each occur over time 0.3T. The disk tilts with $\dot{\alpha}>0$ in the presence of the defect between the disk's surface and the bottom confining wall. The disk flattens with $\dot{\alpha}<0$ after the defect has left this thin gap. When the defect is present, the film has an effective viscosity $\eta_{defect}$. When the defect is absent, the film has the viscosity representative of bulk nematic η. We approximate the disk as a plate of width and length given by twice the disk radius a. Defining $\rho_0 = \alpha\varepsilon^{-1}$, the x-directed force is $$F = -\frac{6a\dot{\alpha}}{\alpha^3}h_0\eta^*\left(\ln\frac{(2+\rho)}{(2-\rho)}(12-\rho^2)-12\rho\right)$$

where $\eta^*$ is either $\eta_{defect}$ or η depending on whether the defect is present or absent. Using this expression, the velocity over the cycle can be estimated $$v \approx \frac{1}{C_D}(F_{defect}+F_{no-defect}) = \qquad (2)$$

$$\left(\frac{a\eta}{C_D}\right)\frac{6h_0|\dot{\alpha}|}{\alpha^3}\left(\frac{\Delta\eta}{\eta}\right)\left(\ln\frac{(2+\rho)}{(2-\rho)}(12-\rho^2)-12\rho\right) \text{ where } \frac{\Delta\eta}{\eta} = \frac{\eta-\eta_{defect}}{\eta}$$

falls in the range of 0.01-1 (31). For the swim stroke reported in FIG. 2, T=40s and the average tilt angle during the tilting event is $\alpha_{avg}$=6.0°≈0.105. The rate of disk tilting can be estimated $\dot{\alpha}=\alpha_{max}/(0.3T)\approx8.7\times10^{-3}\text{s}^{-1}$. Using these values and the aforementioned drag coefficient, we estimate the translational velocity in the x direction $$v = 2.50\frac{\Delta\eta}{\eta}\mu m/s.$$

This indicates that the translation speed during this part of the swim stroke will be in the range of ~0.02-2.50 µm/s depending on the viscosity ratio. The expansion of the Stoke's equations to find the thin film equations was performed for finite tilt angle comparable to the small parameter, i.e. $\alpha \Box \varepsilon$. The resulting force expression is singular in the limit as the small parameter tends to zero. However, to consider the behavior for $\alpha \ll \varepsilon$, the expansion can be repeated and the singularity in α would be relieved.

Finally, we consider the anisotropic viscous stresses on either side of the disk owing to the presence of the elongated defect adjacent to the disk. As the disk rotates in the nematic fluid, it experiences a viscous force that is dependent on the structure of the nematic field. The side of the disk with the nematic defect present is a region of different, and in principle lower (40), effective viscosity than the opposite side of the disk. Such a difference in viscosities can explain the behavior of spinning disks at higher Er in which the elongated defect structure determines the direction of the swimmer. To estimate the magnitude of propulsion velocity due to this anisotropy in viscous stresses, we assume that the effective viscosity on the side that contains the defect to be $\eta_{1,side}$ while that absent the defect is $\eta_{2,side}$. The shear at the disk side wall of height H is estimated as $v_{sidewall}=\omega a$. The shear force density on the side wall therefore equals $dF_1/dS=\eta_{1,side}\omega$ in the region with the defect. Integrating over $dS=aHd\theta$, we obtain $$F_1 = \int_0^\pi d\theta a h\omega \eta_{1,side}\sin\theta = 2ah\omega\eta_{1,side}.$$

The net force on the disk can then be written as $$F \sim F_1 - F_2 = 2ah\omega\eta \frac{\Delta\eta_{side}}{\eta}, \text{ where } \frac{\Delta\eta_{side}}{\eta} = \frac{\eta_{1,side} - \eta_{2,side}}{\eta} \approx \frac{\Delta\eta}{\eta}.$$

The net force generates a disk translational velocity of $$v \sim \frac{2H\omega}{C_D} \frac{\Delta\eta}{\eta}. \quad (6)$$

For experimental parameters at $\omega = 1s^{-1}$, this estimate yields a velocity in the range ~0.02-2 µm/s.

These estimates provide an upper bound on the propulsion mechanism. The estimation of the velocity spans two orders of magnitude due to the uncertainty of the term $$\frac{\Delta\eta}{\eta}.$$

This value, to our knowledge, cannot be accurately specified, especially for far-from-equilibrium systems like ours. Therefore, we used the range 0.01-1 commonly cited in the literature (31) for thermotropic nematics (51, 54).

There are interesting open issues associated with the defect-driven swimming. For example, the elongation and subsequent instability of the disclination line along the rotating disk's edge, captured both in experiments (FIGS. 1D and 1E) and simulation in the de-coupled limit (FIG. 38) play a prominent role in the swimming phenomenon. Edge roughness may also play a role promoting disclination line pinning (FIG. 40).

Thus far, we have studied how defects are re-structured by the disk's rotation in the limit that elasticity does not feed back into the flow. A full numerical simulation of these phenomena in a fully coupled limit is a focus of ongoing work. These simulations require that we model defect pinning and de-pinning on rough interfaces and sharp edges; these physics are not addressed in current methods. A pathway towards modeling pinned defects is to introduce a critical energy barrier in the surface molecular fields that drive the surface director reorientation; the magnitude of this barrier would be linked to the edge/surface roughness.

To conclude, we have considered two forces that contribute to the swimming motion, and a mechanism to explain the manner in which the elongated defect can bias swimming direction. These include elastic forces owing to gradients in the nematic director field, lubrication forces in the thin film between the disk and bounding surfaces, and anisotropic viscous forces on either side of the disk, respectively. Scaling analyses of the three propulsion mechanisms generate estimates for the swimming speed like that observed in experiment. It is likely that all three effects contribute. This is not surprising, as all mechanisms are due to pushing the nematic configuration out of equilibrium.

Confinement

Analysis suggests that the swimming modality depends crucially on elastic stresses and lubrication forces under the disk as the defect performs its swim stroke. To probe the role of confinement in this swimming modality, we have studied our swimmer in cells of different $2 \leq \Lambda \leq 7.6$. For fixed Er=1.8, weaker confinement allows the disks to tilt to slightly larger angles as shown in FIG. 5A, while the thickness of the film beneath the disk remains on the order of ~10 µM. The translational speed is similar among the disks (FIG. 41). Furthermore, for $0.3 \leq Er \leq 1.8$ the swimmers move with similar translational speed as shown in FIG. 5B. Without being bound to any particular theory or embodiment, this supports the concepts advanced in the scaling analysis that the elasto- and hydro-dynamics in the thin film beneath the disk play a prominent role and the dynamics in the film above the disk may plan a lesser role.

At very slow rotation and very weak confinement, however, (e.g., Er=0.06; $\Lambda$=6 and $\Lambda$=7.6), the defect's swim stroke is lost. Rather, the disk's motion is highly complex, tilting onto its side with $\alpha$~90°, and flopping down, translating as it does so, as shown in FIG. 5C. As this occurs, the defect becomes unstable and drives complex three-dimensional motions of the disk. This behavior is akin to that explored previously in the literature in which anisotropic particles forced to rotate in NLCs display shape-dependent responses, as their companion defects become topologically unstable and rearrange with complex colloidal dynamics (55-58). These observations underscore the use of confinement in limiting the disk's tilt to weak slopes.

Dynamic Defect Interactions Determine Dynamic Dimer Stability

While the main focus of this paper is to introduce the defect-propelled swimming modality, we present a discussion of pairs and multibody interactions to show the use of far-from-equilibrium defects in these interactions.

Pair interactions among swimmers depend strongly on the relative polarity of the two swimmers and the topology of their defects. At rest, two swimmers with opposite polarity self-assemble in an antiparallel manner (FIG. 6A) similar to their spherical counterparts with homeotropic anchoring (59). Swimming introduces dynamic interactions. The stability of dynamic dimers of opposite polarity depends strongly on rotation rate, as shown in FIGS. 6B and 6C. In FIG. 6, we show representative behavior for a pair of disks rotated at different frequencies. At Er~0.92, the two swimmers co-rotate as a dimer for a short period of time, separate and move away from each other (first row, FIG. 6B and red squares, FIG. 6C). For faster rotation (Er~1.83), the swimmers re-form a bonded dimer after a small gap is created during the co-rotation (second row, FIG. 6B and blue triangles, FIG. 6C). We hypothesize that such distinct dynamic interactions result from the interplay of repulsive interaction between splay distortions from the disk's curved boundaries and attractive defect-defect interactions. Further increases in Er above a threshold leads to stable dimer co-rotation (bottom row, FIG. 6B; separation distance is indicated by yellow circles, FIG. 6C). For these rotation rates, the defects become elongated enough to entangle and merge to cement stable dimers. The anti-symmetric arrangement of the individual disks in dimers formed by swimmers of opposite polarity promotes stable rotation without significant translation. For example, an individual colloid swims at an average velocity of 0.55 µm/s while a dimer translates at 0.031 µm/s under the same field at Er=1.8.

Disk-to-disk variation affects these dynamics and thresholds. For example, we study a pair of disks which co-rotate about each other with complex dynamics, separating and re-joining, with period for their complex motions $T_{CO}$ typically greater than the disk rotation period for 0.3 Er in a $\Lambda$=2 cell (FIG. 42A). Similar results are found for more weakly confined disks, with $\Lambda$=3.8 (FIG. 42B). We also report a pair of disks which form a stable dimer at Er=3.6 but migrate apart for Er=1.8 in $\Lambda$=2 cell (FIG. 42C).

Disk-to-disk variation in defect elongation can also strongly impact the stable dimer rotational dynamics. For example, two dimers formed by disks of opposite defect polarities rotate at very different speeds under an external rotating field of period T=6s. While the two swimmers in the lower left dimer co-rotate at a faster rate of 34.2s per period, the other dimer on the right rotates nearly three times slower, at a rate of 113.0s per period. We attribute this difference in rotational dynamics to the different extents of defect elongation, as one of the swimmers in the slower dimer has a very weakly elongated defect in comparison to the others. For our individual swimmers, there is a stochastic element to the defect elongation, which relies on pinning on, depinning from, and elongation of the defect adjacent to the disk's random rough sharp edges. These differences in elongation alter the dimer formation and rotational dynamics as well.

For disks of similar polarity, dimer formation also depends strongly on Er which determines defect topology. Disks with distinct, separate elongated defects co-migrate in the same direction without forming a dimer. However, above some threshold, the defects of the two disks merge to form a complex shared structure holding the two swimmers together with enhanced broken symmetry; the dimers rotate and translate, as shown in FIG. 6D, with an average speed of 2.07 µm/s, similar to that of an individual swimmer under the same external field. As swimmers within such dimers orbit their partner, they follow helical trajectories as shown in the last frame of FIG. 6D. The observed co-rotation period for these dimers of 45.7s±1.8s is far longer than the driving field T=4s. In all cases, the dimers rotate with angular velocities far slower than the rate of rotation of the external field.

Finally, multibody interactions occur that rely on dynamic interaction between the extended defects of multiple swimmers. For example, the formation and breakdown of an unstable trimer been observed, as shown in FIG. 7, where a third swimmer (labeled as 3) enters a stable dimer formed by two swimmers (labeled as 1 and 2), interacts with both swimmers via their extended defects, and eventually leaves the dimer and proceeds independently.

Discussion

In this work, we introduce topological defect-propelled swimming of nematic colloids. We develop rotating magnetic disk colloids with complex, elongated defects which perform a ' swim stroke' that drives their translation. Geometric frustration dominates for small rotation rates, and the colloid's speed is linear in Er. At faster rotation rates, significant defect elongation allows the swimming direction to be tuned for path planning. These defect-propelled swimmers exhibit far-from-equilibrium pair interactions that differ significantly from their static dipolar counterparts.

The swimming of our nematic colloid and its reliance on far-from-equilibrium defect dynamics make our system highly distinct from systems of spherical paramagnetic and ferromagnetic colloids in isotropic fluids. Typically, the colloids in these systems are rotated about an axis in the plane of the confining cell, so that they exhibit rolling (16, 60-62). These rollers display rich interactions and intriguing collective dynamics including synchronization and the formation of unstable fronts. We expect that collective dynamics will emerge in our system as well. The dependence of dimer dynamics in our system on far-from-equilibrium defect dynamics suggests that collective behavior will also depend on defect elongation and entanglement thresholds.

The field of active colloids is developing in tandem with the fields of micro-robotics and reconfigurable materials. The defect driven motion of colloidal micro-swimmers could be harnessed in this context (63), to exploit defect driven micro-swimmers that interact with passive colloidal cargo to build functional structures.

In conclusion, defect-propelled swimming of nematic colloids opens opportunities for soft materials manipulation and unveils open, exciting questions. For example, our disks have sharp edges and hybrid anchoring conditions which generate defects that are not clearly defined by the Poincaré-Hopf or Gauss-Bonnet theorems that relate uniform anchoring to required topological charge (48, 64). Under quasistatic rotation, the defect elongates along the disk's edge and subsequently depins from the edge; the physics that regulate these transitions and their relationship to colloid geometry are unexplored. Under finite Er rotation, the dipolar defect elongates in the flow field by a dynamic instability. Our colloids also form shared, dynamically changing defects that merge and separate, subject to topological transitions whose rules are far from evident. Finally, we have reported dynamic dipolar interactions for nematic colloids, introducing a spinner colloid with significantly rate-dependent interactions. We have shown that dynamic defect interactions play primary roles in pair interactions and multibody effects.

Materials and Methods

Fabrication of Ferromagnetic Disk Colloids and Assembly of Nematic Liquid Crystal (NLC) Cell Circular disk colloids of diameter 2a=75 µm and thickness H=25 µm were fabricated out of SU-8 photoresist (Kayaku Advanced Materials, Inc.) following standard lithographic processes on a supporting wafer. Thereafter, a layer of Ni was sputtered onto the surface using a Lesker PVD75 DC/RF Sputterer to make the colloids ferromagnetic. Subsequently, treatment with 3 wt % solution of N-dimethyl-n-octadecyl-3-aminopropyl-trimethoxysilyl chloride (DMOAP, Sigma-Aldrich) imposed homeotropic anchoring conditions on the disk's Ni coated surfaces. The treated disk colloids were then released from the wafer and dispersed in 4-cyano-4'-pentylbiphenyl (5CB, Kingston Chemicals). Glass slides were spin-coated with polyimide (PI-2555, HD Microsystems) and rubbed with a velvet cloth along the desired direction to impose uniform planar anchoring. To form cells with gap heights $H_{Gap}$~50 µm, two glass slides with uniform planar anchoring were assembled in an anti-parallel fashion and glued together using a UV sensitive epoxy with two layers of 15 µm plastic spacers in between. To avoid any artifacts from pre-tilt (tilting away from an angle parallel to the surface) of the nematogen, the rubbed slides are typically assembled in anti-parallel arrangements in experiments in planar cells (41-43). This reduces bend deformations in the domain that might arise from this effect. To fabricated cells with larger gap widths, spacers of different height were used to configure the cells. Finally, a suspension of disk colloids in 5CB was introduced into the cell by capillarity in the isotropic state of 5CB. Depending on the thickness of the nickel layer, the coated disk could either appear transparent (nickel layer~20 nm) or black (nickel layer~200 nm). While the transparent disk allowed us to visualize the swim stroke across the surface of the disk, colloids with thicker coating possess stronger magnetic moments, enabling faster rates of rotation.

Controlled Rotation of Disk Colloids

To rotate the magnetic disk colloids, the assembled NLC cell was placed in a rotating magnetic field generated by a custom-built magnetic control system. The system consists of two orthogonal pairs of electromagnetic coils (APW Company) mounted on an aluminum supporting structure arranged around the workspace. Visual feedback was provided by a CCD camera (Point Grey Grasshopper3 Monochrome) mounted on a Zeiss inverted microscope (ZEISS Axio Vert.A1). Each coil pair was powered independently using a programmable power supply (XG 850W, Sorensen) whose outputs were controlled by a data acquisition board (USB-3104, Measurement Computing) and a Python algorithm written in house. Sinusoidal time-dependent voltages of identical amplitudes are applied on each pair and the waveforms are separated by a π/2 phase lag in order to achieve a circularly rotating field whose periods varied from 4s to 1200s for this study. The schematics and picture of the setup is shown in FIG. 34.

Characterization of Static Dipolar Defect Using Fluorescent Confocal Polarizing Microscopy (FCPM)

The configuration and location of the defect in a dipolar configuration around a disk colloid along the vertical z-axis was determined by FCPM (49). The NLC, 5CB, was doped with an anisotropic dye N,N'-Bis(2,5-di-tert-butylphenyl)-3, 4,9,10-preylenedicarboximide (BTBP; Sigma Aldrich) at 0.01 wt %. At such low concentration, dye molecules co-align with the NLC molecules while preserving the properties of 5CB and fluoresce when aligned parallel to the polarization direction of the excitation light. FCPM images of the disk colloid with a dipolar defect in a planar NLC cell were obtained using an inverted IX81 Olympus microscope equipped with an FV300 Olympus confocal scan box. A polarizer was placed between the sample and the objective to rotate the polarization of the scanning laser.

Characterization of Surface Roughness of the Disk Colloids Using Atomic Force Microscopy (AFM)

The surface roughness of the top and side surfaces of the disk colloid after Ni deposition was characterized using a Bruker Icon AFM in standard tapping mode. Characterization of a 10 μm×10 μm area gave a root-mean-square roughness $R_q$=3 0.29 nm with a peak value of 107 nm, indicating that the top surface is nanoscopically smooth with a few isolated rough sites in the hundred nanometer range as shown in FIGS. 40A and 40B. The roughness of the side surface was obtained by placing the disk on its side, adhered to a planar support. The root-mean-square roughness $R_q$ of a 3 μm×3 μm scanning area (FIGS. 40C and 40D) was 19.4 nm with a peak value of 213 nm. The side surface has greater roughness than the top surface. We attribute such surface roughness to non-uniform Ni deposition and typical resolutions achieved in 2D UV photolithography. These rough sides can facilitate the pinning of the disclination line. It is interesting to note that the roughness on the sides and edges are similar in size to the defect core ~10 nm.

Numerical Simulations

We performed numerical simulations using a Q-tensor order parameter description of nematodynamics. The director field n is obtained as a main eigenvector of the Q-tensor and the degree of order S as its main eigenvalue. Equilibrium structures correspond to a minimum of the free energy $$F = \int_{bulk} dV \left[ \frac{A}{2} Q_{ij} Q_{ji} + \frac{B}{3} Q_{ij} Q_{jk} Q_{ki} + \frac{C}{4} (Q_{ij} Q_{ji})^2 + \frac{L}{2} (\partial_k Q_{ij})(\partial_k Q_{ij}) \right] + \int_{disk\ bottom\ surf.} dS W (\tilde{Q}_{ij} - \tilde{Q}_{ij}^\perp)^2 \quad (7)$$

which is calculated from the bulk and the surface contributions. The parameters A, B, and C are nematic phase parameters that dictate the degree of order in the equilibrium homogeneous director field $S_{eq}$. The quantity L is the tensorial elastic constant and is directly proportional to the director elastic constant κ. The surface integral is performed only over the disk bottom surface, where the anchoring of nematic molecules is planar degenerate. On the disk side walls, disk top surface and the cell's top and bottom boundaries, the director field is fixed. The planar-degenerate surface is modeled by a Fournier-Galatola potential (67), where $$\tilde{Q}_{ij} = Q_{ij} + \frac{S_{eq}}{2}\delta_{ij},\ \tilde{Q}_{ij}^\perp = (\delta_{ik} - v_i v_k)\tilde{Q}_{kl}(\delta_{lj} - v_l v_j),$$

and $\vec{v}$ is the surface normal.

Q-tensor dynamics are described by the Beris-Edwards model (51)

$$\dot{Q}_{ij} = \Gamma H_{ij} + S_{ij}, \quad (8)$$

where the dot represents the advective time derivative, $H_{ij}$ is the molecular field driving the nematic orientation towards a free energy minimum $$H_{ij} = -\frac{1}{2}\left(\frac{\delta F}{\delta Q_{ij}} + \frac{\delta F}{\delta Q_{ji}}\right) + \frac{1}{3}\frac{\delta F}{\delta Q_{kk}}\delta_{ij} \quad (9)$$

and Γ is the rotational viscosity parameter. $S_{ij}$ describes the nematic response to flow gradients $$S_{ij} = (\zeta A_{ik} - \Omega_{ik})\left(Q_{kj} + \frac{\delta_{kj}}{3}\right) + \left(Q_{ik} + \frac{\delta_{ik}}{3}\right)(\zeta A_{kj} + \Omega_{kj}) - 2\zeta\left(Q_{ij} + \frac{\delta_{ij}}{3}\right)Q_{kl}\partial_l v_k, \quad (10)$$

where $\vec{v}$ is the flow field, $A_{ij}=(\partial_i v_j+\partial_j v_i)/2$, $\Omega_{ij}=(\partial_i v_j-\partial_j v_i)/2$, and ζ is the nematic alignment parameter. On the planar degenerate surface, the Q-tensor follows the dynamics of $$\dot{Q}_{ij}^{surf} = \Gamma_{surf}\left[\frac{1}{2}(H_{ij}^{surf} + H_{ji}^{surf}) - \frac{1}{3}\delta_{ij}H_{kk}^{surf}\right] \quad (11)$$

where $\Gamma_{surf}$ is the surface rotational viscosity parameter, and $$H_{ij}^{surf} = -\frac{\partial f_{vol}}{\partial(\partial_k Q_{ij})}v_k - \frac{\partial f_{surf}}{\partial Q_{ij}}, \quad (12)$$

is the surface molecular field, calculated from the bulk and surface free energy density given by Eq. (4).

Simulations in which the disk does not rotate were solved for the fluid at rest. For simulations with a rotating disk, the flow field was calculated by a lattice Boltzmann method with a moving boundary condition, and the resulting stationary flow field was used in Eq. (5). Simulations were performed using a finite difference method to solve Eq. (5). The simulation in FIG. 33 was obtained on a 580×580×140 mesh size with disk radius a=105Δx and disk height h=70Δx (where Axis the mesh resolution), while other simulations were performed on a 380×380×280 mesh with a=95Δx and h=140Δx. A plane with a no-slip velocity boundary condition and a fixed planar director field is used at the top and at the bottom of the simulation box. Periodic boundary conditions are used in the lateral directions of the numerical simulation box. The mesh resolution is set as $$\Delta x = 1.5\xi_N = 1.5\sqrt{L/\left(A + BS_{eq} + \frac{9}{2}CS_{eq}^2\right)},$$

where $\xi_N$ is the nematic correlation length that sets the size of the defect cores. The following values of the model parameters are used: $\zeta=1$, B/A=12.3, C/A=−10.1, W=0.5L/$\Delta x$, $\Gamma_{surf}=\Gamma/\Delta x$ (unless otherwise specified), and a timestep of 0.1 $(\Delta x)^2/(\Gamma L)$ (68). The results of the simulations are expressed using the mesh resolution $\Delta x$, rotational viscosity parameter F and elastic constant L.

Numerical simulations that minimize the Landau-de Gennes free energy in terms of the Q-tensor order parameter yield the 3-D director field. In these simulations, the mesh size cannot exceed the defect core size set by the nematic correlation length, which is orders of magnitude smaller than the particle size in experiment. The presence of this length scale requires that simulations be run in dimensional form. Such simulations are typically limited to colloids of ~1 µm in diameter owing to computational cost. A complicating factor is that colloids of different size have different stable defect configurations. For example, for homeotropic spheres in aligned nematic, dipolar defects are stable for particles of micron size, while quadrupolar configuration are stable for submicron unconfined particles. At the micron scale, quadrupolar configurations are metastable states stabilized by confinement. For disks with hybrid anchoring, at the scale of the simulations, quadrupolar configurations are favored over dipolar configurations, whereas dipolar configurations are favored in experiment performed with 75 micron diameter disks. In this setting, it is not yet known where the transition in stability occurs.

The simulations for rotating disks were not fully coupled. Rather, the flow field was able to deform the nematic director, but the nematic director does not feed-back into the flow field. Simulations in a fully coupled scheme will require extensions of current capabilities. Because the nemato-elasto-dynamics do not feed back to the hydrodynamics in the current simulations, and because the dipolar configuration that can be captured in simulation does not correspond exactly to those in experiment at the scale of the simulation, these simulations are not an exact replica of experiments.

REFERENCES

1. E. Lauga, T. R. Powers, The hydrodynamics of swimming microorganisms. *Rep. Prog. Phys.* 72, 096601 (2009).
2. S. Ramaswamy, The Mechanics and Statistics of Active Matter. *Annu. Rev. Condens. Matter Phys.* 1, 323-345 (2010).
3. M. C. Marchetti, J. F. Joanny, S. Ramaswamy, T. B. Liverpool, J. Prost, M. Rao, R. A. Simha, Hydrodynamics of soft active matter. *Rev. Mod. Phys.* 85, 1143-1189 (2013).
4. E. Lauga, Bacterial Hydrodynamics. *Annu. Rev. Fluid Mech.* 48, 105-130 (2016).
5. C. Bechinger, R. Di Leonardo, H. Löwen, C. Reichhardt, G. Volpe, G. Volpe, Active Particles in Complex and Crowded Environments. *Rev. Mod. Phys.* 88, 045006 (2016).
6. G. Gompper, R. G. Winkler, T. Speck, A. Solon, C. Nardini, F. Peruani, H. Löwen, R. Golestanian, U. B. Kaupp, L. Alvarez, T. Kiørboe, E. Lauga, W. C. K. Poon, A. DeSimone, S. Muiños-Landin, A. Fischer, N. A. Söker, F. Cichos, R. Kapral, P. Gaspard, M. Ripoll, F. Sagués, A. Doostmohammadi, J. M. Yeomans, I. S. Aranson, C. Bechinger, H. Stark, C. K. Hemelrijk, F. J. Nedelec, T. Sarkar, T. Aryaksama, M. Lacroix, G. Duclos, V. Yashunsky, P. Silberzan, M. Arroyo, S. Kale, The 2020 motile active matter roadmap. *J. Phys. Condens. Matter.* 32, 193001 (2020).
7. A. Sokolov, I. S. Aranson, J. O. Kessler, R. E. Goldstein, Concentration Dependence of the Collective Dynamics of Swimming Bacteria. *Phys. Rev. Lett.* 98, 158102 (2007).
8. S. Rafaï, L. Jibuti, P. Peyla, Effective Viscosity of Microswimmer Suspensions. *Phys. Rev. Lett.* 104, 098102 (2010).
9. A. P. Petroff, X.-L. Wu, A. Libchaber, Fast-Moving Bacteria Self-Organize into Active Two-Dimensional Crystals of Rotating Cells. *Phys. Rev. Lett.* 114, 158102 (2015).
10. C. C. Maass, C. Krüger, S. Herminghaus, C. Bahr, Swimming Droplets. *Annu. Rev. Condens. Matter Phys.* 7, 171-193 (2016).
11. W. F. Paxton, K. C. Kistler, C. C. Olmeda, A. Sen, S. K. St. Angelo, Y. Cao, T. E. Mallouk, P. E. Lammert, V. H. Crespi, Catalytic Nanomotors: Autonomous Movement of Striped Nanorods. *J. Am. Chem. Soc.* 126, 13424-13431 (2004).
12. J. Palacci, S. Sacanna, A. P. Steinberg, D. J. Pine, P. M. Chaikin, Living Crystals of Light-Activated Colloidal Surfers. *Science.* 339, 936-940 (2013).
13. R. W. O'Brien, L. R. White, Electrophoretic mobility of a spherical colloidal particle. *J. Chem. Soc. Faraday Trans.* 2. 74, 1607 (1978).
14. S. Gangwal, O. J. Cayre, M. Z. Bazant, O. D. Velev, Induced-Charge Electrophoresis of Metallodielectric Particles. *Phys. Rev. Lett.* 100, 058302 (2008).
15. P. Tierno, R. Golestanian, I. Pagonabarraga, F. Sagués, Controlled Swimming in Confined Fluids of Magnetically Actuated Colloidal Rotors. *Phys. Rev. Lett.* 101, 218304 (2008).
16. M. Driscoll, B. Delmotte, M. Youssef, S. Sacanna, A. Donev, P. Chaikin, Unstable fronts and motile structures formed by microrollers. *Nat. Phys.* 13, 375-379 (2017).
17. R. Piazza, A. Parola, Thermophoresis in colloidal suspensions. *J. Phys. Condens. Matter.* 20, 153102 (2008).
18. J. Espinosa-Garcia, E. Lauga, R. Zenit, Fluid elasticity increases the locomotion of flexible swimmers. *Phys. Fluids.* 25, 031701 (2013).
19. T. Qiu, T.-C. Lee, A. G. Mark, K. I. Morozov, R. Münster, O. Mierka, S. Turek, A. M. Leshansky, P. Fischer, Swimming by reciprocal motion at low Reynolds number. *Nat. Commun.* 5, 5119 (2014).
20. R. Dreyfus, J. Baudry, M. L. Roper, M. Fermigier, H. A. Stone, J. Bibette, Microscopic artificial swimmers. *Nature.* 437, 862-865 (2005).
21. A. Snezhko, M. Belkin, I. S. Aranson, W.-K. Kwok, Self-Assembled Magnetic Surface Swimmers. *Phys. Rev. Lett.* 102, 118103 (2009).
22. D. Lopez, E. Lauga, Dynamics of swimming bacteria at complex interfaces. *Phys. Fluids.* 26, 071902 (2014).
23. M. Molaei, M. Barry, R. Stocker, J. Sheng, Failed Escape: Solid Surfaces Prevent Tumbling of *Escherichia coli*. *Phys. Rev. Lett.* 113, 068103 (2014).
24. J. Zhang, E. Luijten, B. A. Grzybowski, S. Granick, Active colloids with collective mobility status and research opportunities. *Chem. Soc. Rev.* 46, 5551-5569 (2017).

25. G. Hwang, A. J. Paula, E. E. Hunter, Y. Liu, A. Babeer, B. Karabucak, K. Stebe, V. Kumar, E. Steager, H. Koo, Catalytic antimicrobial robots for biofilm eradication. *Sci. Robot.* 4, eaaw2388 (2019).
26. H. Stark, Physics of colloidal dispersions in nematic liquid crystals. *Phys. Rep.* 351, 387-474 (2001).
27. O. D. Lavrentovich, Active colloids in liquid crystals. *Curr. Opin. Colloid Interface Sci.* 21, 97-109 (2016).
28. I. Muševič, Liquid Crystal Colloids (Springer International Publishing, Cham, 2017; http://link.springer.com/10.1007/978-3-319-54916-3), *Soft and Biological Matter.*
29. I. I. Smalyukh, Liquid Crystal Colloids. *Annu. Rev. Condens. Matter Phys.* 9, 207-226 (2018).
30. O. D. Lavrentovich, Design of nematic liquid crystals to control microscale dynamics. *Liq. Cryst. Rev.* 8, 59-129 (2020).
31. M. Rajabi, H. Baza, T. Turiv, O. D. Lavrentovich, Directional self-locomotion of active droplets enabled by nematic environment. *Nat. Phys.* 17, 260-266 (2021).
32. P. C. Mushenheim, R. R. Trivedi, H. H. Tuson, D. B. Weibel, N. L. Abbott, Dynamic self-assembly of motile bacteria in liquid crystals. *Soft Matter.* 10, 88-95 (2014).
33. C. Peng, T. Turiv, Y. Guo, Q.-H. Wei, O. D. Lavrentovich, Command of active matter by topological defects and patterns. *Science.* 354, 882-885 (2016).
34. O. D. Lavrentovich, I. Lazo, O. P. Pishnyak, Nonlinear electrophoresis of dielectric and metal spheres in a nematic liquid crystal. *Nature.* 467, 947-950 (2010).
35. I. Lazo, O. D. Lavrentovich, Liquid-crystal-enabled electrophoresis of spheres in a nematic medium with negative dielectric anisotropy. *Philos. Trans. R. Soc. Math. Phys. Eng. Sci.* 371, 20120255 (2013).
36. D. K. Sahu, S. Kole, S. Ramaswamy, S. Dhara, Omnidirectional transport and navigation of Janus particles through a nematic liquid crystal film. *Phys. Rev. Res.* 2, 032009 (2020).
37. D. K. Sahu, S. Dhara, Electrophoresis of metal-dielectric Janus particles with dipolar director symmetry in nematic liquid crystals. *Soft Matter.* 18, 1819-1824 (2022).
38. Y. Sasaki, Y. Takikawa, V. S. R. Jampani, H. Hoshikawa, T. Seto, C. Bahr, S. Herminghaus, Y. Hidaka, H. Orihara, Colloidal caterpillars for cargo transportation. *Soft Matter.* 10, 8813-8820 (2014).
39. B. Senyuk, R. E. Adufu, I. I. Smalyukh, Electrically Powered Locomotion of Dual-Nature Colloid-Hedgehog and Colloid-Umbilic Topological and Elastic Dipoles in Liquid Crystals. *Langmuir.* 38, 689-697 (2022).
40. C. Krüger, G. Klös, C. Bahr, C. C. Maass, Curling Liquid Crystal Microswimmers: A Cascade of Spontaneous Symmetry Breaking. *Phys. Rev. Lett.* 117, 048003 (2016).
41. S. H. Lee, S. L. Lee, H. Y. Kim, Electro-optic characteristics and switching principle of a nematic liquid crystal cell controlled by fringe-field switching. *Appl. Phys. Lett.* 73, 2881-2883 (1998).
42. O. P. Pishnyak, S. Tang, J. R. Kelly, S. V. Shiyanovskii, O. D. Lavrentovich, Levitation, Lift, and Bidirectional Motion of Colloidal Particles in an Electrically Driven Nematic Liquid Crystal. *Phys. Rev. Lett.* 99, 127802 (2007).
43. Z. Zheng, Y. Li, H. K. Bisoyi, L. Wang, T. J. Bunning, Q. Li, Three-dimensional control of the helical axis of a chiral nematic liquid crystal by light. *Nature.* 531, 352-356 (2016).
44. A. N. Beris, B. J. Edwards, C. E. D. B. J. Edwards, *Thermodynamics of Flowing Systems: With Internal Microstructure* (Oxford University Press, 1994).
45. Y. Gu, N. L. Abbott, Observation of Saturn-Ring Defects around Solid Microspheres in Nematic Liquid Crystals. *Phys. Rev. Lett.* 85, 4719-4722 (2000).
46. J. C. Loudet, P. Poulin, Application of an Electric Field to Colloidal Particles Suspended in a Liquid-Crystal Solvent. *Phys. Rev. Lett.* 87, 165503 (2001).
47. M. Conradi, M. Ravnik, M. Bele, M. Zorko, S. Žumer, I. Muševič, Janus nematic colloids. *Soft Matter.* 5, 3905-3912 (2009).
48. D. A. Beller, M. A. Gharbi, I. B. Liu, Shape-controlled orientation and assembly of colloids with sharp edges in nematic liquid crystals. *Soft Matter.* 11, 1078-1086 (2015).
49. I. I. Smalyukh, S. V. Shiyanovskii, O. D. Lavrentovich, Three-dimensional imaging of orientational order by fluorescence confocal polarizing microscopy. *Chem. Phys. Lett.*, 9 (2001).
50. K. Son, D. R. Brumley, R. Stocker, Live from under the lens: exploring microbial motility with dynamic imaging and microfluidics. *Nat. Rev. Microbiol.* 13, 761-775 (2015).
51. M. Kleman, O. D. Laverntovich, *Soft Matter Physics: An Introduction* (Springer Science & Business Media, 2007).
52. J. Stefan, Versuche über die scheinbare Adhäsion. *Ann. Phys.* 230, 316-318 (1875).
53. O. Reynolds, IV. On the theory of lubrication and its application to Mr. Beauchamp tower's experiments, including an experimental determination of the viscosity of olive oil. *Philos. Trans. R. Soc. Lond.* 177, 157-234 (1886).
54. R. Zhang, T. Roberts, I. S. Aranson, J. J. de Pablo, Lattice Boltzmann simulation of asymmetric flow in nematic liquid crystals with finite anchoring. *J. Chem. Phys.* 144, 084905 (2016).
55. C. Lapointe, A. Hultgren, D. M. Silevitch, E. J. Felton, D. H. Reich, R. L. Leheny, Elastic Torque and the Levitation of Metal Wires by a Nematic Liquid Crystal. *Science.* 303, 652-655 (2004).
56. J. B. Rovner, D. S. Borgnia, D. H. Reich, R. L. Leheny, Elastic and hydrodynamic torques on a colloidal disk within a nematic liquid crystal. *Phys. Rev. E.* 86, 041702 (2012).
57. Y. Yuan, G. N. Abuhaimed, Q. Liu, I. I. Smalyukh, Self-assembled nematic colloidal motors powered by light. *Nat. Commun.* 9, 5040 (2018).
58. Y. Yuan, Q. Liu, B. Senyuk, I. I. Smalyukh, Elastic colloidal monopoles and reconfigurable self-assembly in liquid crystals. *Nature.* 570, 214-218 (2019).
59. M. Škarabot, M. Ravnik, S. Žumer, U. Tkalec, I. Poberaj, D. Babič, N. Osterman, I. Muševič, Two-dimensional dipolar nematic colloidal crystals. *Phys. Rev. E.* 76, 051406 (2007).
60. F. Martinez-Pedrero, P. Tierno, Magnetic Propulsion of Self-Assembled Colloidal Carpets: Efficient Cargo Transport via a Conveyor-Belt Effect. *Phys. Rev. Appl.* 3, 051003 (2015).
61. A. Kaiser, A. Snezhko, I. S. Aranson, Flocking ferromagnetic colloids. *Sci. Adv.* 3, e1601469.
62. B. Sprinkle, E. B. van der Wee, Y. Luo, M. M. Driscoll, A. Donev, Driven dynamics in dense suspensions of microrollers. *Soft Matter.* 16, 7982-8001 (2020).
63. T. Yao, Ž. Kos, Y. Luo, F. Serra, E. B. Steager, M. Ravnik, K. J. Stebe, Nematic colloidal micro-robots as physically intelligent systems. *ArXiv220314150 Cond-Mat* (2022) (available at http://arxiv.org/abs/2203.14150).

64. G. P. Alexander, B. G. Chen, E. A. Matsumoto, R. D. Kamien, *Colloquium*: Disclination loops, point defects, and all that in nematic liquid crystals. *Rev. Mod. Phys.* 84, 497-514 (2012).
65. K. Han, G. Kokot, S. Das, R. G. Winkler, G. Gompper, A. Snezhko, Reconfigurable structure and tunable transport in synchronized active spinner materials. *Sci. Adv.* 6, eaaz8535 (2020).
66. A. Bricard, J.-B. Caussin, N. Desreumaux, O. Dauchot, D. Bartolo, Emergence of macroscopic directed motion in populations of motile colloids. *Nature.* 503, 95-98 (2013).
67. J.-B. Fournier, P. Galatola, Modeling planar degenerate wetting and anchoring in nematic liquid crystals. *Europhys. Lett. EPL.* 72, 403-409 (2005).
68. M. Ravnik, S. Žumer, Landau-de Gennes modelling of nematic liquid crystal colloids. *Liq. Cryst.* 36, 1201-1214 (2009).

Aspects

The following Aspects are illustrative only and do not limit the scope of the present disclosure or the appended claims.

Aspect 1. A composition, comprising: a nematic colloid, the nematic colloid comprising a nematic liquid crystal and optionally a key colloid; and a lock colloid, the lock colloid optionally being symmetric about an axis, the lock colloid being configured for assembly with the key colloid of the nematic colloid, the assembly optionally being mediated by a dipole interaction between the colloid and the lock colloid, by a disclination line of the nematic colloid, or any combination thereof.

As shown, a lock colloid can have one arm extending therefrom or even a plurality of arms extending therefrom. As but one example, a lock colloid can be a 4-armed element, as shown in FIG. 1. A lock colloid can, in some embodiments, include a protrusion extending from an arm. A lock colloid can be ferromagnetic (or otherwise susceptible to a magnetic field), but this is not a requirement. A lock colloid can also be circular or disc-shaped.

It should be understood that the disclosed compositions can include a single type of key colloid. This is not a requirement, however, as a composition can include a plurality of key colloids, e.g., key colloids of different sizes, different shapes, key colloids of different compositions, or both. Likewise, a composition can include a single type of lock colloid, but can also include a plurality of types of lock colloids, e.g., lock colloids that differ in terms of size, shape, composition, or any combination.

Aspect 2. The composition of Aspect 1, wherein the dipole interaction is one or more of (1) a dipole chaining interaction between the key colloid and the lock colloid, (2) a dipole on hill interaction between the key colloid and the lock colloid, or (3) a dipole in well interaction between the key colloid and the lock colloid.

Aspect 3. The composition of any one of Aspects 1-2, wherein the composition is formulated such that a lock colloid of the composition, on account of defects of the lock colloid, the director field of the nematic colloid, and/or disclination lines, can experience translational and/or rotational motion without the application of an external field.

Aspect 4. The composition of any one of Aspects 1-3, wherein the lock colloid comprises a dipolar defect extending therefrom. Such a defect can be, e.g., a protrusion or other such feature.

A lock colloid can be symmetric about an axis, e.g., having the form of a four-pointed star. A lock colloid can also be boomerang-shaped, or even have three equally-spaced arms. A lock colloid can also be circular (e.g., disc-shaped).

Aspect 5. The composition of any one of Aspects 1-4, wherein the lock colloid comprises one or more grooves, corners, re-entrant features, or any combination thereof.

Aspect 6. The composition of any one of Aspects 1-5, wherein the lock colloid defines a region characterized as a Koch fractal.

Aspect 7. The composition of any one of Aspects 1-6, wherein the lock colloid effects formation of a defect within the nematic colloid, formation of a disclination within the nematic colloid, or both.

Aspect 8. The composition of Aspect 1, wherein the key colloid exhibits a Saturn ring defect within the nematic liquid crystal.

Aspect 9. The composition of any one of Aspects 1-8, comprising a plurality of key colloids assembled in a chain.

Aspect 10. The composition of any one of Aspects 1-8, comprising a plurality of key colloids assembled in a lattice.

Aspect 11. A method, comprising applying a field to a composition according to any one of Aspects 1-10, the field optionally being an external field.

Although one can apply an external field to (as described elsewhere herein, e.g., a magnetic field) give rise to assembly/disassembly between lock colloids and key colloids, as well as translation and/or rotation of lock colloids (which lock colloids can be assemble with one or more key colloids), it should be understood that the disclosed compositions can also be formulated so as to give rise to self-propelled lock colloids, which self-propelled lock colloid can generate the disclosed disclination line dynamics. As an example, a composition can be formulated such that a lock colloid of the composition, on account of defects of the lock colloid, the director field of the nematic colloid, and/or disclination lines, can experience translational and/or rotational motion without the application of an external field; the lock colloid can also assemble with and/or disassemble from a key colloid. Thus, it should be understood that the disclosed methods can be achieved by a composition that comprises a self-propelled lock colloid, e.g., a composition that itself comprises therein a field sufficient to effect motion of a lock colloid.

A field can also be applied to a lock colloid disposed in a liquid crystal, e.g., a nematic liquid crystal. A key colloid need not necessarily be present.

The field can be applied, as discussed, to effect rotation of the lock colloid. The field can be constant, but can also be variable in nature (e.g., varying in intensity, frequency, or in one or more other characteristics). A field can be applied so as to direct the path of the lock colloid; as described herein, a defect-propelled colloid's path can be controlled by tuning the rate of the colloid's rotation. The rate of rotation can be controlled manually, but can also be controlled in an automated fashion, e.g., by a controller that tunes the rate of the colloid's rotation so as to induce the colloid to follow a particular path. In this way, one can use image analysis (e.g., in real-time or near-real-time) to control the applied field that in turn controls the rate of colloid rotation and the colloid's path.

Lock colloids can also be assembled into dimers, trimers, or other multimers. Multibody interactions are thus attainable, as shown in FIGS. 27A-27D and related description. A dimer can be assembled, and a third colloid can be introduced, which third colloid can then form a trimer with the initial dimer. Alternatively, the third colloid can displace one of the members of the initial dimer, as shown in FIGS. 27A-27D.

Aspect 12. The method of Aspect 11, wherein the composition is confined within a container.

Aspect 13. The method of Aspect 11, wherein the composition is confined within parallel plates.

Aspect 14. The method of Aspect 11, wherein the composition is bounded by a wall that defines one or more undulations or projections.

Aspect 15. The method of any one of Aspects 11-14, wherein the field effects translation of a lock colloid.

Aspect 16. The method of any one of Aspects 11-15, wherein the field effects rotation of a lock colloid.

Aspect 17. The method of any one of Aspects 11-16, wherein the field effects assembly between a lock colloid and a key colloid, disassembly of a lock colloid assembled with a key colloid, or both.

Aspect 18. The method of Aspect 17, wherein the field disturbs a director field proximate to the lock colloid so as to disassemble a lock colloid assembled with a key colloid.

Aspect 19. The method of Aspect 18, wherein the field is applied so as to separate a disinclination line of the lock colloid and a defect of the key colloid.

Aspect 20. The method of Aspect 17, wherein the field is applied so as to merge a disinclination line of the lock colloid and a defect of the key colloid.

Aspect 21. The method of any one of Aspects 11-20, wherein the method is performed so as to give rise to an assembly of a plurality of key colloids. Such an assembly can be, e.g., a chain. Exemplary assemblies are shown in, e.g., FIGS. 5A-5C and FIGS. 15A-15D (and related description). As shown, the disclosed technology can be used to create an assembly of key colloids or to otherwise place key colloids in desired locations. Similarly, the disclosed technology can be used to at least partially disassemble an assembly of key colloids by effecting an interaction between a key colloid and a lock colloid such that the lock colloid then moves the key colloid away from the key colloid's initial position.

Aspect 22. The method of any one of Aspects 11-21, wherein the method is performed so as to effect transportation of a key colloid by a lock colloid.

Aspect 23. The method of Aspect 22, wherein the transportation is rotational.

Aspect 24. The method of any one of Aspects 22-23, wherein the transportation is translational.

Aspect 25. The method of Aspect 22, wherein the transportation effects transportation of the key colloid from a bulk region of the composition to a location proximate to a boundary, Aspect 26. The method of Aspect 25, wherein the location is attractive to the key colloid.

Aspect 27. The method of Aspect 26, wherein the location is proximate to a wavy wall. As shown in, e.g., FIGS. 15A-15D, key colloids (as cargo) can be assembled or arranged in a variety of fashions.

Aspect 28. The method of Aspect 22, wherein the transportation is out-of-plane.

Aspect 29. The method of any one of Aspects 11-28, wherein the external field is a magnetic field.

Aspect 30. The method of any one of Aspects 11-28, wherein the external field is an electric field.

What is claimed:

1. A composition, comprising:
a nematic colloid,
the nematic colloid comprising a nematic liquid crystal and a key colloid; and
a lock colloid, the lock colloid optionally being symmetric about an axis,
the lock colloid being configured for assembly with the key colloid of the nematic colloid,
the assembly optionally being mediated by a dipole interaction between the colloid and the lock colloid, by a disinclination line of the nematic colloid, or any combination thereof.

2. The composition of claim 1, wherein the dipole interaction is one or more of
(1) a dipole chaining interaction between the key colloid and the lock colloid,
(2) a dipole on hill interaction between the key colloid and the lock colloid, or
(3) a dipole in well interaction between the key colloid and the lock colloid.

3. The composition of claim 1, wherein the composition is formulated such that a lock colloid of the composition, on account of defects of the lock colloid, a director field of the nematic colloid, and/or disinclination lines, can experience translational and/or rotational motion without the application of an external field.

4. The composition of claim 1, wherein the lock colloid comprises a dipolar defect extending therefrom.

5. The composition of claim 1, wherein the lock colloid comprises one or more grooves, corners, re-entrant features, or any combination thereof.

6. The composition of claim 1, wherein the lock colloid defines a region characterized as a Koch fractal.

7. The composition of claim 1, wherein the lock colloid effects formation of a defect within the nematic colloid, formation of a disinclination within the nematic colloid, or both.

8. The composition of claim 1, wherein the key colloid exhibits a Saturn ring defect within the nematic liquid crystal.

9. The composition of claim 1, comprising a plurality of key colloids assembled in a chain.

10. The composition of claim 1, comprising a plurality of key colloids assembled in a lattice.

11. A method, comprising applying a field to a composition according to claim 1, the field optionally being an external field.

12. The method of claim 11, wherein the composition is confined within a container.

13. The method of claim 11, wherein the composition is confined within parallel plates.

14. The method of claim 11, wherein the composition is bounded by a wall that defines one or more undulations or projections.

15. The method of claim 11, wherein the field effects translation of a lock colloid.

16. The method of claim 11, wherein the field effects rotation of a lock colloid.

17. The method of claim 11, wherein the field effects assembly between a lock colloid and a key colloid, disassembly of a lock colloid assembled with a key colloid, or both.

18. The method of claim 17, wherein the field disturbs a director field proximate to the lock colloid so as to disassemble a lock colloid assembled with a key colloid.

19. The method of claim 18, wherein the field is applied so as to separate a disinclination line of the lock colloid and a defect of the key colloid.

20. The method of claim 17, wherein the field is applied so as to merge a disinclination line of the lock colloid and a defect of the key colloid.

21. The method of claim 11, wherein the method is performed so as to give rise to an assembly of a plurality of key colloids.

22. The method of claim 11, wherein the method is performed so as to effect transportation of a key colloid by a lock colloid.

23. The method of claim 22, wherein the transportation is rotational.

24. The method of claim 22, wherein the transportation is translational.

25. The method of claim 22, wherein the transportation effects transportation of the key colloid from a bulk region of the composition to a location proximate to a boundary.

26. The method of claim 25, wherein the location is attractive to the key colloid.

27. The method of claim 26, wherein the location is proximate to a wavy wall.

28. The method of claim 22, wherein the transportation is out-of-plane.

29. The method of claim 11, wherein the external field is a magnetic field.

30. The method of claim 11, wherein the external field is an electric field.

* * * * *

UNITED STATES PATENT AND TRADEMARK OFFICE
CERTIFICATE OF CORRECTION

| | |
|---|---|
| PATENT NO. | : 11,767,473 B2 |
| APPLICATION NO. | : 17/664911 |
| DATED | : September 26, 2023 |
| INVENTOR(S) | : Tianyi Yao et al. |

It is certified that error appears in the above-identified patent and that said Letters Patent is hereby corrected as shown below:

On the Title Page

Under Column No. 1, Page 2, Item (56) Line no. 6, Replace:
"P. P. Pishnyak,"
With:
--O. P. Pishnyak,--

Under Column No. 2, Page 2, Item (56) Line no. 30, Replace:
"Lazo, O. D."
With:
--1. Lazo, O. D.--

Under Column No. 2, Page 3, Item (56) Line no. 42, Replace:
"137,235-242 K2015)."
With:
--137,235-242 (2015).--

Under Column No. 2, Page 3, Item (56) Line no. 43, Replace:
"L Musevic, Liquid"
With:
--I. Musevic, Liquid--

Under Column No. 2, Page 3, Item (56) Line no. 46, Replace:
"L Musevic, M."
With:
--I. Musevic, M.--

Under Column No. 2, Page 3, Item (56) Line no. 56, Replace:
"a Yeview. Rep."

Signed and Sealed this
Twentieth Day of February, 2024

Katherine Kelly Vidal
*Director of the United States Patent and Trademark Office*

CERTIFICATE OF CORRECTION (continued)
U.S. Pat. No. 11,767,473 B2

With:
--a review. Rep.--

In the Specification

Under Column No. 3, Line no. 31, Replace:
"essentially of" The"
With:
--essentially of". The--

Under Column No. 11, Line no. 21, Replace:
"(t=1500Δx²/ΓL) The"
With:
--(t=1500Δx²/ΓL). The--

Under Column No. 11, Line no. 57, Replace:
"3 by 3 μm"
With:
--3 μm by 3 μm--

Under Column No. 13, Line no. 40, Replace:
"of magnitude ~10⁵ k$_B$g."
With:
--of magnitude ~10⁵ k$_B$T.--

Under Column No. 15, Line no. 65, Replace:

$$U = \int_{S_0}^{S_f} F_{drag}(s)ds = C_D 6\pi\mu a \int_{S_0}^{S_f} u(s)ds$$

With:

$$U = \int_{S_0}^{S_f} F_{drag}(s)ds = C_D 6\pi\mu a \int_{S_0}^{S_f} u(s)ds$$

Under Column No. 23, Line no. 22, Replace:
"H. Lõwen, C."
With:
--H. Löwen, C.--

Under Column No. 23, Line no. 33, Replace:
"H. Lõwen, R."
With:
--H. Löwen, R.--

Under Column No. 23, Line no. 36, Replace:
"F. Sagués, A"
With:
--F. Sagues, A--

CERTIFICATE OF CORRECTION (continued)
U.S. Pat. No. 11,767,473 B2

Under Column No. 23, Line no. 37, Replace:
"I. S. Ammon,"
With:
--I. S. Aranson,--

Under Column No. 26, Line no. 66, Replace:
"velocity ti depends"
With:
--velocity v depends--

Under Column No. 31, Line no. 34, Replace:
"to me x-axis."
With:
--to the x-axis.--

Under Column No. 32, Line no. 32 (Approx.), Replace:
"force nK/4 ln(a/$a_{core}$) (51),"
With:
--force nK/4ln(a/$a_{core}$) (51),--

Under Column No. 34, Line no. 57, Replace:
"is $\eta_{2,side}$ The"
With:
--is $\eta_{2,side}$. The--

Under Column No. 35, Line no. 67, Replace:
"of ~10 μM. The"
With:
--of ~10 μm. The--

Under Column No. 36, Line no. 61, Replace:
"for 0.3 Er in"
With:
--for 0.3≤Er≤1.8 in--

Under Column No. 37, Line no. 44, Replace:
"a ' swim stroke'"
With:
--a 'swim stroke'--

Under Column No. 40, Line no. 63, Replace:
"(where Axis the"
With:
--(where Δx is the--

CERTIFICATE OF CORRECTION (continued)
U.S. Pat. No. 11,767,473 B2

Under Column No. 41, Line no. 15, Replace:
"parameter F and"
With:
--parameter Γ and--

Under Column No. 41, Line no. 62, Replace:
"H. Lõwen, C."
With:
--H. Löwen, C.--

Under Column No. 41, Line no. 67, Replace:
"H. Lõwen, R."
With:
--H. Löwen, R.--

Under Column No. 42, Line no. 3, Replace:
"F. Sagués, A"
With:
--F. Sagues, A--